(12) United States Patent
Mertens et al.

(10) Patent No.: US 10,863,201 B2
(45) Date of Patent: *Dec. 8, 2020

(54) OPTIMIZING HIGH DYNAMIC RANGE IMAGES FOR PARTICULAR DISPLAYS

(71) Applicant: KONINKLIJKE PHILIPS N.V., Eindhoven (NL)

(72) Inventors: Mark Jozef Willem Mertens, Eindhoven (NL); Rutger Nijland, Someren-Eind (NL); Johannes Gerardus Rijk Van Mourik, Eindhoven (NL); Johannes Yzebrand Tichelaar, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/060,274

(22) PCT Filed: Dec. 21, 2016

(86) PCT No.: PCT/EP2016/082107
§ 371 (c)(1),
(2) Date: Jun. 7, 2018

(87) PCT Pub. No.: WO2017/108906
PCT Pub. Date: Jun. 29, 2017

(65) Prior Publication Data
US 2019/0052908 A1    Feb. 14, 2019

(30) Foreign Application Priority Data

Dec. 21, 2015 (EP) .................................... 15201561
Apr. 28, 2016 (EP) .................................... 16167548
May 19, 2016 (EP) .................................... 16170354

(51) Int. Cl.
*H04N 19/625*    (2014.01)
*G09G 5/02*    (2006.01)
(Continued)

(52) U.S. Cl.
CPC ............. *H04N 19/625* (2014.11); *G09G 5/02* (2013.01); *G09G 5/10* (2013.01); *H04N 19/102* (2014.11);
(Continued)

(58) Field of Classification Search
None
See application file for complete search history.

(56) References Cited

U.S. PATENT DOCUMENTS

2007/0201560 A1* 8/2007 Segall .................... H04N 19/61
                                                        375/240.24
2010/0177203 A1* 7/2010 Lin .................... H04N 5/23229
                                                        348/222.1
(Continued)

FOREIGN PATENT DOCUMENTS

WO    2005104035 A1    11/2005
WO    2007082562 A2    7/2007
(Continued)

*Primary Examiner* — YuJang Tswei

(57) ABSTRACT

To enable practical and quick generation of a family of good looking HDR gradings for various displays on which the HDR image may need to be shown, we describe a color transformation apparatus (201) to calculate resultant colors (R2, G2, B2) of pixels of an output image (IM_MDR) for a display with a display peak brightness (PB_D) starting from input colors (R, G, B) of pixels of an input image (Im_in) having a maximum luma code corresponding to a first image peak brightness (PB_IM1) which is different from the display peak brightness, characterized in that the color transformation apparatus comprises: —a color transformation determination unit (102; 2501) arranged to determine a color transformation (TMF; g) as defined in color processing specification data (MET_1) comprising at least one tone mapping function (CC) received via a metadata input (116), which color transformation specifies how the luminances of pixels of the input image are to be converted into luminances (Continued)

for those pixels of a second image (IM_HDR) having corresponding to its maximum luma code a second image peak brightness (PB_IM2), which is different from the display peak brightness (PB_D) and the first image peak brightness (PB_IM1), and whereby the division of the first image peak brightness by the second image peak brightness is either larger than 2 or smaller than ½; —a scaling factor determination unit (200; 2603) arranged to determine a resultant common multiplicative factor (gt; Ls), the unit being arranged to apply determining along a direction (DIR) a position along a metric a position (M_PB_U) which corresponds with the display peak brightness (PB_D) and arranged to determine the resultant common multiplicative factor (gt; Ls) based on the position, and wherein the color transformation apparatus (201) further comprises: —a scaling multiplier (114) arranged to multiply each of the three color components of an RGB color representation of the input colors with the resultant common multiplicative factor (gt).

21 Claims, 38 Drawing Sheets

(51) Int. Cl.
*G09G 5/10* (2006.01)
*H04N 19/102* (2014.01)
*H04N 19/186* (2014.01)

(52) U.S. Cl.
CPC ... *H04N 19/186* (2014.11); *G09G 2320/0276* (2013.01); *G09G 2320/0673* (2013.01); *G09G 2340/06* (2013.01); *G09G 2370/04* (2013.01)

(56) References Cited

U.S. PATENT DOCUMENTS

| | | | |
|---|---|---|---|
| 2012/0201451 A1* | 8/2012 | Bryant | H04N 1/60 382/164 |
| 2013/0121572 A1* | 5/2013 | Paris | H04N 19/30 382/166 |
| 2013/0148907 A1* | 6/2013 | Su | G06T 9/004 382/238 |
| 2014/0037205 A1* | 2/2014 | Su | G06T 5/009 382/166 |
| 2015/0117791 A1 | 4/2015 | Mertens | |
| 2016/0248939 A1* | 8/2016 | Thurston, III | H04N 1/603 |
| 2017/0330529 A1 | 11/2017 | Van Mourik | |

FOREIGN PATENT DOCUMENTS

| | | |
|---|---|---|
| WO | 2012127401 A1 | 9/2012 |
| WO | 2015007505 A1 | 1/2015 |

* cited by examiner

OPTIMIZING HIGH DYNAMIC RANGE IMAGES FOR PARTICULAR DISPLAYS

CROSS-REFERENCE TO PRIOR APPLICATIONS

This application is the U.S. National Phase application under 35 U.S.C. § 371 of International Application No. PCT/EP2016/082107, filed on 21 Dec. 2016, which claims the benefit of European Patent Applications 15201561.6, filed on 21 Dec. 2015, 16167548.3, filed on 28 Apr. 2016, and 16170354.1, filed on 19 May 2016. These applications are hereby incorporated by reference herein.

FIELD OF THE INVENTION

The invention relates to methods and apparatuses for optimizing the colors of pixels, and in particular their luminances, in an input encoding of a high dynamic range scene (HDR) image, in particular a video comprising a number of consecutive HDR images, for obtaining a correct artistic look for a display with a particular display peak brightness as desired by a color grader creating the image content, the look corresponding to a reference HDR look of the HDR image as graded for a reference display for example a high peak brightness (PB) mastering display, when the optimized image is rendered on any actual display of a peak brightness (PB_D) unequal to that of the reference display corresponding to which the grading of the HDR image was done. The reader will understand that a corresponding look doesn't necessarily mean a look which is exactly the same to a viewer, since displays of lower peak brightness (or dynamic range) can never actually render all image looks renderable on a display of higher peak brightness exactly, but rather there will be some trade-off in the colors of at least some object pixels, which color adjustments the below technology allows the grader to make. But the coded intended image and the actually rendered image will look sufficiently similar. Both encoding side methods and apparatuses to specify such a look, as well as receiving side apparatuses, such as e.g. a display or television, arranged to calculate and render the optimized look are described, as well as methods and technologies to communicate information used for controlling the optimization by doing color transformations.

BACKGROUND OF THE INVENTION

Recently several companies have started to research and publish (see WO2007082562 [Max Planck], a two-image method with a residual layer, and WO2005104035 [Dolby Laboratories], teaching a somewhat similar method in which one can form a ratio image for boosting a low dynamic range (LDR) re-grading of an HDR scene) on how they can encode at least one still picture, or a video of several temporally successive, so-called high dynamic range images, which HDR images are characterized by that they typically encode or are able to encode at least some object luminances of at least 1000 nit, but also dark luminances of e.g. below 0.1 nit, and are of sufficient quality to be rendered on so-called HDR displays, which have peak brightnesses (being the luminance of the display white, i.e. the brightest renderable color) typically above 800 nit, or even 1000 nit, and potentially e.g. 2000 or 5000 or even 10,000 nit. Of course these images of say a movie may and must also be showable on an LDR display with a peak brightness typically around 100 nit, e.g. when the viewer wants to continue watching the movie on his portable display, and typically some different object luminances and/or colors are needed in the LDR vs. the HDR image encoding (e.g. the relative luminance on a range [0,1] of an object in a HDR grading may need to be much lower than in the LDR graded image, because it will be displayed with a much brighter backlight). Needless to say also that video encoding may have additional requirements compared to still image encoding, e.g. to allow cheap real-time processing, etc.

So typically the content creator makes a HDR image version or look, which is typically the master grading (the starting point from which further gradings can be created, which are looks on the same scene when one needs to render on displays with different peak brightness capabilities, and which is typically done by giving the various objects in an image straight from camera nice artistic colors, to convey e.g. some mood). I.e. with "a grading" we indicate that an image has been so tailored by a human color grader that the colors of objects look artistically correct to the grader (e.g. he may make a dark basement in which the objects in the shadows are hardly visible, yet there is also a single lamp on the ceiling which brightly shines, and those various rendered luminances may need to be smartly coordinated to give the viewer the optimal experience) for a given intended rendering scenario, and below we teach the technical components for enabling such a grading process yielding a graded image also called a grading, given our limitations of HDR encoding. And then the grader typically also makes a legacy LDR image (also called standard SDR image), which can be used to serve the legacy LDR displays, which may still be in the field for a long time to come. These can be transmitted alternatively as separate image communications on e.g. a video communication network like the internet, or a DVB-T channel. Or WO2007082562 and WO2005104035 teach scalable coding methods, in which the HDR image is reconstructable at a receiving side from the LDR image, some tone mapping on it, and a residual HDR image to come sufficiently close to the HDR original (but only that HDR image with those particular pixel colors and object luminance being reconstructable from the base layer LDR image). Such a scalable encoding could then be co-stored on a memory product like e.g. a solid state memory stick, and the receiving side apparatus, e.g. a television, or a settopbox (STB), can then determine which would be the most appropriate version for its connected television.

I.e. one stores in one sector of the memory the basic LDR images, and in another sector the HDR images, or the correction images such as luminance boost image from which one can starting from the corresponding LDR images for the same time moments calculate the HDR images. E.g. for televisions up to 700 nit whichever unit does the calculation of the ultimate image to be rendered on the television may use the LDR graded image, and above 700 nit it may use the HDR image (e.g. by polling which display of which PB is connected, or knowing that if the display does the best image selection itself).

Whilst this allows to make two artistically perfect reference gradings of a HDR scene for two specific rendering scenarios, e.g. a 5000 nit television, and an LDR one (which standard has 100 nit PB), little research has been done and published on how one can handle the in-between televisions of peak brightness intermediate the peak brightnesses corresponding to the two artistic grading images which can be retrieved or determined at an image data receiving side (the corresponding peak brightness of a coding being defined as the to be rendered luminance on a reference display when the maximum code, e.g. 1023 for 10 bit, is inputted, e.g.

5000 nit for a 5000 nit graded look) which will no doubt soon also be deployed in the market, e.g. an 1800 nit television. E.g., the content creator may spend considerable time to make a 1000 nit master HDR grading of his movie, because e.g. the 1000 nit may be an agreed content peak brightness PB_C (i.e. the brightest pixel color which can be defined, which will be a white achromatic color) for that particular HDR video coding standard he uses, and he may spend more or less time deriving a corresponding LDR (or also called since recently standard dynamic range SDR, since it was the usual manner to make LDR legacy video, e.g. according to rec. 709) set of images, with a related brightness respectively contrast look. But that means there is only a good looking video available in case the viewer has either exactly a specific 1000 nit PB_D HDR display, or a legacy SDR display. But it is neither expected that all people will have displays with exactly the same kind of displays with the same display peak brightness PB_D, nor that in the future all video will be encoded with exactly the same content or coding peak brightness PB_C (i.e. somebody buying the optimal display for BD content, may still have a suboptimal display when the market moves towards internet-based delivery with PB_C=5000 nit), and then there is even still the influence of the viewing environment, in particular its average brightness and illuminance. So whereas all attempts on HDR coding have essentially focused on getting content through a communication means, and being able to decode at all the HDR images at a receiving side, applicant thinks that any pragmatic HDR handling system needs to have more capabilities. Applicant has done experiments which show that to have a really good, convincing artistic look for any intermediate or even an out of range display (e.g. obtaining a 50 nit look which is below the lowest grading which may typically be 100 nit), neither the HDR nor the LDR image is really good for that intermediate peak brightness display (which we will herebelow call a medium dynamic range (MDR) display). And a said, which kind of MDR display one has, even depends on the PB_C of the HDR images being received or requested. Also, it could be that the consumer has an actual television or other display present in his living room which is brighter than the peak brightness of the reference display as an optimal intended display for the received HDR image grading, i.e. e.g. 10000 nit vs. 5000 nit, and then it may be desirable to have an improved grading for these higher brightness displays too, despite the fact that the content creator thought it was only necessary to specify his look on the HDR scene for displays up to 5000 nit PB. E.g. applicant found that in critical scenes, e.g. a face of a person in the dark may become too dark when using the HDR image due to the inappropriately high contrast of that HDR image for a lower peak brightness display rendering, yet the LDR image is too bright in many places, drastically changing the mood of e.g. a night scene. FIG. 14 shows an example of a typical HDR scene image handling we want to be able to achieve. 1401 shows the original scene, or at least, how it has been approximated in a master HDR grading (because one will typically not encode the sun as to be rendered on a display on its original 1 billion nit brightness, but rather as e.g. 5000 nit pixels). We see a scene which has some indoors objects, which will be relatively darker, but typically not really dark, e.g. between 1 and 200 nit, and some sunny outdoors objects seen through the window, like the house, which may in real life have luminances of several 1000s of nits, but which for night time indoors television viewing are better rendered around e.g. 1000 nit. In a first grading, which we will call an HDR grading with a peak brightness of the first image in this mere example PB_IM1 corresponding to a HDR peak brightness PB_H of e.g. 5000 nit, we will find it useful to position the indoor objects relatively low on a relative luminance axis (so that on an absolute luminance axis they would be rendered at luminances around 30 nit), and the outside objects would be somewhere around or above the middle of the luminance range, depending on the grader's preferences for this shot in e.g. the movie, or broadcast, etc. (in case of life broadcast the grading may be as simple as tuning only very few parameters prior to going on air, e.g. using a largely fixed mapping between the HDR and LDR look, but adding e.g. a single parameter gpm for enabling the display tuning). Which actual codes correspond to the desired luminances not only depends on the PB of the coding, but also on the shape of the used code allocation function, which is also sometimes called an Opto-electronic conversion or transfer function (OECF; also called OETF), and which for HDR coding typically has a steep shape, steeper than the gamma 1/2.2 functions of LDR (the skilled person will understand that one can formulate the technologies in either representation, so where for simplicity we herebelow elucidate our concepts in luminance representations, at least some of the steps may be mutatis mutandis be applied in lumas, i.e. the e.g. 10 bit codings of the luminances).

One needs a corresponding LDR look (in this mere example called IM_GRAD_LXDR), for which of course all the various objects of the larger luminance dynamic range have to be squeezed in a smaller dynamic range, corresponding to a 100 nit PB. The grader will define color transformation strategies, typically simple functions to keep the video communication integrated circuits simple at least for the coming years, which define how to reposition the luminances of all objects (e.g. as can be seen one would need to position the house close to the maximum of the luminance range and corresponding code range to keep it looking sufficiently bright compared to the indoors, which may for certain embodiments e.g. be done with a soft-clipping tone mapping). This is what is specified on the content creation side, on a grading apparatus 1402, and a content using apparatus may need to determine, based on the information of the graded looks (S_im) which it receives over some image communication medium (1403), which optimal luminances the various objects should have for an actual display having a peak brightness which is unequal to the peak brightness corresponding to any of the typically two received artistical gradings (or at least data of those images). In this example that may involve various strategies. E.g., the dark indoors objects are well-renderable on displays of any PB, even 100 nit, hence the color optimization may keep them at or near 30 nit for whatever intended PB. The house may need to get some to be rendered luminance in between that of the LDR and HDR gradings, and the sun may be given the brightest possible color (i.e. PB) on any connected or to be connected display.

Now we want to emphasize already, as will become clear later, that we have developed a strategy which can surprisingly encode a HDR scene (which is why we introduce the wording scene) actually as an LDR image (+color transformation metadata), so whereas for simplicity of understanding various of our concepts and technical meta-structures may be elucidated with a scenario where Im_1, the image to be communicated to a receiving side is a HDR image, which should be re-gradable into an LDR image, the same principles are also useable, and to be used in other important market scenarios, in case Im_1 is actually an LDR grading (which can at a receiving side be re-graded into an HDR image, or any medium dynamic range image MDR, or any image outside the range of the communicated LDR and HDR gradings).

FIG. 29 schematically summarizes what a coding system according to applicant's previous inventions in the direction which is now further built upon will look like typically.

There is some image source 2901 of the HDR original images, which may be e.g. a camera for on-the-fly video program making, but we assume for focusing the mind it to be e.g. a data storage which creates the pre-color graded movie, i.e. all the colors and in particular brightnesses of the pixels have been made optimal for presenting on e.g. a 5000 nit PB_D reference display, e.g. by a human color grader. Then encoding of this data may in this example mean the following (but we'd like to emphasize that we can also encode as some HDR images, and in particular the tuning to obtain the optimal images for an MDR display may work based on downgrading received HDR images just as well, based on the philosophy of having very important content-specific information in the color transformation functions relating two different dynamic range looks on the same scene, typically some quite capable i.e. high PB_C HDR image(s), and an SDR image(s)). The encoder 2921 first comprises a color transformation unit 2902, arranged to convert the master HDR images into suitable SDR image. Suitable typically means that the look will be a close approximation to the HDR look, whilst retaining enough color information to be able to do at a receiving side the reconstruction of the 5000 nit HDR look images from the received SDR images. In practice that will means that a human grader, or some smart algorithm after analyzing the HDR image specifics, like e.g. amounts and potentially positions of classes of pixels with particular values of their HDR luminance, will select the appropriate downgrading curves, for which in the simplest system there will be only one, e.g. the CC curve, or another just one mutatis mutandis some coarse downgrading curve Fcrs. This enables the encoder to make SDR images Im_LDR, which are just normal SDR images (although when coupled with the functions relating this SDR look to the original master HDR look, they contain precisely the correct information also of the HDR image, i.e. to be able to reconstruct the HDR image(s). As these are just SDR images, they are not only well-renderable on legacy displays (i.e. of 100 nit PB_D), but also, they can be encoded via normal SDR video coding techniques, and that is very useful, because there is already a billion dollar deployment of hardware in the field (e.g. in satellites) which then doesn't need to be changed. So we have smartly decoupled the information of the HDR into functions for functional coding, but, as for the present invention that allows a second important application, namely the smart, content-optimized ability to re-grade the images to whatever is needed for getting a corresponding look on an MDR display with any PB_D. This obviates the need for the grader to actually make all such third look(s), yet they will still be generated according to his artistic vision, i.e. the particular needs of this content, because we can use the shapes of his color transformation functions F_ct (in particular luminance transformation functions, because HDR-to-MDR conversion is primarily concerned with obtaining the correct brightnesses for all image objects, so this application will mostly focus on that aspect), whatever they may be, which are also co-communicated with the SDR pixellized images as metadata, when deriving the optimal MDR images. So the re-graded SDR images (Im_LDR) go into a video encoding unit 2903, which we assume for simplicity of elucidation to be a HEVC encoder as standardized, but the skilled reader understands it can be any other encoder designed for communicating the images of the dynamic range selected, i.e. in this example SDR. This yields coded SDR images, Im_COD, and corresponding e.g. SEI messages, SEI(F_ct), comprising all needed data of the transformation functions, however they were designed to be communicated (e.g. in various embodiments parametric formulations, or LUTs, which allow different handling of the derivation of the display-optimal MDR images, but suitable embodiments can be designed for any variant). A formatter f2904 ormats everything in a needed signal format, e.g. ATSC to be communicated over a satellite channel, or some internet-suited format, etc. So the transmission medium 2905 can be anything, from a cable network, or some dedicated communication network, or some packaged memory like a blu-ray disk, etc. At any receiving side, whether the receiving apparatus is a settopbox, or display, or computer, or professional movie theatre receiver, etc., the receiving apparatus will contain an unformatter 2906, which re-creates signal-decoded encoded video. The the video decoder 2920 will mutatis mutandis comprise a video decoding unit 2907, e.g. a HEVC decoder, which also comprises a function data reader (2911) arranged to collect from metadata the functions F_ct, and construct and present them in the appropriate format for further use, in this application the optimized determination of the MDR image, according to the below elucidated various possible algorithms or their equivalents. Then the color transformation unit 2908 would in normal HDR decoding just create a reconstruction Im_RHDR of the original master HDR image(s), whatever they may be, e.g. 1000 nit or 5000 nit PB_C-defined. Now however in our below embodiments, the color transformation unit 2908 also has the possibility to re-grade images optimally for whatever display one has (e.g. the user inputs in the STB that he has bought a 3000 nit TV 2910, or, if this decoder is already comprised in the TV, of course the TV will know its own capabilities). We have indicated this schematically as that a color tuning unit 2902 is comprised, which will get information on all the specifics of the viewing situation (in particular the PB_D of the display to be served with images), and then use any of the below elucidated methods to optimally tune the colors to arrive at an MDR image, Im3000 nit. Although this may seem something one may want to do, actually being able to do it in a reasonable manner is a complex task.

Applicant has generically taught on the concept of generating various additional gradings (which are needed to make the received HDR scene images look optimal whatever the peak brightness of a connected display, and not e.g. too dark or too bright for at least a part of the image) on the basis of available received graded images in WO2011/107905 and WO2012/127401, which teach the main concepts needed in display tuning, needed for all or at least a larger class of actual embodiments. However, it was still a problem to come up with simple coding variants, which conform to practical limitations of e.g. IC complexity, grader work capacity, etc., which the inventors could do after fixing some common ground principles for such practical HDR image handling. Correspondingly, there still was a problem of how to come with a matching simple technology for allowing the content creator to adjust the artistically optimized grading to the at least one actual present display at a receiving side, and the various needs of display tuning based thereupon.

Except where and to the extent specifically stated in this description, any discussions above regarding prior art or even applicant's particular beliefs or interpretations of prior art for explaining something, are not intended to inadvertently specify any specifics of any limitations which e.g. must be, or couldn't be in any of the embodiments of our present invention. Also, anything not explicitly said is not intended as any specific opinion on which features or variants might or might not be reasoned into any specific embodiment from mere prima facie prior art knowledge, or any implied statement on obviousness, etc. It should be clear that some teachings are added merely for a particular purpose of shining some particular light on some aspect which might be interesting in the light of the below manifold embodiments, and that given the totality of the teachings and what can be well understood from that, some examples of the above may only relate to some particular advantageous embodiments.

SUMMARY OF THE INVENTION

In particular, we have developed a very useful luminance mapping technology (at least luminance mapping, because given the already many factors and embodiment variants for simplicity of explanation we ignore for now the chromatic dimension of redness and blueness) which is based on multiplication of the three color components with a single common multiplier which is so optimized that it contains all the smartness as needed for creating the optimal look of that MDR image of any HDR scene which is needed for rendering the look of that scene on any actually available display of a particular display peak brightness PB_D (the skilled person understands that the same calculations can happen on a server, to service a particular PB_D display later, i.e. which display is not actually physically connected to the color or luminance calculation apparatus). If one processes linear RGB color signals, but also non-linear powers of those like preferably the for video usual Y'CbCr components, one may boost them (by multiplying the components with a single resultant multiplier gt) in a similar manner as one would boost the luminances of those colors. I.e., the content creator can then specify according to his desires a luminance mapping strategy, which may in embodiments be formed of various mapping sub-strategies, e.g. a general brightness boosting, a fine-tuning arbitrarily shaped function (CC), etc. And this desideratum may then actually be calculated as various multiplicative strategies. Needless to say that, and certainly for our present techniques, one needs in the most basic variants only one such function specification, in some embodiments not even for all possible luminances of the input image, and where we call it CC in the explanations, it may also be some other function. In any case, however complex the creator desires to specify his luminance mapping, it can be seen as various multiplications which lead to a final multiplication, which will be realizable as a final luminance optimization, of what one can think of as normalized color components. We present various possible actual embodiments based on that principle, which then separates the luminance handling from the color handling.

Because it is not commonly known or standardly used by video coding engineers, prior to diving into details of the MDR image optimization, to be sure the reader gets the background thoughts and principles, we elucidate the principle in FIG. 16. Suppose we have here a sigmoidal function, to transform any possible input luminance Y_in (which corresponds to a luma code of the received and to be processed input image Im_in, e.g. 950) into an output luminance value, which we will for simplicity also assume to be a normalized value between 0.0 and 1.0. One can then write this function also as a multiplication, which can be derived compared to the unitary transformation (i.e. the diagonal). If we were to transform e.g. a HDR Im_in into itself, we would apply that unitary transformation. If we want to transform the HDR relative luminances into LDR relative luminances (or luminances in short), we can apply the sigmoidal function. But we can equivalently multiply that Y_in value by the g factor of the right curve. Such a multiplicative strategy makes HDR technology relatively simpler, e.g. cascading various desirable transformations, but also as is the matter of this application, display tuning scenarios, to arrive at an optimally looking image, corresponding largely to the master HDR look, for any actually connected display.

As a practical HDR (and in fact at the same time an LDR graded look, usable for direct display on legacy LDR displays) image and in particular video coding method, applicant invented a system which stores (or transmits) only one of the HDR and LDR image pair as a principal image which is the sole actually transmitted pixel color data (the other image being communicated parametrically as color processing function specifications to derive it from the actually received image(s), and which furthermore can when derived technically correctly then actually be encoded according to classical compressing techniques (read for quick understanding put in e.g. a AVC 8 bit or HEVC 10 bit luma container, and performing the DCT compression etc. as if it was not a HDR image of a HDR scene but some stupid SDR representation thereof), i.e. containing the pixel color textures of the captured objects of the HDR scene, i.e. it contains the geometrical composition of all object shapes and some codification of the textures in those, and allows for any desired rendering or corresponding color adjustment to reconstruct that geometric aspect of images. So actually as to what can be established at any receiving side, our HDR scene images codification contains in addition to the actually communicated images at least one (and typically in view of grading cost often exactly one) further grading (e.g. SDR 100 nit PB_C images are communicated, but the color communication functions co-communicated allow the reconstruction of exactly one further grading, e.g. a reconstruction of a 5000 nit PB_C master HDR image), which is typically encoded not as a second image but as a (typically limited because decoding ICs need to understand and implement all color transformations) set of functional transformations for the pixel colors of the principal image. So if the principal image (Im_in) would be an HDR image (e.g. referenced to a peak brightness of 5000 nit), the color transformation functions (or algorithms) would be to enable calculating from it an LDR image (typically as standardized SDR of 100 nit). And the skilled person will know how one can easily codify such transformation with as little bits as required, e.g. a function with a linear first part and then a bending part towards (1.0, 1.0) can be encoded by a real-valued or other parameter giving a slope (black slope) and a stopping point of the linear part, and whatever parameters needed to define the shape of the upper part. Several practical variants will transmit SDR re-gradings of the master HDR image as sole communicated image(s), as this is useful for all those situations in which already deployed SDR displays need an image which they can directly render, without needed to do further color transformation (as a HDR display or the apparatus preparing the images for it would need to do in that embodiment).

FIG. 1 gives a typical yet merely non-limiting illustrative possible embodiment of such a color transformation and the corresponding transformation-based encoding of the (at least one) further grading, which the skilled reader should understand is not the only system we can use our novel below embodiments with. In particular, where we elucidate some of the principles which may advantageously be applied in a linear color representation (in particular f(Max), or f(Y) where Y is luminance in the numerator and Max resp. Y in the numerator of g; and the multiplier multiplying linear RGB components), the principles can also be applied in non-linear color spaces (both the part leading to the calculation of g, and/or the multiplication, which may multiply e.g. color components R', G' and B', where the dash indicates they are power laws with a power 1/N where N is a real or integer number of the linear ones, e.g. R'=sqrt(R)).

It is assumed in this example that a HDR image is encoded as texture image (and received as Im_in), and a LDR grading can be constructed from it at any video receiving side by applying color transformations to its pixel colors. However, the same technical reasoning applies when e.g. reconstructing a HDR image on the basis of a principal image which is an LDR image, i.e. suitable for direct rendering on a LDR display, i.e. when rendered on an LDR display showing the appropriate brightnesses and contrasts for the various objects in the image given the peak brightness limitation of the LDR display. In that case the color transform will define a HDR image from the LDR image. Note that in some embodiments (though not necessarily) the order of the processing units may be reversed at encoder and decoder, e.g. when the encoder decreases the dynamic range and encodes the principal image as an LDR image, then the order of luminance (or luma) processing may be reversed when reconstructing at the decoder side the HDR grading from the corresponding LDR principal image, i.e. first applying the custom curve, then the exposure adjustment of unit 110 applied in the reverse direction, etc.

Assume for explanation purposes for now that the color transformation apparatus 201 is part of any receiving apparatus (which may be a television, a computer, a mobile phone, an in-theatre digital cinema server, a viewing booth of a security system control room, etc.), but at an encoding side in any encoding or transcoding apparatus the same technological components may be present to check what is feasible and can be encoded for transmission. An image signal or more typically a video signal S_im is received via an input 103, connectable to various image sources, like e.g. a BD reader, an antenna, an internet connection, etc. The video signal S_im comprises on the one hand an image (or a video of several images for different time instants) of pixels Im_in with input colors, and on the other hand metadata MET, which may comprise various data, but inter alia the data for uniquely constructing at a receiving side the color mapping functions, possibly some description data relating to e.g. what peak brightness the input image is graded for, and whatever is needed to enable the various below embodiments. The encoding of the video images may typically be done in an MPEG-like coding strategy, e.g. existing MPEG-HEVC, i.e. a DCT-based encoding of YCbCr pixel colors, since our dynamic range look encoding by color transformation-based re-grading technology is essentially agnostic of the actually used compression strategy in the part of the compression which takes care of suitably formatting the images for storage or transmission. So although the various embodiments of our invention may work on various other input color definitions like e.g. advantageously Yuv, in this example a first color converter 104 is arranged to convert the YCbCr representation to a linear RGB representation (in this embodiment, as we show below one can with the same invention principles also formulate embodiments which work directly on YCbCr or YUV components). A second color converter 105 may do a mapping from a first RGB representation to a second one. This is because the color grader may do the grading and observe what is happening in a first color space, say e.g. Rec. 709, yet the image data is encoded according to a second color space. E.g. one may use the primaries of Digital Cinema Initiatives P3: Red=(0.68,0.32), Green=(0.265, 0.69), Blue=(0.15,0.06), White=(0.314,0.351). Or, one could encode in the recent Rec. 2020 color format, etc. E.g., the image may be transmitted in a color representation defined in a Rec. 2020 color space, but the grader has done his color grading in DCI-P3 color space, which means that the receivers will first convert to P3 color space before doing all color transformations, e.g. to obtain an LDR grading from a HDR image or vice versa. Since the grader has re-graded his HDR image into an LDR image (assume all values normalized to [0,1]) in his grading color space which as said was e.g. Rec. 709, before the mathematics re-calculate the grading at the receiving end, the second color convertor 105 transforms to this Rec. 709 color space (the skilled person knows that various transformation strategies may be applied, e.g. a relative colorimetric mapping may be used in some cases, or some saturation compression strategy may have been used which can be inverted, etc.). Then, typically the metadata applies a color optimization strategy, which we assume in this simple practical embodiment is performed by a color saturation processor 106. There may be various reasons for the grader to apply a particular saturation strategy (e.g. to desaturate bright colors in a particular manner to make them fit at a higher luminance position in the RGB gamut, or to increase the colorfulness of colors that have become darker due to the HDR-to-LDR mapping, etc.). E.g. the grader may find that the dark blues of say a night scene in the sky are a little to desaturated, and hence he may already pre-increase their saturation in the linear HDR image, prior to doing the luminance optimization transformation to obtain the LDR look (this is in particular interesting because our typical embodiments do luminance transformations which leave the chromaticity of the color unchanged, i.e. purely affect the luminance aspect of the color). In the simplified example embodiment, we assume the saturation is a simple scaling for the colors (i.e. the same whatever their hue, luminance, or initial saturation), with a value s which is read from the communicated and received metadata MET. In the simpler embodiments we will focus only on luminance aspects of the color transformations, leaving the color processing as this single pre-processing step, but the skilled person understands that other saturation strategies are possible, and may be smartly coordinated with the luminance processing. The colors now have their correct (R,G,B) values for doing a pure luminance-direction processing.

A key property of such color transformation embodiments as shown in FIG. 1, is that one can do a pure scaling of the colors (i.e. changing only the color property which is a correlate of the luminance, i.e. any measure which measures the length of the color vector, of the color whilst retaining the ratios of the color components which determine the chromaticity of the color, wherein the mathematics of the color transformation can of course be embodied in various manner, e.g. on the linear RGB components as shown), which color transformation we can as explained reformulate as a common multiple scaling transformation (with a real number g, e.g. 0.753, or any codification thereof which can be converted to a real number, e.g. INT(1000*g)) on the three color components similarly. This defines our HDR-to- LDR mapping (or similarly our LDR-to-HDR mapping, or a mapping of any first graded image of a first dynamic range to a significantly different second dynamic range, the two differing in their associated peak brightness of their associated reference display, i.e. the luminance corresponding to the maximum code in the N bit codification, of typically at least a factor of 4 i.e. 2 stops, or at least a factor 1.5 or 2, and possibly several more stops), at least where the luminance aspects of the image objects are concerned, which is the dominant concern in dynamic range conversions.

In the elucidating (mere) example of FIG. 1, the processing is as follows. Maximum calculator 107 calculates for each pixel color which one of the RGB components is the highest, e.g. the red component being 0.7 (which we will call Rmax). This will be a measure of the length of the color vector, i.e. an embodiment of a luminance-correlate. The luminance mapper 102 applies a sequence of transformations on that maximum component, the codification of these transformations being received in the metadata MET, which ultimately amounts to a total luminance functional transformation. This transformation codifies how the luminances normalized to 1 of the HDR image should all change to get the LDR image, having the artistically correct graded LDR look. E.g., typically the following transformations are applied, which the grader on the encoding/content creation side has specified as giving a good LDR look, by grading on his grading software, and clicking the save button when satisfied with the LDR look. Firstly a gain multiplier 108 multiplies the maximal component (say Rmax) by a received gain factor (gai), yielding Rmax_1, a different value between 0 and 1 for each pixel (e.g. in some embodiments the grader could set the 70% level of the HDR luminances to the 100% level of the LDR luminances, or some other desired grading). Note that the processing is actually done on the maximum of the three color components, not e.g. the luminance of the color, despite the fact that a luminance transformation behavior may have been communicated. Then a power function application unit 109 raises the current result Rmax_1 to a power gam, which number gam is again read from the received metadata, yielding result Rmax_2. Then an exposure adjustment unit 110 applies a global exposure modification transformation like e.g. by applying the following equation:

Rmax_3=ln ((lg−1)*Rmax_2+1)/ln (lg), where lg is again a received grader-optimized number and ln the Neperian logarithm with base 2.71, yielding Rmax_4. Then a custom curve is applied by luminance mapper 111, yielding Rmax_4=CC(Rmax_3). I.e., this curve may be transmitted e.g. as a number of (say 6) characteristic points (input luma/output luma coordinate pairs), in between which intermediate points can be calculated at the receiving side by some transmitted or pre-agreed interpolation strategy (e.g. linear interpolation), and then this function is applied: e.g. if Rmax_3=0.7, the specific communicated function yields for that value Rmax_4=0.78. Finally, a display transform shaper 112 transforms according to the used gamma of a typical LDR display (this last display transform shaper may also be optional, for displays which get input in linear coordinates), i.e. the inverse gamma of Rec. 709 typically. The skilled person understands how these equations can be equated by equivalent strategies, e.g. by forming a single LUT to apply to all possible input values of max(R,G,B) in [0,1]. It should be understood that some of the units can be skipped, e.g. the gain gai may be set to 1.0, which removes it effectively as it has an identity processing as result. Of course other transformation functions can also be used, e.g. only applying a custom curve, but our research have found that the example seems to be a pragmatic manner for graders to efficiently come to a good LDR look. What is important for our below embodiments, is that one can construct any luminance processing strategy as desired, the herewith described one merely being a very good one in practice.

Then finally, a common multiplicative factor g is calculated by dividing the result of all these transformations, i.e. e.g. f(Rmax) by the maximum of the input RGB components itself, i.e. e.g. Rmax. This factor g is calculated to be able to present the luminance transformation as a multiplication strategy. Finally to obtain the desired output color and its desired LDR brightness relatively, a scaling multiplier 114 multiplies the input RGB values, or in this example the values resulting from the (optional) saturation processing (color saturation processor 106), with the common multiplicative factor g to yield the correct luminance-adjusted colors for all image objects, or in fact all image pixels in these objects. I.e., in this example this yields the LDR graded look as a linear RGB image, starting from a HDR image inputted in S_im, of which the pixel colors (R2,G2,B2) are outputted over an image output 115. Of course the skilled person understands that having the correct colorimetric look for the LDR image, its colors can then still be encoded according to whatever principle for further use, as can the image itself (e.g. one application will be sending the signal to the LCD valves driver over a bus from the calculation IC, but another application can be sending the image over an HDMI connection to a television for rendering, directly or with further display-vendor specific fine-tuning processing, whereby potentially some further metadata is included with the communicated video signal for guiding the fine-tuning).

Now the reader should clearly understand an important further principle of our HDR coding and usage technology. So far with FIG. 1 we have only explained how we can encode two looks of different dynamic range (i.e. with all object brightnesses correspondingly coordinated) of an HDR scene, i.e. how to encode two original images graded by a content creator. And why did we do that? Everything would be simple if there was only one (100 nit) LDR display, and in particular only one kind of (e.g. 5000 nit) HDR display out there in the world at the premises of the various content viewers. The LDR display would then display the LDR grading, and the HDR display, whatever it was, would display "the HDR grading". That would work well for display peak brightnesses which moderately deviate from the peak brightness of the image it receives for rendering, but would probably not give good results for large deviations. In particular, which image would a 1000 nit display need to display, the 100 nit one, or the 5000 nit one. Now one could very well grade at least one more image with exactly the same technology as in FIG. 1, e.g. determine color transformation functions for actually calculating the best looking grading for displays of PB_D around 1000 nit. The maybe at around 500 nit or 2500 nit the look would still be inappropriate, at least for some critical HDR scenes (e.g. a monster in the dark may become too dark for it to still be seen, or conversely, it may become unrealistically bright, or the contrast of another monster in the grey mist may become so low it becomes invisible, etc.). In many scenarios (and especially real-time broadcasting applications), the grader may not care for making a third grading with second color transformations functions in MET_TR2, nor may he even want to spent much time on in detail creating the graded second look (e.g. the LDR from the master HDR). Therefore we introduced the principle that on the one hand one knows very much about the actual semantics of the HDR scene from looking at two gradings which are typically at extreme ends, as far as typical envisaged usage is concerned, of the peak brightness scale. E.g., one sees that an explosion is brightness boosted in the HDR scene compared to the LDR scene, where there are not many available codes above those needed to sufficiently render the rest of the scene (or vice versa, one can see that the explosion is dimmed in LDR compared to its bright impressive version in the HDR image). That does not necessarily tell how one should boost the explosion for a particular PB_D, e.g. whether the boosting should immediately start aggressively or only for high quality HDR displays, e.g. above 2000 nit PB, but at least one knows that for intermediate gradings (MDR) one would need to boost the explosion fireball. Now what is needed technology wise depends on the situation, such as the complexity of the type of HDR scene, and the criticalness of the particular user, balanced to what is common in that field of application, affordable time and cost, etc. The principle is that the receiving side, e.g. the Settopbox or TV IC, can derive itself the other needed gradings (in between the received two gradings, or even outside that range), typically with some further guiding from the creation side, with metadata which is different in nature from the color transformations used to create an actual second original grading, i.e. as specified and signed-off original artistic material by the grader. Because the physics and technical requirements for this so-called display tuning phase will also be different. Note that whereas we will describe versions where the creator actually communicates parameters which are optimal for the present HDR scene according to his particular desires, we also teach that the same principles can be applied solely on the receiving side, e.g. where the receiving apparatus does an image analysis to arrive at a suitable e.g. gpr or gpm display tuning parameter value. For some scenes it is not so critical what the final rendered luminance of the various image objects is, e.g. the light in a room may in real life also be just a little brighter, and so could the light of the world outside seen through a window well be relatively brighter or dimmer. In such a case the apparatus or grader may decide with a very simple technical tool, to tune the look to be just a little brighter (e.g. 3 unitary steps on some range) compared to what would come out with a reference algorithm, at least for some part of the luminance range. For some more critical scenes the grader, or display manufacturer e.g. to automatically improve the image, or give the user a smarter look-influencing user interface control, may want a more precise control over various parts of the HDR scene (in particular various brightness ranges, but in some scenarios there may e.g. be information allowing the identification of particular objects, in which case an object-dependent display tuning can be performed), for various sub-ranges of the range of possible display peak brightnesses, everything of course in tune with typical hardware constraints for these kinds of technology.

So merely encoding and decoding even two possible dynamic range graded images of a captured scene is not a sufficient technology for being able to fully correctly handle HDR image use, a hard lessons which the people wanting to go quickly to market with too simple solutions have learned, hence we need also a with the coding principles co-coordinated display tuning methodology, and, in particular one which is pragmatic given the typical needs, limitations and desires of video handling, in particular now HDR video handling.

So after the needed long introduction because everything in this very recent HDR image in particular video coding is very new, and especially some of applicant's technical approaches not even known let alone commonly known, we come to the details of the present factors, components, embodiments, and newly invented lines of thought of display tuning. The below elucidated invention solves the problem of having a pragmatic yet powerful regarding the various optimizing tuning needs, for such common scaling (multiplicative) processing, which define the colorimetric look of at least two graded images, method for obtaining intermediate gradings (medium dynamic range MDR (semi) automatically re-graded looks) for actual displays, to be connected and supplied with an optimized image for rendering, which can be calculated at any receiving side by having a color transformation apparatus (201) to calculate resultant colors (R2, G2, B2) of pixels of an output image (IM_MDR) which is tuned for a display with a display peak brightness (PB_D) starting from input colors (R,G,B) of pixels of an input image (Im_in) having a maximum luma code corresponding to a first image peak brightness (PB_IM1) which is different from the display peak brightness (PB_D), characterized in that the color transformation apparatus comprises:

a color transformation determination unit (4201, 102; 2501) arranged to determine a color transformation (TMF) from color processing specification data (MET_1) comprising at least one luminance mapping function (CC) received via a metadata input (116), which color processing specification data specifies how the luminances of pixels of the input image (Im_in) are to be converted into luminances for those pixels of a second image (Im_RHDR) having corresponding to its maximum luma code a second image peak brightness (PB_IM2), which is different from the display peak brightness (PB_D) and the first image peak brightness (PB_IM1), and whereby the division of the first image peak brightness by the second image peak brightness is either larger than 2 or smaller than ½;

a scaling factor determination unit (4205, 200; 1310) arranged to determine a resultant common multiplicative factor (gt; Ls), the unit being arranged to determine this resultant common multiplicative factor by: first establishing along a predetermined direction (DIR), which has a non-zero anticlockwise angle from the vertical direction being orthogonal to a direction spanning the input image luminances, a pre-established metric (1850, METR) for locating display peak brightnesses, and a position (M_PB_D) on that metric which corresponds with the value of the display peak brightness (PB_D), the metric starting at the position of a diagonal representing an identity transform function, and second: establishing a second color transformation (1803; F_M) for determining at least luminances of the resultant colors (R2, G2, B2) of pixels of the output image (IM_MDR), which second color transformation is based on the color transformation (TMF) and the position (M_PB_D); and third: determine the resultant common multiplicative factor (gt; Ls) based on the second color transformation (1803; F_M); and wherein the color transformation apparatus (201) further comprises a scaling multiplier (114) arranged to multiply each of the three color components of a color representation of the input colors with the resultant common multiplicative factor (gt) to obtain the resultant colors (R2, G2, B2).

As will become clearer to the skilled reader studying the various below elucidated possibilities, we already want to emphasize some factors which should not be read limitedly, to grasp the core concepts. Firstly, although all additive displays ultimately work with RGB color components, color calculations may actually equivalently be performed in other color representations. The initial color transformation which has to be determined or established, is the one mapping between the two co-communicated representative different dynamic range graded images, e.g. SDR-to-HDR_5000 nit. This already allows for variants in the various embodiments, because some simpler variants may communicate this needed transformation as one single luminance or tone mapping function (CC), but other embodiments may communicate the total needed color transformation, or even the luminance transformation part thereof, as a sequence of color transformations, e.g., at the creation side the human color grader optimally deriving the SDR from the master HDR has first done some coarse re-brightening of several regions of the image, and then has designed a fine-tuning for some objects in the image (which differential luminance changes can also be communicated in such an alternative embodiment via the CC curve shape). What needs to be actually calculated is the final optimal function(s) for calculating not the HDR but the MDR (e.g. for 1650 nit PB_D) image from the received SDR image.

Also this can be done in various manners in various embodiments, e.g. some embodiments may once calculate a final luminance mapping function for any possible SDR luminances (or lumas) in the input image, load this in the color calculation part, e.g. as a table of gt values to be used, and then process the color transformation pixel by pixel. But alternatively the determinations of any partial function calculation can happen on the fly as the pixels come in, but the skilled reader understands how the shape of the desired re-grading function(s) must be established for this particular image or scene of images, first from what was designed by the content creator, and therefrom for what is coordinatedly needed for the limitations of the presently connected or to be served display.

So we can define different looks images for driving displays of some PB_D which can have many values and which doesn't correspond to the PB of the received image (nor the peak brightness of the other graded image derivable from it by applying the received color transformations straight to the input image, which functions are a specification how to derive solely this other pair of the two images, per time instant in case of video), based on that received image and a suitably defined color transformation (which for understanding the reader may without limitation assume to be designed by a human color grader) which comprise at least a luminance transformation (which may also be actually defined and received as metadata, and/or applied when doing the calculations as a luma transformation, as a luminance transformation can be uniquely converted into an equivalent luma transformation). Any receiver side can at least partially decide on the shape of such a function, since this shape will at least be tuned by one receiving-side rendering property like e.g. PB_D, but preferably it is also defined by the content creator, which can typically be done by using the color transformation functions defining relationship between an LDR and a HDR image. Because ideally, the display tuning should also take into account the specific requirements of any particular HDR scene or image (which can vary greatly in type, and semantic object-type dependent needs for the luminance rendering of various image objects), which is what the present embodiments linked to the functions which were already defined for the coding of the duo of images can handle. This color transformation can then finally be actually applied as a multiplication strategy on the (original, or luminance-scaled, e.g. in a representation normalized to a maximum of 1.0) red, green and blue color components, whether linear or non-linear (or even in other embodiments on Y'CbCr or other color representations).

The relationship between a needed function (or in fact its corresponding multiplicative gt factors), i.e. a deviated shape of that function starting from an identity transform or no processing (the diagonal function which would map the SDR lumas to themselves on the y-axis in the border case when theoretically one would calculate the SDR grading from the received SDR grading, or HDR from HDR, which one would not actually do of course, but should also be correct for any technology design according to our various principles, i.e. a good manner to understand and formulate the technology) will be determined by establishing a metric in general. This metric can be seen as a "stretching" of the outer case function, namely if one wants to calculate the HDR_5000 nit image from the received SDR image (this is illustrated for a simple scenario in i.a. FIG. 18). Of course more complicated cases may do such things as either use a varying metric over the various possible input image lumas (which can be done e.g. with an embodiment like in FIG. 6) and/or the shape of the function can be changed from the received one, e.g. for display tuning the behavior for the darkest pixels may be changed, which can be done e.g. by introducing an extra deviation or guiding function, etc. But a core aspect is that one can establish a metric, and that the PB_D value of the display can then be calculated to a position on that metric for any input luma or luminance. The research of the researchers also shows that it is advantageous to be able to select various directions for the metric, e.g. the orthogonal-to-the-diagonal direction has a good control influence of needed brightnesses when mapping from HDR to SDR, or vice versa with inverse functions. To conclude, the skilled person can understand from our teachings that the ability to locate a set of M_PB_D (or M_PB_U in other embodiments) points for each possible input luma on a graph of luminances or lumas (e.g. a normalized or unnormalized i.e. actual input SDR (or HDR as in FIG. 18) luminance on the x-axis, and some luminance on the y-axis, which can be any needed MDR luminance, e.g. on an axis which stretches up to the maximum of the HDR image, i.e. PB_C=5000 nit e.g.), establishes a final optimal function (in the sense that it creates a correspondingly looking image to the HDR image given the limitations of the display rendering, and the pragmatic calculation limitations, chosen e.g. by the complexity of an IC that any TV or STB maker can afford) for calculating the MDR image lumas from the input lumas (note that also MDR images outside the range between the two co-communicated gradings can be calculated).

In a useful embodiment the direction (DIR) lies between 90 degrees corresponding to a vertical metric in a plot of input and output luminance or luma, and 135 degrees which corresponds to a diagonal metric.

In a useful embodiment two outer points (PBE, PBEH) of the metric correspond to a peak brightness of the received input image (PB_L) respectively the by color transformation functions co-encoded image of other peak brightness (PB_H) which is reconstructable from that image by applying the received in metadata color transformation functions comprising at least the one tone mapping function (CC) to it, and wherein the apparatus calculates a an output image (IM_MDR) for a display with a display peak brightness (PB_D) falling within that range of peak brightnesses (PB_L to PB_H).

In a useful embodiment the metric is based on a logarithmic representation of the display peak brightnesses. Already in simple embodiments one can so optimize the dynamic range and luminance look of the various image objects in a simple get good manner, e.g. by the value gp of the upper equation of below equations 1, which corresponds to an embodiment of determining a PB_D-dependent position on the metric, and the consequent correctly determined shape of the functions for the MDR-from-SDR (or MDR-from-HDR usually) image derivation. But of course in more complex embodiments as said above, the positions on the metric corresponding to the needed luminance transformation function may vary more complexly, e.g. based on communicated parameters specifying a desired re-grading behavior as determined by the content creator, or environmental parameters like e.g. a surround illumination measurement, estimate, or equivalent value (e.g. input by the viewer, as to what he can comfortably see under such illumination), etc., but then still the derivations may typically start from a logarithmic quantification of the actually available PB_D value between the PB_C values of the two communicated LDR and HDR graded images.

A useful embodiment has the scaling factor determination unit (200) further arranged to obtain a tuning parameter (gpr; gpm) from second color processing specification data (MET_2) which was previously determined at a time of creating the input image (Im_in), and is arranged to calculate a resultant common multiplicative factor (gtu) corresponding to a different position on the metric than the position for the display peak brightness (PB_D), which different position is based on the value of the tuning parameter. It is important that the reader takes some time to reflect upon this and understand it. There is a first mechanism which allows the content creating side to determine the precise shape of the functions mapping between the HDR and the LDR image grading, i.e. those transmission-side created and receiving-side establishable images (e.g. of 100 and 5000 nit PB_C). This allows, according to the quality level which each particular HDR application needs, to determine how the HDR image object luminances should map to the SDR luminances, which may not be a simple task already. E.g. if we have a brightly lit shopwindow during nighttime, and next to it some bicycles in the dark, the grader may use (as introduced with FIG. 1) one or more luminance mapping functions to more or less precisely determine which luminances the dark bicycles should have (so that they are e.g. just visible on a typical SDR image rendering, and not too bright to spoil the illusion, nor invisibly swamped in the black). On the other hand, for the bright object under the spotlights in the shop window, it may also not be a trivial task to select optimal luminances, which at the same time create a good brightness difference with the dark parts of the image, and good intra-region contrast and colorfulness for the objects behind the window (whilst as the reader should not forget also warranting when sending such a SDR graded image by selecting those functions the reconstructability of the Im_RHDR). So that is already a task which the technology should be able to handle sufficiently well even when just creating two graded images (e.g. 100 and 1000 nit). The idea behind our pragmatic solution for deriving the MDR images, is that there is so much important information in those color transformation functions, that this can be used by receiving-side algorithms to create nice corresponding MDR images. But depending on the image, and in particular the complexity of the HDR scene, when going to such an automatic MDR creation algorithm one might lose some precision compared to this perhaps really perfectionistically graded pair of representative LDR and HDR images. So in case the content creator (i.e. typically the color grader desires), he can send a second set of metadata according to his edesiderata, to more precisely control the actual manner in which the MDR transformation function(s) are derived, e.g. how the metric is constructed and PB_D-dependent points on the metric are calculated, as e.g. exemplified with FIG. 6. So we emphasize: the first color transformation function metadata (for calculating e.g. the master HDR reconstruction Im_RHDR from the received SDR images Im_in), specifies how re-grading should work roughly and globally starting from two far apart exemplary gradings (the HDR PB_C being e.g. typically at least 10× higher than the 100 nit of the SDR grading, but preferably higher, at least for high quality HDR scenes), but the second set of metadata (MET_2) allows further specification of the actual display tuning behavior for various rendering limitations which could occur by the grader. He can do that in various manners, e.g. by knowing that some critical shadow region should be handled with care because there is important action happening there, and be quickly bright for most rendering scenarios, or alternatively that some bright regions may be strongly (soft) clipped etc., or the grader may e.g. watch the behavior on some typical MDR reference display (e.g. 500 nit for 1000 nit HDR encodings).

In a useful embodiment the scaling factor determination unit (200) is arranged to determine the different position by applying a monotonous function giving as an output a normalized position on the metric as a function of at least one input parameter (gpr), which monotonous function may be determined by the color transformation autonomously, or based on prescription metadata prescribing which function shape to use which was previously determined at a time of creating the input image (Im_in). It may be useful to determine the positioning behavior as some function. This allows some similar behavior along the metrics, in case one wants that, despite the length of those metrics varying along the function, i.e. the possible input lumas. E.g., it allows to pretend that all displays above some threshold, e.g 90% of PB_C_HDR (i.e. e.g. 4500 nit) are supposed to be identical to the HDR reference display of PB_D=5000 nit, and render an MDR image which is as close as possible to the master HDR grading. Such a function could be established by the receiving apparatus itself (as an innate behavior, e.g. of some movie-rendering mode which can be selected), or some information on the function can be communicated from the creation side, e.g. the entire monotonous function itself. We emphasize that this function is the one which positions the M_PB_D point along the metric, i.e. depending on PB_D but still e.g. closer to the SDR-to_master HDR mapping function than e.g. the logarithmic calculation would prescribe (as e.g. illustrated with FIG. 15), and this function should not be confused with the functions for calculating the HDR image from the SDR image, i.e. the luminance transformation function(s).

A useful embodiment comprises an image analysis unit (1110) arranged to analyze the colors of objects in the input image (Im_in), and therefrom determine a value for at least one of the parameters controlling the calculation of the output image (IM_MDR), e.g. the tuning parameter (gpm), or the direction (DIR), or the shape of the monotonous function giving as an output a normalized position on the metric to be used in the calculation of the resultant common multiplicative factor (gt). Some embodiments can make good use of the knowledge in the luminance transformation functions created at the content creation side, yet determine the display tuning largely themselves. They can then e.g. evaluate which kind of dark, average and bright regions there are in the image, and e.g. determine a direction DIR, which influences how the average middle luminances regions are changed (e.g. their output luminance and contrast) versus the handling, e.g. compression, of the highlights (this may be done differently for the above mentioned shop window, which contains meaningful objects that the viewer should recognize, in particular if there are important commercial objects, like e.g. a tradename engraved or sandblasted on a window, i.e. with low contrast but which still needs to be recognizable on all the MDR displays, versus e.g. some lamps which might just as well be clipped to a single white color for most users).

Another useful embodiment of the apparatus comprises a clipping amount determination unit (3710) arranged to determine a minimal amount of hard clipping to the display peak brightness (PB_D) for a sub-range of the brightest luminances of the input image (Im_in), wherein the calculation of the resultant common multiplicative factor (gt) is determined for luminances of the input image within the subrange to map the input luminance to the display peak brightness (PB_D). In case the content creator or TV manufacturers desires or allows some minimal amount of clipping (for a small sub-range, e.g. the brightest 10% of the luminances of brightest 3% of the lumas), this unit 3710 can specify this. One embodiment of realizing this can be via some auxiliary function F_ALT, guiding the calculation of the final luminance mapping function to be employed (F*) as determined by luminance function determination unit (3712), An example of such a method can be using a function F_ALT which is a clipping function, i.e. a function which gives an output result of PB_D (e.g. 1500 nit for a display which can render maximally 1500 nit white) irrespective of the input luma, and this is just one of the alternative functions function generator 3711 can generate.

The following embodiments are also of interest. Luminance function determination unit 3712 can then determine the final function to be loaded e.g. in a LUT doing directly a calculation of the MDR lumas from the SDR input image lumas (i.e. load e.g. in unit 2501 of that exemplary topology) a resultant function which is a hard switch or gradual fade towards the hard clipping alternate tuning strategy (see an elucidation example of the possibilities illustrated in FIG. 38).

Yet another interesting embodiment, especially interesting for doing surround illumination-dependent tuning, has a black level estimation unit (3702) to establish an estimate of a black level, wherein the calculation of the resultant common multiplicative factor (gt) is dependent on the black level. This can be another unit in an optimal function determination unit (3701), which may e.g. be software working in correspondence with a core color transformation part in an IC (this allows upgrading via firmware, e.g. to allow new or better tuning strategies, or various levels of quality depending on the content delivery channel, or a subscription, etc.). The black level estimate, typically indicating a luminance level or luma level on the actually available MDR display, i.e. in the MDR image, below which image details will not or hardly be visible, can actually be determined in various manners, e.g. by asking a pragmatically well working value to the viewer via a user interface like a remote control, i.e. some input 3755 for obtaining the level estimate, which could also be connected to an illuminance meter, or a camera etc.

It is also interesting to vary the embodiments in a direction which controls the tuning behavior for multistep tuning, e.g. an embodiment in which the calculating the resultant common multiplicative factor (gt) is based on a coarse luminance mapping function (Fcrs) and a fine luminance mapping function (CC), characterized in that first an optimized coarse mapping function (FCrs_opt) is determined based on at least the display peak brightness (PB_D) for determining optimal subranges of the luminances corresponding to the actual display rendering situation, and this coarse mapping is applied to the input image yielding coarse lumas (Y'CG), and then a fine mapping function is optimized based on the fine luminance mapping function (CC) and at least the display peak brightness (PB_D), and this fine mapping function is applied to the coarse lumas. This allows e.g. that the coarse and fine luminance mapping corresponding to the display peak brightness are determined along a metric (1850) with a different direction (DIR), wherein preferably the coarse mapping is performed diagonally, and the fine mapping vertically. Of course further embodiments can then further fine-tune and control the manner in which these at least two substeps tune for various MDR displays, by receiving second metadata MET_2 specifying that (e.g. gpm value(s) or similar metadata).

For embodiments which adapt to further properties of the viewing environment, i.e. beyond mere display characteristics, it is advantageous if first a luminance mapping function is established according to a reference viewing situation with a fixed illumination level, and subsequently this function is adjusted for the value of the black level, from which adjusted function the resultant common multiplicative factor (gt) is calculated, e.g. in unit 3701.

All these tuning units or apparatuses can be physically realized after a decoder (i.e. which e.g. derives the Im_RHDR closely corresponding to the master HDR grading), or integrated with it, i.e. immediately deriving a MDR image from the SDR image (the HDR image may then be used in the software calculation of the optimal function to use in the core color transformation engine).

Other interesting embodiments and variants are e.g. the following.

An exemplary embodiment of a calculation of the resultant common multiplicative factor (gt) needed for calculating the resultant colors of the output image comprises first calculating a ratio (gp) of: the logarithm of firstly a ratio of a peak brightness of a display (PB_D), in particular the connected display on which to render the image(s) and a reference peak brightness (PB_IM1 e.g. PB_H) corresponding to the input image, divided by the logarithm a ratio of the reference peak brightness (PB_H) and a peak brightness (PB_IM2 e.g. being a PB_L of an LDR grading) corresponding to an image (Im_LDR) of a luminance dynamic range at least a factor 1.5 different from the luminance dynamic range of the input image, which is typically the second received grading of the HDR scene. Thereafter the color transformation apparatus calculates the resultant common multiplicative factor (gt) as the initial common multiplicative factor g (which was determined from the totality of all partial color transformations used to convert between the first and the second grading, which may typically be a HDR and LDR look image) raised to a power being the ratio (gp).

There can be other such metrics, but the metric cannot be just anything: it should when used to locate where exactly or approximately the intermediate peak brightness of the display (PB_D) should fall in between the PB_H and PB_L, so that the MDR look is satisfactory when rendered on a PB_D display (and in particular it is also useful if the metric gives good results when extrapolating looks outside the [PB_IM1, PB_IM2] range).

So the apparatus or method first determines which is the color transformation between the two encoded/received look images (Im_in and IM_GRAD_LXDR, in which IM_GRAD_LXDR may be an HDR or LDR image, and the other image has then a considerably different dynamic range), which color transformation may in various embodiments be actually represented and communicated to the unit doing the calculations as e.g. a function (between a normalized input and output luminance), or one or a set of multiplicative factors g.

In many embodiments just all colors of the MDR output image may be calculated by this method, but in other embodiments only some of the pixels are recalculated. E.g., the method may copy some of the scenery, or some text or graphics elements, from say athe LDR image, and only boost those pixels corresponding to a fireball or window looking out to the outdoors, etc. In such a case a function might also be defined over only a part of the range of possible luminances, etc.

Ultimately, whatever the calculation of the color processing needed to derive the MDR image from say the HDR image, the apparatus will convert this into a set of multiplication values, for multiplying with the input colors, which typically may be in a linear RGB color representation (or similarly one could e.g. multiply the L component of a Lu'v' representation in which u' and v' are the CIE 1976 chromaticity coordinates, but those details are irrelevant for understanding the various embodiments of display tuning).

So the apparatus needs firstly a capability metric determination unit (1303), to determine which metric is needed to locate the PB_D value between the PB_IM1 and PB_IM2 values. This metric is non-linear typically, and with some of the tuning parameters the apparatus, in some advantageous scenarios under the guidance of the content grader, can further influence the form of the non-linearity. This is inter alia because display tuning is not just merely a display-physics based adaptation, even under the appearance of non-linear human vision, but because in particular to move from (especially very high DR) HDR to LDR, one may need to do complex optimizations to squeeze all object luminances together and still get a nice coordinated look (things may be easier in case the second image is also a HDR image, or at least a MDR image with sufficiently high PB). Nonetheless, we ideally like out system embodiments to be reasonable simple, to with a few parameters quickly get at least most of the look tuning control which is needed for classes of HDR content.

The capability metric determination unit (1303) may do something as simple as just use a pre-fixed metric (which is e.g. hard-encoded in the IC), or in other embodiments it may determine the needed look from a metric type indicator (COD_METR) which it receives from the content creator via the received signal S_im in a pre-agreed metadata field. As various HDR scenes may be handled differently, the grader may e.g. communicate that for a first scene in the movie of a sunny outdoors act the metric to be used is the logarithmic ratio (and perhaps the direction the vertical direction, orthogonal to the axis of input luminances, see below), but then when the next scene becomes an evening scene, to get a somewhat brighter look the content creator may dictate that the display tuning should be done with an OETF-based metric (and e.g. in the orthogonal to the identity diagonal direction, or in other words 135 degrees from the input luminance axis). Or, depending on whether the content should be MDR re-graded real-time (or e.g. processed for later viewer and stored on a HDD at the viewer's premises), the color transformation apparatus in e.g. a STB may do some calculation, look at the image statistics, and consider that the metric should be changed a little, or the PB_D should be changed, as if the intended display was just a little darker, resulting in a somewhat brighter image, or any change of the display tuning influencing parameters until the MDR look is judged satisfactory, whether by a human or an automatic image quality analysis algorithm. The receiving side apparatus capability metric determination unit may construct its own metric, e.g. from statistical analysis of sets of images of the movie, but typically it will just choose on of a set of pre-programmed options.

The resultant multiplier determination unit (1310) will in general as elucidated by examples below then position the metric on the luminance transformation map (or actually do something equivalent in its calculations), determine where the display peak brightness falls between the coded images (i.e. whether a more HDR-ish or a more LDR-ish MDR image is needed, at least for some sub-range of pixel colors, or some subset of pixels of the input image Im_in), and then by looking at the shape of the total luminance transformation function determine for each possible input luminance which resultant common multiplicative factor gt is needed to calculate the corresponding output luminance or in factor output color for the corresponding pixel in the MDR image.

So, instead of using the initial common multiplicative factor (g), which codifies a luminance mapping for the image objects according to whatever artistic desire of a grader as to how he wants two dynamic range looks to look, by using our technical color transformation function parameters transforming from a first dynamic range look of a captured scene (e.g. 5000 nit HDR as a principal image) to a second one, e.g. LDR (for driving 100 nit legacy displays), and which was elucidated with FIG. 1, which hence just yields the second artistic reference grading from the images of the first reference grading, a new, resultant common multiplicative factor (gt) is calculated, which characterizes a suitably brightness-scaled or display tuned version of the re-grading giving an MDR image. E.g. the apparatus or method may downgrade from a HDR principal image (which can as said be formulated as a single multiplicative action on RGB pixel colors with a common factor). This yields an intermediate graded image (MDR) which has a suitable look for a connectable display of intermediate peak brightness, e.g. 1250 nit, i.e. all HDR scene objects in the captured image are rendered on that display with a reasonable brightness (as would be desirable for the creator of the content, and pleasing to watch, whether they're cool shadow regions, dreamy ponds, the brightly lit face of a criminal being interrogated by the police, etc.), and that on any given display, and potentially taking other factors into account like viewing environment, etc. And in embodiments in addition to the brightnesses of the pixel colors of the image objects, also the colorfulness of the pixel colors may be optimized as desirable, by applying a suitably scaled version of e.g. a needed desaturation to create bright colored objects in the LDR grade. A major requirement for obtaining correctly graded images for displays of considerably different peak brightness, is that at least the luminances of the various objects are correctly optimized for each display. Otherwise, the viewer may see e.g. some parts of an image which are too dark, and may even be insufficiently discriminatable. Or some objects may have the wrong contrast, e.g. have to little contrast. But because we have found a way to formulate luminance transformations as a multiplication with a g-factor, the same concepts can be applied to color saturation processing also. And color saturation transformation is also a useful processing when needing to convert between images for displays of considerably different luminance dynamic range, since e.g. the grader may want to increase the colorfulness for the darkest parts of a scene when rendered on displays of low peak brightness, e.g. between 100 and 600 nit.

The calculation of gt is done at the receiving side, but it may typically also be done at a creation side to verify what receivers would do. Even in some embodiments the creation side could overrule any receiving-side calculations of the gt values, and directly specify them for e.g. one or more shots of a movie, but we will focus on the simpler calculation embodiments in the elucidation.

One can make a distinction between a "native" look, or more precisely a family of looks for associated displays of various peak brightness (and/or dynamic range), and a re-adjusted look, which has been further tuned according to some principles. There can be various reasons for re-tuning at a receiving side, for which the viewing parameters of display, environment, viewer adaptation etc. ultimately determine what a look should be, but typically in HDR image or video handling chains at least the peak brightness of the display on which the image(s) is to be rendered is of firstmost importance. On the other hand, several parties in the image creation-to-consumption chain could have a say on what an optimal look will be (e.g. the end consumer may have a special view on the matter or need). One may assume that some systems—which we can use to elucidate our embodiments—will allow the content creator to keep some say in what ultimately the optimal "native" look should be on whatever receiving end display the content would be displayed, if he so desires. Our simplest embodiments allow this, because a major part of the look is already encoded in the color transformation specifications which is communicated in first metadata MET_1 associated with the image (e.g. on the same optical disk or image containing medium, or via a same image communication connection), and if one then simply adjusts this to the particular peak brightness of the receiving display, then most of the grader's view on the imaged scene will still be present and perceivable on the ultimately rendered look. In fact, if the color transformation apparatus just applies the metric as is, i.e. without further fine-tuning with look-variability defining parameters like gpr, and then determines the HDR-to-MDR color transformation functions based on the received color transformation (which TMF determines the mapping from e.g. HDR to LDR), then the MDR is determined solely by the difference in grading as encoded in the HDR-LDR transformation functions.

However, other parties could also have a say on the look, and this could be determined with exactly the same technical components of our various embodiments, typical as a re-determination of the native look. E.g., an apparatus manufacturer, say a television manufacturer, may also have a lot of knowledge, and/or a preferred view on how certain types of HDR scene renderings (or the MDR renderings corresponding therewith) should look. E.g., he may desire to make dark basements a little more bright, or maybe even more dark, because he wants to emphasize the above-average dark rendering capabilities of his display. Or he may desire a more or conversely less saturated look than on average. Or he may color process for other display hardware peculiarities, or vendor preferences like a vendor-typical color look, etc. In the past that would be done completely blind on the received image after analysis of it by the television, or just with fixed functions which always give a reasonable result, e.g. of increased saturation, irrespective of what the creator would think about how looks on a same imaged scene should vary between various rendering scenarios (so colors could become oversaturated instead of nicely pastel), but with our present approach the further processing of the apparatus manufacturer can be coordinated with what the artistic creator thinks about the scene (as encoded in his color transformations to go from a look as encoded in a communicated first look image, say 5000 nit HDR, to a second reference look, say legacy 100 nit LDR). And in particular, from this functional re-specification of at least one more dynamic range grading of the HDR scene, the apparatus manufacturer (e.g. a TV maker) has much more relevant semantic information, because the human grader made his choices based on smart particularities of the scene and its image(s), based on which the receiving apparatus can do smarter optimal re-grading calculations. There is even a third party generically which could be offered a say on the ultimate look of the image by our new look re-grading technology. The viewer may fine-tune the look, e.g. typically a little (maybe even with a big step of say up to 3 stops change, but then only on a part of the luminance range, e.g. the 10% darkest colors), via his remote control 1122, if he thinks e.g. that currently the image is partly too dark, because his wife is reading a book next to him.

So our color transformation apparatus relies predominantly on what the grader has specified as his color transformation functions (in metadata MET, more precisely the MET_1 associated with the communicated images Im_in), and which are simple to implement in an IC, and which may need no additional grading attention from the grader. His sole action in some embodiments need not be more than that he (quickly) checks whether such a display tuned MDR video, e.g. a science fiction movie with sun-scorched brilliant planets, or a TV show with various light effects, looks good on an intermediate peak brightness display chosen by the grader, e.g. 1000 nit being a good intermediate (MDR) display for a 5000HDR/100LDR encoding, because it is about 2 stops below 5000 and about 3 stops above LDR, and even that check could be dispensed with, if the grader relies purely on the receiving end for further tuning his native look (i.e. he just specifies his color transformations to grade only one further reference look in addition to his master principal look, say LDR 100 nit, and then all further re-gradings are taken care of by an appliance manufacturer, e.g. color improvement software running on a computer, etc.).

In case he does do some verification or more or less specific specification on how re-grading should preferably happen at a receiving side, the grader then accepts the further grading optimization method currently selected by him (or an automatic suggestion) which gives pleasing MDR images, by e.g. storing the color transformation functions and the principal image on a blu-ray disk, or an intermediate server for later supply to customers, together with whatever information is needed for applying at a receiving side the grading optimization method tuned to a particular connectable display (which in the simpler embodiments would be solely the functions for grading the second image from the principal image i.e. the data for calculating the common multiplicative factor (g) or the luminance mapping function TMF corresponding therewith, but in more advanced embodiments would be additional parameters specifying more precise optimization strategies). The receiving side can then autonomously determine a third grading for the e.g. 1250 nit peak brightness, and e.g. when the color transformation apparatus is incorporated in a professional video supply server via the internet, store this third graded image(s) for when it is needed by a customer, or a group or class of customers.

The color transformation apparatus gets a value of a peak brightness PB_D for a display to be supplied with optimized MDR images, e.g. if only a single display is connected (e.g. the apparatus is incorporated in a television) PB_D may be a fixed number stored in some IC memory part. If the apparatus is e.g. a STB, then it may poll the PB_D from the connected TV. The color transformation apparatus then evaluates how this PB_D relates to the peak brightnesses corresponding to the two graded HDR and LDR images, i.e. the PB of corresponding reference displays for which these gradings where created to look optimal. This relation may e.g. be calculated as a logarithmic ratio gp, or equivalently a relative difference. This ratio is used to come to the optimal good-looking intermediate (semi)automatic re-grading strategy. So the principles of our invention can be applied both on solely a luminance transformation path, or solely a color saturation processing path, or both by applying the same appropriate display-dependent adjustment principle twice but with different color transformation specifications, depending on what the situation or the grader needs for any HDR image or video.

Advantageously the color transformation apparatus (201) comprises a display data input (117), arranged to receive the peak brightness of a display (PB_D) from a connected display, so that it can determine the correct grading for any available and/or connected display at the receiving side, potentially by doing the calculations on-the-fly when watching a video. This embodiment may also reside inside a display, e.g. a television, itself, so that this display can determine its own optimized grading from the data of our HDR encoding (e.g. PB_D being stored in a memory). In such a manner, our HDR encoding technology in fact encodes a bundle of looks on a HDR scene, which can be likened e.g. to how a multi-view system can encode various differently angled views on a scene, but now very differently the differences happen in color space. Contrasting embodiments may reside e.g. in professional video servers, which pre-calculate a number of gradings for various types of display with peak brightness around particular PB_D class values, for later supply to a consumer, or fine-tuning as to their look by further color graders, etc.

Embodiments may determine further variables of the display tuning, e.g. the color transformation apparatus (201) may further comprise a direction determining unit (1304) arranged to determine a direction (DIR) with respect to the axis of luminance of the input colors, and have the scaling factor determination unit (200) comprise a directional interpolation unit (1312) arranged to determine a luminance for a pixel of the output image (IM_MDR) from a luminance of a pixel of the input image (Im_in) by positioning the metric along the direction (DIR). As one useful example, our technology can interpolate in the horizontal direction, i.e. determine on the map of the luminance transform which output luminance corresponds to an input luminance on the x-axis. Our further research has shown that it may be useful to rotate the interpolation direction for determining where an intermediate MDR corresponding to PB_D should be located, and how it should be color processed, because various luminance transformations have various definition and behavior, and such different tuning may create e.g. a brighter look in at least some sub-range of the luminances (e.g. some functions may be defined with nodes between segments having various luminance transformation behavior, such as the stretch of the dark grays, with fixed input luminance position, and then a directional interpolation can change this). In particular we have found the 135 degree position from the input luminance axis an interesting position, since one then orthogonally tunes compared to the identity transformation, and e.g. extrapolations may then be initially defined as largely symmetrically mirrored compared to this diagonal). We will show below how to deploy the metric then along this direction DIR, and the skilled person should then understand how one can derive mathematical equations from this, by doing geometry.

Again this direction may e.g. be determined by the receiving side apparatus autonomously, e.g. based on its classification of the type of HDR image, or it may be communicated as a direction indicator COD_DIR from the content creation side. We will show an advantageous embodiment which can do the calculations by applying a rotation of the map containing the luminance transformation function, performed by the directional interpolation unit 1312.

A common multiplier determination unit (1311) will then convert the required color transformation to obtain the MDR look in the various needed gt factors for the multiplication of the input colors.

Advantageously the color transformation apparatus (201) has its scaling factor determination unit (200) further arranged to obtain a tuning parameter (gpr; gpm) from second color processing specification data (MET_2), and is arranged to calculate the resultant common multiplicative factor (gt) corresponding to a different position on the metric than the position for the display peak brightness (PB_D) which different position is based on the value of the tuning parameter. As said above, the metric determines what should be a largely reasonable MDR look, if it receives nothing else from e.g. the content creator or further image analysis and generic vendor-specific HDR know-how, i.e. then the MDR look is already largely good for many kinds of HDR scene, precisely because it is already optimally determined based on the received color transformation functions (e.g. custom curve CC), which determine how various gradings of the HDR scene should change, at least from the first PB range endpoint (e.g. PB_H) to the second (PB_IM2 is e.g. then PB_L). However, one may need a faster, more aggressive change to the LDR look for some images, or even some parts of some images corresponding to some kind of regions or objects like dark basements, and a less aggressive than "average" (as determined by merely using the metric, and direction) change depending on the deviation of PB_D from PB_IM1 for other situations. This should be specified by the grader in as easy as possible a manner. In the simplest embodiments of our technology the grader can use one single parameter (gpr) to indicate how much the to be used M_PB_U point corresponding to the MDR calculation point should lie closer to e.g. PB_H on the metric, than when "blindly" calculated by the receiving side apparatus by putting PB_D on the metric.

E.g., in some embodiments the scaling factor determination unit (200) is arranged to determine the different position by applying a monotonous function giving as an output a normalized position on the metric as a function of at least one input parameter (gpr) lying between an minimum e.g. a negative mn_gpr for extrapolation or 0 and a maximum (mx_gpr), and of course dependent also on some input value correlated with the display situation i.e. PB_D (gpr could be e.g. a measure of curvature of a curve bending around the linear one of FIG. 15, etc.). In case of direct determination of the position on the metric, the input value may be PB_D itself, or it may be some function of this PB_D, e.g. the metric which is used. This gpr value can be set by the grader, e.g. by a knob 1510, or calculated by artificial intelligent image analysis at the receiving end. Since one can formulate the change, (at least for interpolation, and this can correspondingly be adapted when extrapolation is needed) needed to get the MDR look, as a color transformation which is an identity when theoretically calculating the HDR grading, or in general the received principal grading, from itself, and the other extreme of the range, i.e. the e.g. 100 nit LDR look can be obtained by applying the communicated luminance transformation (i.e. "in full"), one can see this as applying the multiplicative change, between either not at all, i.e. multiplication by 1.0, or to the fullest extent, i.e. multiplication by g corresponding to the received metadata for calculating the LDR look from the received HDR image. From this, for whatever the actual multiplication value for the various input luminances, one can define a continuous function like exemplified in FIG. 15, which applies the color transformation to the fullest extent (m_MT_norm=1) or not at all, or anything in between, depending on an input characterizing the display scenario, and the at least one gpr value characterizing the kind of re-grading one would desire.

In case one has an embodiment of the color transformation apparatus (201) in which the scaling factor determination unit (200) uses the logarithmic-based metric, and calculates the gt factor by raising the g value to that calculated correction ratio, the skilled reader can understand it may be advantageous to correct this ratio. This can pragmatically be done by obtaining a tuning parameter (gpm) e.g. from the color processing specification data (MET), and then calculating a tuned power value (gpp) being the ratio (gp) coming out of the logarithmic metric calculation of what PB_D corresponds to, raised to a power being the tuning parameter (gpm), and then a further tuned version of the common multiplicative factor (gtu) being the initial common multiplicative factor (g) raised to a power equal to the tuned power value (gpp) is calculated, which gtu will be used as usual by the scaling multiplier (114) to multiply the (e.g.) linear RGB input colors with. It should go without saying, but we'll say it to make it fully clear to the skilled reason, that although this power value gpm looks like a gamma value, it has absolutely nothing to do with the gammas known from displays, or from general image brightening, because this is now a control parameter for the aggressiveness of the needed tuning towards the other graded look for some needed MDR image color corresponding with some PB_D, depending on the particularities of the HDR scene, and e.g. the type of artistic optimizations which were necessary for obtaining a reasonable LDR grading. The fact was only that a power function was a pragmatic manner to design a behavior of a type like elucidated in FIG. 15, and the fact that some mathematical functions are universally deployable is a mere mathematical coincidence.

Preferably, we also offer a technical solution allowing the content creator an even further say on how the intermediate gradings will look. On the one hand we introduced for the solution a constraint that the grader shouldn't be bothered by too much additional grading, as grading time is costly, and e.g. some productions may have already run over budget before post production, and the grader has already spent quite some time on creating the master HDR grading (yet, if hardly anybody can see that on their actual display, it makes sense not to fully ignore the final rendering issues), and then an LDR look associated with it (or an LDR look from e.g. a cinema version, and then a corresponding HDR look for HDR television viewing, or other workflow alternatives). On the other hand, although when already having put some of the complexity in gradings on either side of a range of required intermediate gradings for various PB_D values (note again that this invention and its embodiments is not limited to this elucidating typical scenario, as the technologies may also work to e.g. grade upwards from the master 5000 nit grading to e.g. 20,000 nits, starting from the same functions for downgrading and suitably changing them, or with additional functions for upgrading transmitted in the metadata, etc.), i.e. when already having an HDR and LDR grading, the determination of intermediate gradings may be simpler. Prima facie and in general however, the determination of an intermediate grading may still be relatively complex, in particular if there are a larger number of stops between the peak brightness of the MDR grading, and the original grading at either end, LDR and HDR. So ideally the grader should thoroughly create a third MDR grading, or at least sufficiently thoroughly, which he may do with our more advanced embodiments. However, we offer a number of simple solutions, which he may use instead, solely, or if required with a small additional fine-tuning of e.g. a part of the global luminance mapping for the intermediate graded image generation (or as a post-correction on the image resulting from our above optimization method with a further function), or local fine-tuning of some object which is critical and didn't simply result as correctly graded by our simple embodiments, etc.

In this embodiment, the grader can quickly create intermediate MDRs by specifying only one further tuning parameter gpm or gpr, which is also communicated in the metadata MET, and specifies how much intermediate gradings will look like the LDR or the HDR grading, or in other words how quickly when going through the various intermediate peak brightnesses of an intended connected display the intermediate MDR grading changes from a HDR look to a LDR look or vice versa in the other direction (e.g. how bright a particular dark object stays when the display peak brightness keeps increasing).

Of course in addition to a 1-parameter fine-tuning function (for going quicker or slower to the other grading when removing PB_D from the starting point, e.g. PB_H), one may define further parameters specifying how exactly a scene-dependent more or less aggressive display tuning should happen, e.g. as with gptt of FIG. 15. In principle in our technical framework one can define arbitrarily complex specifications of how the look should move between the HDR and LDR look for various intermediate PB_D position, as deviating from the pure metric-based approach.

Advantageously a further embodiment of the color transformation apparatus (201) has the scaling factor determination unit (200) further arranged to obtain at least one luminance value (Lt) demarcating a first range of luminances of pixel colors (or corresponding lumas) of the input image from a second range of luminances, and wherein the scaling factor determination unit (200) is arranged to calculate the tuned common multiplicative factor (gtu)—i.e. the more specifically determined embodiment of the resultant common multiplicative factor gt—for at least one of the first and the second range of luminances. When we say luma we mean any codification of a luminance or any other pixel brightness measure (correlated with the length of the color vector), which values can be equivalently calculated into each other. E.g. in some practical embodiments it may be advantageous to make this Lt value a Value demarcator, where Value is defined as max(R,G,B), i.e. the one of the color components of an input color which is the highest. I.e. when the highest color component, say the red one, is higher than e.g. 0.3, the color is classified in a first regime, and otherwise in a second regime.

With this embodiment the grader can select particular interesting sub-ranges of the luminance range of the principal image (and consequently via the color transformation also the derivable image e.g. the LDR image), and treat them differently. In the above discussion we focused mainly on how fast one should move from the HDR grading to the LDR grading (or vice versa if the principal image Im_in was an LDR image), and how this can technically be achieved in some practical embodiments by even 1 single control parameter gpr or gpm. This adaptation will then typically be done so for all pixel colors in the input image, i.e. whatever their original brightness, we assumed that they can be similarly display-tuned, because the difference in approach is already largely encoded in the shape of the luminance transformation to grade between the original HDR and LDR look of the grader. However, there may be various semantic parts in HDR scenes, e.g. the colorful cloths in relatively darker areas of a souk and the bright outside seen through the entrance of the souk, and typically there may be various optimizations involved to map the various parts in e.g. a relatively small LDR luminance range, whilst still making an artistically convincing image. Or, the dark regions may be very critical in a night scene, and the grader may desire to keep them rather bright by keeping that sub-range of the luminances close to the LDR look up to relatively high peak brightnesses like e.g. 800 nit, whilst keeping a nice HDR contrast in the upper regions, e.g. a part of houses close to a light pole, or a part of a cave which is illuminated by the sun falling through a crack in the roof, or colorful backlit commercial boxes, etc. So in our more advanced embodiment, the grader may want to specify the tuning, in particular how aggressively the MDR grading moves towards the second image grading for successive PB_D steps, in different manners for different parts of the scene, in particular parts of the images of different pixel luminances, and hence it is still advantageous to have a mechanism allowing the grader to further specify his desired control on that aspect.

The grader typically specifies a different gpm value for either side of the at least one region demarcating luma value (Lt), and more values if further regions are specified along the range (e.g. darks, mediums, and brights, and hyperbrights). One of the two regions may use a default value, e.g. gpm=1, which means using the strategy of our first embodiment, which means that in some embodiments the grader need only specify one particular gpm value for one of the two regions with luminances on either side of Lt. But he may also specify and transmit a dedicated gpm value for both sides: gpm_1 and gpm_2.

A further embodiment of the color transformation apparatus (201) has the scaling factor determination unit (200) further arranged to determine a smoothing range of lumas situated around the at least one luma value (Lt), and is arranged to interpolate the tuned common multiplicative factor (gtu) between its value determined on either side of the at least one luma value (Lt). To guarantee smooth transition behavior, which may not be needed for every HDR scene and MDR calculation scenario, and no inappropriate pixel luminances for any object of the intermediate gradings (which in particular could be critical for certain gradients, e.g. in the sky, or a lit spherical object), this embodiment allows the grader to specify a transition region. He can specify the interpolation depending on how much the interpolation strategy differs on either side of Lt i.e. how much gpm_1 for e.g. the low luminances differs from gpm_2 for the high luminances (typical good values for either may lie between 1.5 and 1/1.5), determine inter alia the width of the interpolation region as a further parameter I_W, and whether it should e.g. lie symmetrically around Lt or asymmetrically apply only to the luminances above Lt (alternatively the receiving apparatus could determine autonomously an interpolation strategy by using specifics on the resultant curve(s) such as that it should be monotonous increasing, or desired constraints on derivatives over a particular instantaneous or over a particular interval, i.e. it will propose at least one strategy until the constraints are fulfilled, etc.). Also, he may in some embodiments specify some desired interpolation strategy by transmitting the function(s) to calculate the required gpm value for each possible luminance in the principal image in the metadata, but by default this will be linear interpolation between the gpp values transmitted for either side of the interpolation region.

Now having given some elucidating embodiments of the color transformation apparatus one can design with the principles of our invention, we herebelow describe some further apparatus variants in which this basic color calculation apparatus can be comprised, in various application scenarios, e.g. apparatuses at a consumer-side, at a content creator side, at a content transmission company site, e.g. in a cable head-end or satellite, or by a internet-based service for re-grading videos, e.g. of consumers, e.g. a marriage or holiday video, etc.

At an encoder side our embodiments can be used in a system for creating an encoding of a high dynamic range image (Im_src), comprising:

an input for receiving the high dynamic range image (Im_src);

an image convertor (303) arranged to convert the high dynamic range image (Im_src) into a master grading (M_XDR) of the high dynamic range image (Im_src);

a color transformation apparatus (201) as claimed in any of the above color transformation apparatus claims arranged to calculate starting from input colors of pixels of an input image (Im_in) being the master grading (M_XDR), resultant colors of pixels a second graded image (M_X2DR), by applying the color transformation (TMF; g);

the color transformation apparatus being arranged to obtain at least one parameter (gpm) and to calculate using the parameter and the color transformation a second image (IM_MDR) corresponding to a peak brightness which is different from the peak brightness corresponding to the master grading (M_XDR) and the peak brightness corresponding to the second graded image (M_X2DR);

a signal formatting unit (310) arranged to convert the second graded image (MX2DR) together with the master grading (M_XDR) into a formatted high dynamic range image (SF_X2DR) suitable for image storage and/or transmission and comprising pixel color data of the master grading (M_XDR), metadata encoding the color transformation, and the at least one parameter (gpm); and an image output (320) for outputting the formatted high dynamic range image (SF_X2DR).

Typically the components will mirror those at a receiving side, but now a human grader (or an automatic re-grading artificial intelligent system) has further technical components to determine what a receiver should do, to create the most perfect intermediate gradings according to the grader's desire.

Here the grader typically starts from original HDR material (Im_src), let's say straight from an HDR camera like a RED camera, or even a system of two differently exposed cameras supplied by the same scene image via a beam splitter. The grader typically wants to make a master HDR grading of this, as explained with the example of FIG. 14, he wants to position the luminances of the various image objects, and their corresponding luma codes, on the 5000 nit luminance axis on the left of FIG. 14. He also wants to make an LDR grading corresponding to that same master HDR image look. Continuing the particular example of the principle image (Im_in) which is actually communicated as a, DCT compressed typically or uncompressed, being a HDR image, in that scenario the graded image M_XDR being output from the first grading would be a HDR image, and then this HDR image would be added to the image signal together with color processing function metadata, and written e.g. to a BD or another physical memory (321), or any other image communication means. In that scenario, the grader would from the master HDR grading create at least one luminance mapping function (say e.g. CC) to obtain M_X2DR in this case being an LDR image, i.e. an image for which the codes would map to a PB_L of 100 nit.

However, we have also a version, and corresponding display tuning embodiments, which we call mode 2, in which the "HDR image" of the HDR scene is actually encoded as an LDR 100 nit image. In this case M_XDR coming out of the initial grading determining the principal image, may be an LDR image. And in this mode, the functions which the grader specifies (CC, etc.) would map this LDR image to an HDR image, which typically is a very close, near identical approximation of the desired master HDR look image. In this mode 2, the Im_in being stored in the image or video signal S_im would be an LDR image, and the luminance transformation (and saturation transformation) functions would be upgrading functions, to derive at the receiving side a HDR image, and also M_X2DR would be a HDR image. In any case, the grader would typically check the look of three images, his original LDR and HDR look images, and an MDR image, on three typical displays, with suitably chosen display peak brightnesses corresponding to those of the images.

So the formatted high dynamic range image SF_X2DR according to our HDR technology indeed encodes a HDR look on a scene, irrespective of whether it actually contains a HDR or LDR principal image.

This system will typically also output at least one tuning parameter (gpm).

One of various iterations may be involved, depending on whether the grader wants to spend more or less time. For real-time transmissions, the grader may e.g. only watch whether the looks (for which the HDR and LDR grading will then typically also involve few operations, e.g. a single logarithmic-like or S-curve transformation set-up based on the characteristics of the scene right before the starting of the show to generate the master grading, and a second one to obtain the second, dependent grading, e.g. LDR out of a HDR master grading) are of sufficiently reasonable quality on three reference displays, and occasionally he may roughly tune a simple dial which e.g. changes a gpm parameter. But when off-line re-mastering is involved, the grader may invest a significant amount of time to come to an encoding of several gradings, e.g. 2 additional MDR gradings between HDR and LDR, and one on either side (an ultra-HDR UHDR, and a sub-LDR SLDR), etc, either some of them by the display tuning embodiments, or some of them by the original dynamic range look image co-encoding embodiments, by full color transformations in metadata, and then display tuning on top of that for intermediate PB_D positions between more than two original communicated gradings. Especially for some more popular programs, in companies intermediate in an image communication chain, e.g. companies which have a business of further selling, transmitting, optimizing etc. existing content, in a re-mastering action for various categories of receivers, there may be an additional grading budget for a human grader to invest more time in creating several more advanced re-grading scenarios, and the mathematical parameters of those various color transformations.

The reader understands that all apparatus variants or combinations can also be realized as image processing methods, e.g. method of calculating resultant colors (R2, G2, B2) of pixels of an output image (IM_MDR) which is tuned for a display with a display peak brightness (PB_D) starting from input colors (R,G,B) of pixels of an input image (Im_in) having a maximum luma code corresponding to a first image peak brightness (PB_IM1) which is different from the display peak brightness (PB_D), characterized in that the method comprises:

determining a color transformation (TMF; g) from color processing specification data (MET_1) comprising at least one tone mapping function (CC) received via a metadata input (116), which color transformation specifies how the luminances of pixels of the input image (Im_in) are to be converted into luminances for those pixels of a second image (Im_RHDR) having corresponding to its maximum luma code a second image peak brightness (PB_IM2), which is different from the display peak brightness (PB_D) and the first image peak brightness (PB_IM1), and whereby the division of the first image peak brightness by the second image peak brightness is either larger than 2 or smaller than ½;

determining a resultant common multiplicative factor (gt; Ls) by first establishing along a direction (DIR) a position (M_PB_D) which corresponds with the value of the display peak brightness (PB_D) on an established metric (1850) which maps display peak brightnesses onto at least luminance transformation functions, the metric starting at the position of an identity transform function, and subsequently calculating the resultant common multiplicative factor (gt; Ls) based on the established position and the therewith corresponding at least a luminance transformation function which is formulated as the resultant common multiplicative factor (gt; Ls); and multiplying each of the three color components of a color representation of the input colors with the resultant common multiplicative factor (gt).

Typically it may be useful if the method determines the position (M_PB_D) also in dependence on the shape of the luminance transformation to transform the input image in the second image (IM_HDR) comprising at least one tone mapping function (CC) as received via metadata.

Useful is also a method of calculating resultant colors of pixels starting from input colors of pixels of an input image (Im_in), characterized in that the method comprises:

determining an initial common multiplicative factor (g) on the basis of color processing specification data (MET) received via a metadata input (116), determining a resultant common multiplicative factor (gt), by firstly calculating a ratio (gp) of the logarithms of firstly a ratio of a peak brightness of a display (PB_D) and a reference peak brightness (PB_H) corresponding to the input image, and secondly a ratio of the reference peak brightness (PB_H) and a peak brightness (PB_L) obtained from the color processing specification data (MET) and corresponding to an image (Im_LDR) which results when applying the color processing specification data to the pixel colors of the input image, and subsequently calculating the resultant common multiplicative factor (gt) as the initial common multiplicative factor (g) raised to a power being the ratio (gp), and multiplying a linear RGB color representation of the input colors with a multiplicative factor being the resultant common multiplicative factor (gt).

Useful is also a method of calculating resultant colors of pixels as claimed in claim 7, comprising the step of receiving the peak brightness of a display (PB_D) from a connected display.

Useful is also a method of calculating resultant colors of pixels comprising obtaining a tuning parameter (gpm) from the color processing specification data (MET), calculating a tuned power value (gpp) being the ratio (gp) raised to a power being the tuning parameter (gpm), determining a tuned common multiplicative factor (gtu) being the initial common multiplicative factor (g) raised to a power equal to the tuned power value (gpp), and multiplying a linear RGB color representation of the input colors with a multiplicative factor being the tuned common multiplicative factor (gtu).

Useful is also a method of calculating resultant colors of pixels comprising obtaining at least one luma value (Lt) demarcating a first range of lumas of pixel colors of the input image from a second range of lumas, and calculating the tuned common multiplicative factor (gtu) for at least one of the first and the second range of lumas. The other sub-range may then e.g. use the default gt parameter determined from the ratio of logarithms specifying the luminance relationship of PB_D, PB_H, and PB_L mentioned above for the broadest embodiments. Some embodiments of the method or apparatus may use either of the embodiments prefixed, or any of them selectable, depending on the situation at hand, which will typically be encoded with further characterizing codes in metadata.

Useful is also a method of calculating resultant colors of pixels comprising determining a transient range of lumas situated around the at least one luma value (Lt), and interpolating the tuned common multiplicative factor (gtu) between its value determined on either side of the at least one luma value (Lt).

As the skilled reader will realize, all embodiments can be realized as many other variants, methods, signals, whether transmitted over network connections or stored in some memory product, computer programs, and in various combinations and modifications, etc.

E.g. in some embodiments, the content creation side can control how any receiving side display should render (intermediate) looks based on what the grader determines on how various dynamic range gradings should look, by communicating this as an encoded high dynamic range image signal (S_im) comprising:

pixel color data encoding a principal image being a master grading (M_XDR);

metadata (MET) comprising parameters specifying color transformations to calculate a second graded image (M_X2DR) from the master grading (M_XDR), characterized in that the encoded high dynamic range image signal (S_im) further comprises a tuning parameter (gpm) to be used for calculating resultant colors of pixels starting from input colors of pixels of master grading (M_XDR) by:

determining an initial common multiplicative factor (g) on the basis of color transformations;

calculating a ratio (gp) of the logarithms of firstly a ratio of a peak brightness of a display (PB_D) and a reference peak brightness (PB_H) corresponding to the input image, and secondly a ratio of the reference peak brightness (PB_H) and a peak brightness (PB_L) obtained from the metadata (MET) and corresponding to an image (Im_LDR) which results when applying the color processing specification data to the pixel colors of the input image;

calculating a tuned power value (gpp) being the ratio (gp) raised to a power being the tuning parameter (gpm);

determining a tuned common multiplicative factor (gtu) being the initial common multiplicative factor (g) raised to a power equal to the tuned power value (gpp); and multiplying a linear RGB color representation of the input colors of the master grading (M_XDR) with a multiplicative factor being the tuned common multiplicative factor (gtu). This signal may comprise further specifying metadata to enable any receiving side apparatus to apply any of our embodiments, such as e.g. one or more luminance demarcators Lt, etc.

Useful is also a system for creating an encoding of a high dynamic range image comprising a user interface (330) allowing a human grader to specify the at least one parameter (gpm), and an image output (311) for connecting a display (313) having the display peak brightness (PB_D).

Useful is also a system (1130) for determining colors to be rendered, comprising a color transformation apparatus (201) and a user interface (1120) for inputting at least one user-specified parameter which changes at least one of the metric, the tuning parameter (gpr; gpm) or the display peak brightness (PB_D) to be used by the color transformation apparatus.

Useful is also a method of calculating resultant colors (R2, G2, B2) of pixels of an output image (IM_MDR) for a display with a display peak brightness (PB_D) starting from linear three component input colors (R,G,B) of pixels of an input image (Im_in) having a maximum luma code corresponding to a first image peak brightness (PB_IM1) which is different from the display peak brightness, comprising:

determining a color transformation (TMF; g) from color processing specification data (MET_1) which comprises at least one tone mapping function (CC) for at least a range of pixel luminances, which color transformation specifies the calculation of at least some pixel colors of an image (IM_GRAD_LXDR) having corresponding to its maximum luma code a second image peak brightness (PB_IM2), which is different from the display peak brightness (PB_D) and the first image peak brightness (PB_IM1), and whereby the division of the first image peak brightness by the second image peak brightness is either larger than 2 or smaller than ½;

determining a resultant common multiplicative factor (gt), by performing:

determining a metric for locating positions of display peak brightnesses between the first image peak brightness (PB_IM1), and the second image peak brightness (PB_IM2) and outside that range; and determining from the display peak brightness (PB_D), the metric, and the color transformation the resultant common multiplicative factor (gt); and the method further comprising multiplying linear three component input colors (R,G,B) with the resultant common multiplicative factor (gt) to obtain the resultant colors (R2, G2, B2).

Useful is also a method further comprising determining a direction (DIR) with respect to the axis of luminance of the input colors (R,G,B), and in which the determining a resultant common multiplicative factor (gt) comprises determining a luminance for a pixel of the output image (IM_MDR) from a luminance of a pixel of the input image (Im_in) by positioning the metric along the direction (DIR).

Useful is also a method further comprising obtaining a tuning parameter (gpr; gpm) from second color processing specification data (MET_2), and calculating the resultant common multiplicative factor (gt) corresponding to a different position on the metric than the position for the display peak brightness (PB_D) which different position is based on the value of the tuning parameter.

Useful is also a method comprising obtaining at least one luminance value (Lt, Ltr1) demarcating a first range of luminances of pixel colors of the input image from a second range of luminances, and calculating the resultant common multiplicative factor (gt) for at least one of the first and the second range of luminances.

To be able to communicate the required information from a creation side on which artistically appropriate looks are generated to any usage site of those images, it is useful to have a technical specification of a high dynamic range image signal (S_im) comprising:

pixel color data encoding a principal image being a master grading (M_XDR) of a high dynamic range scene;

metadata (MET) comprising parameters specifying a color transformation to calculate a second graded image (M_X2DR) from the master grading (M_XDR); characterized in that the encoded high dynamic range image signal (S_im) further comprises a tuning parameter (gpm) to be used for calculating resultant colors of pixels starting from input colors of pixels of master grading (M_XDR) by determining a resultant common multiplicative factor (gt) which is determined based on the color transformation and the tuning parameter and a display peak brightness (PB_D) for a display to be supplied with an image comprising pixels having the resultant colors.

This signal may travel on any signal communication technology, or reside in any memory product comprising the pixel color data, the metadata (MET) and the tuning parameter (gpm).

Whereas some embodiments allow the grader a greater or lesser degree of control over any re-gradings for any rendering situation, involving typically at least a particular display peak brightness unequal to that of the reference display associated with the communicated image(s), other embodiments (irrespective of whether the grader desires to communicate any re-grading specifications, i.e. anything in addition to his color transformations to re-grade the communicated images to one further dynamic range look only communicated parametrically, e.g. LDR from HDR) allow a receiving apparatus to by itself further re-grade a look for an intended rendering characteristic such as an MDR 1500 nit display, in particular by means of color transformation apparatus (201) embodiment comprising an image analysis unit (1110) arranged to analyze the colors of objects in the input image (Im_in), and therefrom determine a value for at least one of the tuning parameter(s) (gpm or gpr etc.), or peak brightness of a display (PB_D) to be used in the calculation of the resultant common multiplicative factor (gt), or metric, or direction, or any parameter or combination of parameters according to any of our embodiments allowing the specification of a final multiplicative parameter g_fin, to obtain the colors of a final re-graded image (R,G,B)_radj.

In particular, it may also be useful if the apparatus has means to allow an ultimate viewer (e.g. a television viewer at home) to have an influence on the look, e.g. by re-specifying the gpr parameter by himself, e.g. by giving it a small offset in either direction, e.g. gpr v=gpr+k*0.1, with k being selected from {−3, −2, . . . , 3}, or in general gpr+k*N, with N a small step size. This enables to change the look somewhat, but in coordination with what the content grader has specified as being relevant for this scene, when re-grading it, i.e. in accordance with his HDR-LDR color transformation functions which he has communicated in the metadata corresponding to the (video) image(s).

Any method or apparatus technology may be realized in software, realizing the invention by all the corresponding needed steps being coded in software for instructing a processor to perform them, the software being on some memory and loadable therefrom.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which the reader understands serve merely as non-limiting specific exemplary illustrations exemplifying the more general concepts which can be realized in other manners, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions (and how they may be shown on a display). It should be clear to the skilled reader that—given the complexity of the matter and the various alternative realizations one could make—we have for conciseness of the teachings shown some components only in some images, but that those components can mutatis mutandis be added to the other various embodiments too. It should also be clear that some Figures describe aspects of the embodiments at any higher level of abstractness, e.g. at technical framework level.

In the drawings.

DETAILED DESCRIPTION OF THE DRAWINGS

Figure 1:
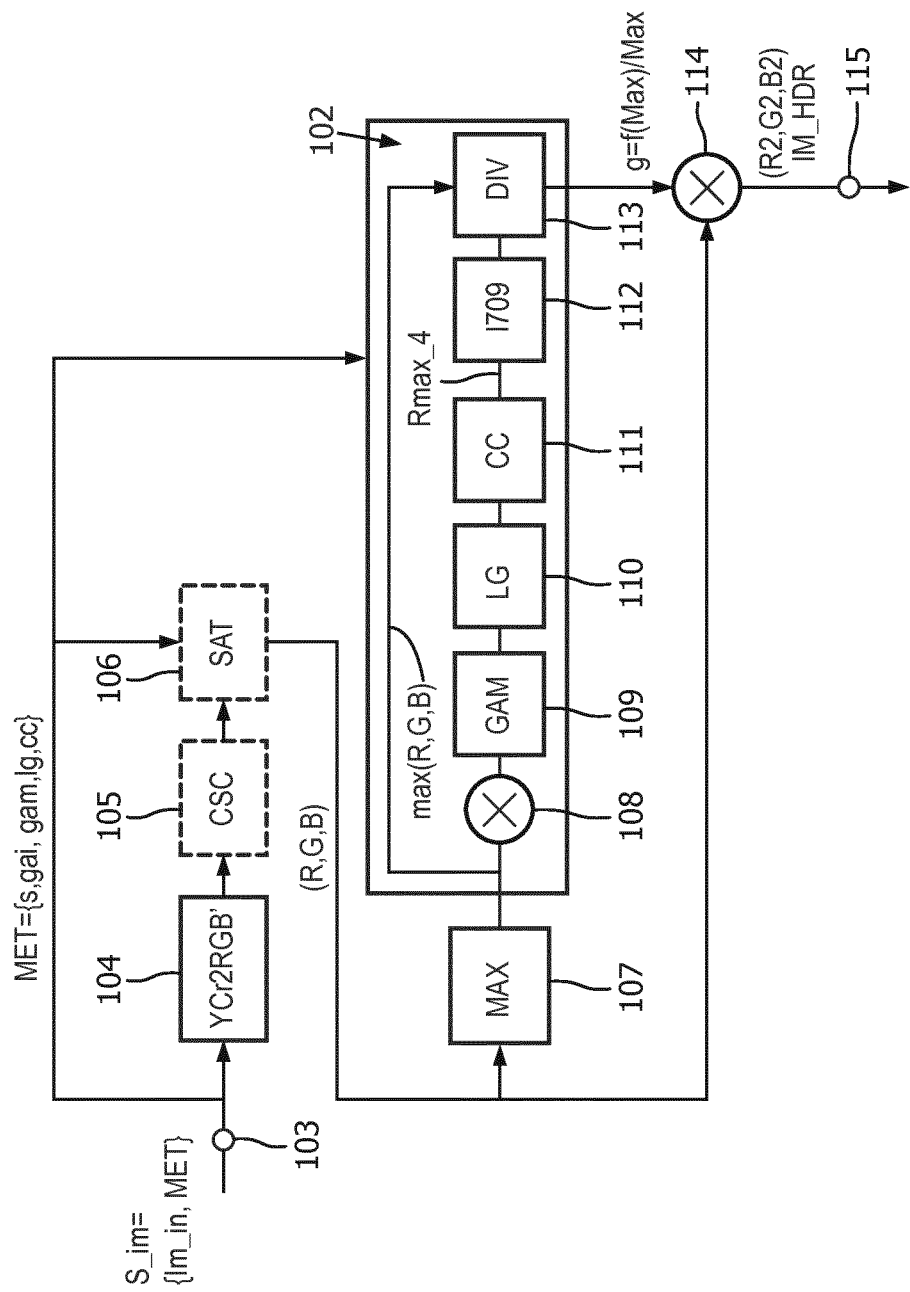
FIG. 1 schematically illustrates an exemplary apparatus for creating a secondary (original look from the creator, specifying how a scene should look if rendered on a reference display conforming to certain specific capabilities like a particular peak brightness) grading of different dynamic range from an input master grading (which for simplicity of understanding may e.g. be a HDR master grading), upon which applicant wants to improve with additional technical components in this application, for easily allowing the creation of further gradings, i.e. correct looks for other dynamic ranges.

In the LDR or SDR video coding era (SDR is standard dynamic range, namely a legacy encoded video, with coding peak brightness PB_C=100 nit by definition, and a ITU-R BT.709 (Rec. 709) EOTF for associating luma codes with luminances, or nonlinear RGB' components with linear ones), video handling was relatively simple technically. In fact, there was no real mention of a coding peak brightness (or brightest white which the codec represented as an amount of nits which a television or display rendering the image needs to make). That concept didn't exist and was not necessary, as one can verify by it not being prescribed in e.g. NTSC or PAL analog video coding, or Rec. 709 digital video coding as used in MPEG encoding. A chromaticity (i.e. yellowness) of the white is defined (x=0.3127; y=0.3290), but not a luminance value. This is because there was a majorly different philosophy at the time, namely the relative rendering paradigm, which involves that the maximum code (e.g. R=G=B=255) is rendered at whatever display peak brightness PB_D a display can generate. If you happened to buy a 80 nit TV, you would have somewhat dimmer images, with a 80 nit white, and if you bought a high end 200 nit PB_D display, you would see the same whites brighter. This not actually caring about which white one encoded worked fine in that SDR era, because on the one hand human vision is to a great extent relative (so as long as there were colors which were yellower than the chosen white the viewer would see them as yellows, and if you had regions of 18% the luminance of the white, whatever that was on your TV, you would see those as middle grey), and secondly, because there was not such a large difference between a 80 nit and 200 nit PB_D display. If the white was already treated with relative technical disinterest, the blacks were totally ignored (if nothing else is mentioned, one typically assumes black to be zero, or as good as zero, but anyone wanting to zoom in on details realizes that not only various displays produce different blacks because e.g. an LCD unlike an OLED leaks some of the backlight through closed pixels, but more importantly, the perceived black is influenced by the viewing environment illumination).

All this changed in the HDR era, especially if one has the ambition to be able to show almost anything, i.e. high dynamic range images, and also in various situations, such as e.g. a dark home cinema room in a consumer's attic, or daytime viewing.

One could summarize that the HDR era started when the SMPTE ST.2084 HDR EOTF was standardized in 2014 (applicant designed a similar luma code allocation function, which is Eq. 6 below). This highly steep function shape allowed to encode the much higher dynamic range pixel luminances of HDR images, i.e. with darks which are much deeper compared to white, as compared to the maximally 1000:1 dynamic range that the OETF of Rec. 709 can possibly encode. So a straightforward coding of (sole) HDR image luminances by calculating corresponding lumas with this 2084 EOTF was developed, called HDR10.

The issue, which was not recognized by everybody, but recognized by applicant, is however that this is an absolute encoding. This means that now one associates with the maximum code (e.g. in 10 bit R=G=B=$2^{10}-1$=1023) a luminance of e.g. 1000 nit. This means not just that anything in the scene above 1000 nit cannot be encoded, unless one agrees to encode it with representative luminances lower than 1000 nit, but also, that always the maximum code should render as 1000 nit on any display, and a code below (e.g. R=G=B=1000) should render as a fixed luminance determined by the shape of the 2084 EOTF.

This has advantages and disadvantages. A major advantage is that for the creation of an image per se, one has now a unique definition of the image, i.e. what a display should render as pixel luminances. Up to 2014, any content creating artist had (perhaps surprisingly looking at it from this moment in time backwards) absolutely no way of knowing what the image would be that he created, i.e. how any consumer would see it. If one designed a perfectly lit viewing room, and the creator made a nice looking image (e.g. with clouds which needed to have a certain thunder-filled darkness, which he checked on his creation side color grading reference monitor), then perhaps hopefully if one put a 100 nit SDR display in that room, and rendered the image (i.e. relatively with coded white of coding peak brightness PB_C rendered at display peak brightness PB_D) one would see nicely dark stormy clouds, as intended. But if one bought a new 1000 nit PB_D HDR display, those dark clouds may look very bright, perhaps almost glowing even, certainly a very different artistic look. With the 2084 EOTF however, the content creating artist could design his images with appropriate HDR codes, so that on no display the clouds would be brighter than e.g. 80 nit, absolutely.

However, although simplistic and inferior, and by now step by step being proven insufficient in the market, the creators of the relative rendering technology were not totally wrong. For various above-mentioned reasons regarding inter alia human vision, and viewing environment and display properties variation, sticking too strict to an absolute paradigm is also incorrect, and insufficient. So something equivalent is needed, able to do some "relativation", and in an appropriate manner as needed (and as pragmatically realizable given ever present practical limitations like IC complexity, or artist's available time), which is what applicant developed as display tuning. Below will be described various embodiments and components, for which the skilled person should from our way of exemplifying readily understand which merely illustrative components are readily supplemented or re-combined with the other variants described, or equivalents.

Before diving into deep technical details of various embodiments, the reader may first want to acquaint himself with the technical (and artistic) desire behind the present concepts, to make sure he well understands the differences between a mere image coding, and a display optimization strategy co-designed around a HDR coding technology.

Figure 14:
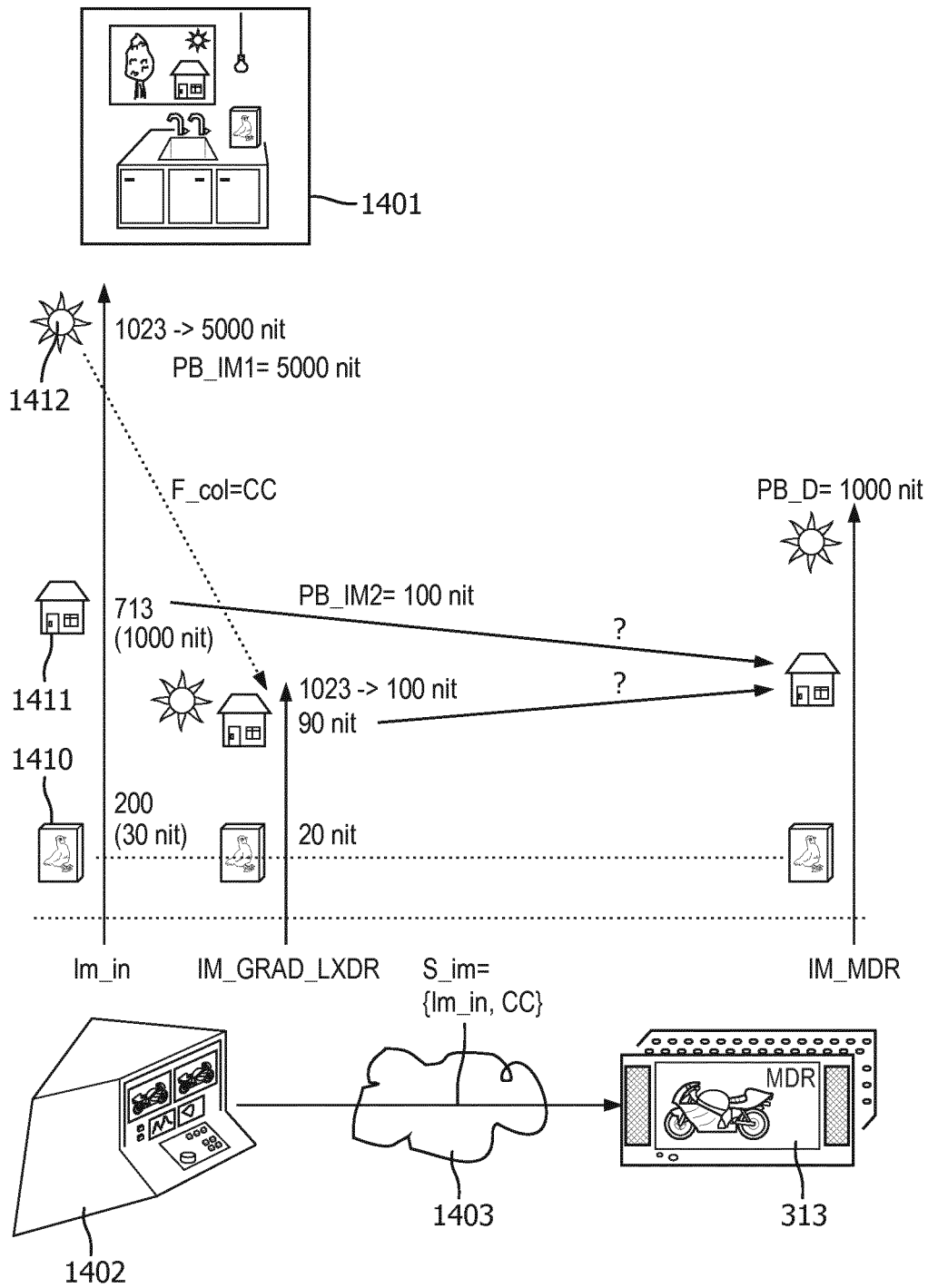
FIG. 14 shows an example of a possible HDR scene, of say a movie, to elucidate to the reader some needed basic concepts of our HDR technical chain and problems handling.

Thereto he may start by studying FIG. 14 and below accompanying text, and ponder upon the fact that if some content creator has done effort to make only two optimally graded images for two different displays (e.g. of 5000 nit respectively 100 nit PB_D), how an optimal image for e.g. a 700 nit or 1800 nit PB_D display can be derived, automatically because in several applications one doesn't want human graders to spend too much time on grading several version images of the same HDR scene, in particular if a coding technology is designed to only communicate two different dynamic range look images for any HDR scene. In view of the possible complexity of images, and artistic desires, this is not a trivial task, which needs a sufficient amount of technology to be able to handle the requirements. Just two possibilities of what may be needed for the optimally looking images across a spectrum of various possible PB_D displays at any receiving side is illustrated with FIGS. 35 and 36, and that is just the requirement when having various PB_D displays in a reasonably fixed viewing environment, but on top of that there may typically be a second optimization pass optimizing for a characterized available viewing environment, e.g. a typical front place reflection which creates a variable minimum perceivable black as a function of the amount of environmental illumination. These various factors will be detailed below with various alternative, complementary or additional components, for handling what is needed in systems from the simpler (e.g. unmodified camera and mobile phone IC) to the more professional but more complex and expensive (e.g. in a professional cinema chain).

Figure 2:
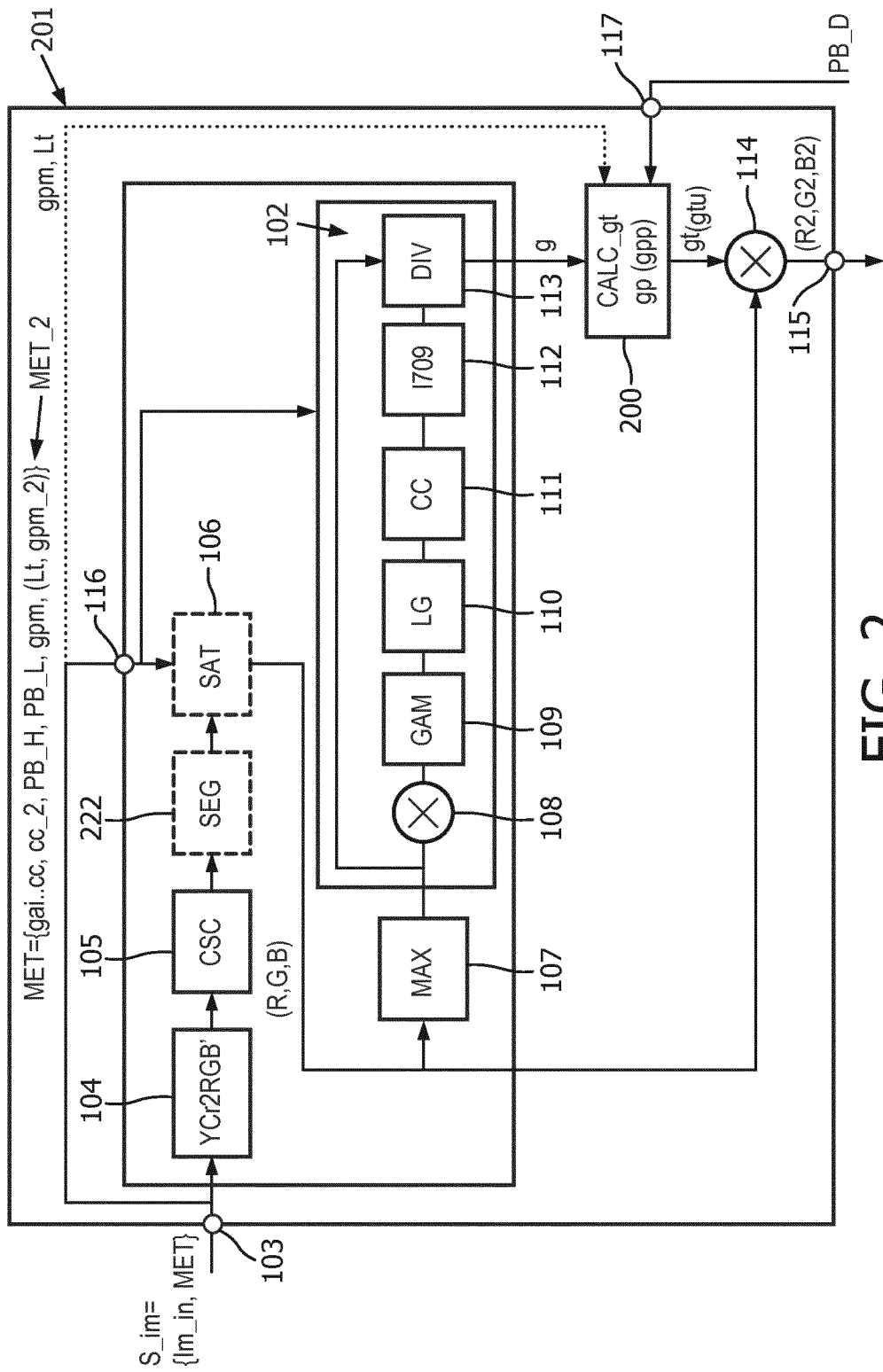
FIG. 2 schematically illustrates an exemplary core calculation part enabling the creation of at least one further grading (which we will call an MDR grading), from the information specifying two initial gradings which may be received via some image communication means from a content creation side, or being created at the same side, at least one being a HDR grading.

FIG. 2 shows an exemplary elucidation of a possible embodiment of our novel color transformation apparatuses, which we assume for now is comprised in some receiving side apparatus (e.g. a television, or computer, etc.). We assume the luminance mapping part is the same as in FIG. 1 (although as said the principles can also be formulated in various non-linear color representations), except that here we disclose also a potential embodiment option of doing various spatially localized mappings. There may be further metadata communicated and received, which allows a segmentation unit 222 to discriminate first type pixels from second type pixels. E.g., a part of the sky seen through a small side window, may get a somewhat different luminance mapping than the same sky seen through a large main window. I.e., at or near spatial position (x,y)_1 pixels with colors (Y_sky, u'_sky, v'_sky), i.e. in particular with luminances having Y_sky values within a range, e.g. brighter than a threshold luminance, in which x and y are spatial pixel coordinates, and Y is a luminance and u' and v' CIE 1976 uv coordinates of blue sky pixels, gets another transformation to another Y_sky_out_2 than pixels having even the same input (Y_sky, u_sky, v_sky) colors but residing at different spatial positions (x,y)_2. If the segmentation unit just classifies the pixels, and loads different mapping parameters for coming to an initial common gain factor depending on whether the pixels are classified first versus second identified region, the rest of the processing can be identical to what is explained with FIG. 1 (e.g. two parallel calculation paths can be used with pre-calculated LUTs, etc.). The reader should understand that the processing for obtaining the second original graded image (e.g. LDR) from the communicated image (say HDR), need not be the same as the local processing for determining a display tuned MDR image, by which we don't mean simply that of course the exact values of functions and parameters may differ, but also the rationales leading to high level transform shapes in impacts may differ, but at least if one has received information in metadata which allows the segmentation of particular sets of pixels, typically in semantically special image objects, one may also do the display tuning separately adapted to those regions or objects, e.g. boost a fireball quicker towards a HDR look, in case the PB_D of the display already allows for some HDR effect rendering, i.e. more quickly than the rest of the scene which can be tuned more gradually over the various possible intermediate PB_D values. Again the various parameters gai, cc etc. are read from the metadata and send to the various units for doing the color calculations (in particular luminance changing calculations), but now e.g. the second region gets its own generally shaped luminance mapping curve cc_2, whereas the main region (the larger part of the sky seen through the window, and e.g. all pixels of a room interior) gets transformed with curve cc. PB_H and PB_L are advantageously stored as metadata specifying the two gradings (in particular what the codes of the grading mean exactly, or in other words for which reference rendering conditions those gradings have been made), and also read from the metadata and send to the scaling factor determination unit 200 which is arranged to calculate a resultant common multiplicative factor (gt) based on the values of PB_L, and PB_H, and PB_D wherever that PB_D value comes from (e.g. typically a connected display communicates its peak brightness via a data input 117). FIG. 2 elucidates some basic properties of a display PB_D-adaptive tuning, in a manner which calculates a different gt parameter than the one which would be employed for mere decoding the other one of the pair of HDR/SDR images than the one which his actually communicated (in case we communicate a HDR image of the HDR scene, then it can be conceptually calculated from itself by using some identity transform, and the SDR image can be calculated by applying at least some function which maps any occurring HDR luminance or luma to a corresponding SDR luminance or luma as the content creator would prefer, and in case an SDR image is communicated as the sole image pixel data for any HDR look image of the original HDR scene, then an identity transform will map SDR to SDR, and some optimally determined at the creation side and communicated function will map to the HDR corresponding image of the pair). Although we start the elucidation by this operation working with a chain of sub-transformations (GAM, LG, CC, . . . ), working multiplicatively on linear RGB components via multiplier 114, and the function to be actually calculated by a multiplication with gt or gtu being defined by a division of a function being applied to the max(R,G,B) which is then divided by the luminance of the input pixel, the reader should understand that falling in the principles of the embodiments one can vary on those components. E.g. mutatis mutandis one could directly scale Y'CbCr values, or one could use a single LUT in the part 102, and one could apply this LUT directly to the luma values of the input pixels as they are being processed instead of on the calculation max(R,G,B). And more relevant than these detail-variations, one could vary on how strongly a look should tune, in which manner, according to which metric, i.e. how it would vary with the possible PB_D values of available displays, according to certain particular apparatus-built-in or communicated desires of content creators or apparatus manufacturers, or even viewers when using their STB or TV user interface, etc. which will be the tuning properties of an embodiment.

Advanced embodiments allow the content creator to specify and transmit a further parameter determining the grade optimization, namely a tuning parameter (gpm), which will typically be a real number, e.g. 1.253 (or a codification thereof, e.g. a multiplication by 1000 and rounding to the nearest integer, etc.). Typically values up to 1.5 and down to 0.6 will suffice for embodiments which work on the modification of the logarithmic metric by changing the power which determines the gt value as shown below, but in general the software of the color grader will have reasonable limits beyond which the re-grading behavior becomes too extreme (one doesn't expect that for a 300 nit display one should immediately implement the look, i.e. drive it with the normalized luminances of that look, of a high quality HDR image, since such a display cannot faithfully render this, which the grader will see as e.g. areas which are way too dark, hence whatever the limits in practice he won't want to chose the values so high anyway).

Figure 4:
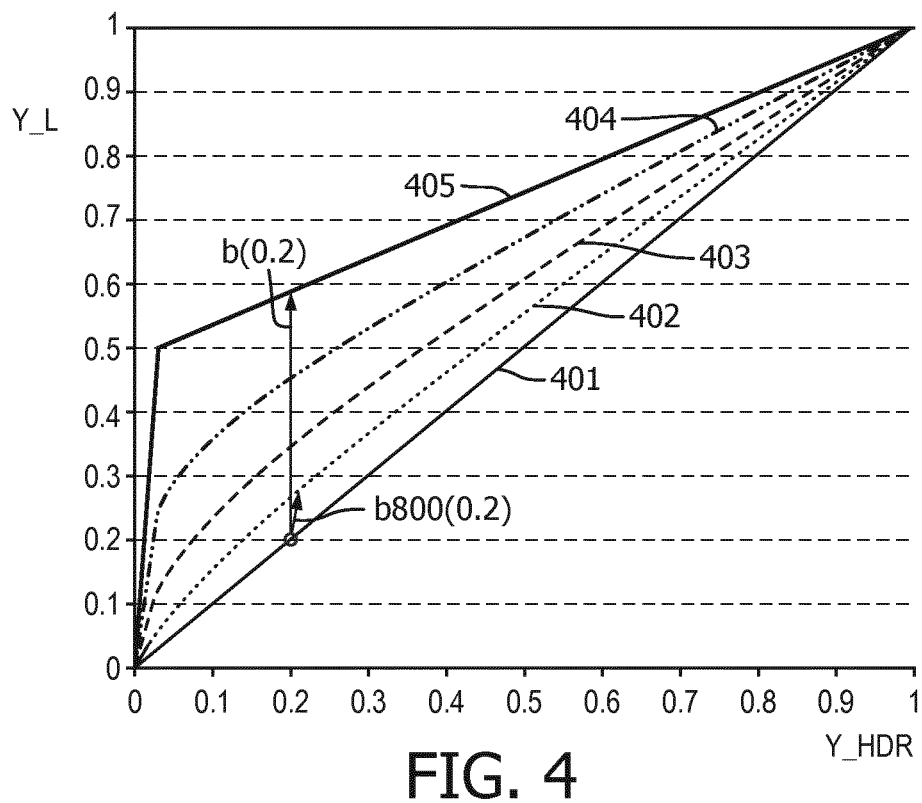
FIG. 4 schematically illustrates the results of using a simple embodiment for the creation of three exemplary intermediate gradings (between an original LDR and HDR grading as created by the color grader of the content creator), represented as the (relative, i.e. normalized to 1.0) luminance mapping curves for mapping an input HDR grading luminance Y_HDR to an output luminance Y_L for a desired third MDR grading, on the basis of a luminance mapping curve for generating the second grading from the master grading, the second grading in this example being an LDR grading for a 100 nit display.

FIG. 4 gives an example of a very simple embodiment of our display optimization of a HDR image. We assume we need to map the input luminances Y_HDR of an HDR image (i.e. the principal image is a 1600 nit grading) as input to output luminances (called Y_L in this graph) for any desirable grading. E.g., curve 405 gives the total strategy (which corresponds to all units of FIG. 1 performing their luminance transformation, i.e. the resultant luminances having started from input luminances at the beginning of the chain; n.b. the reason for having such a chain is that it was investigated to be useful in practice for HDR image handling to have various component transformation one can play on, and also in display tuning one could make specific use of any such specific partial re-grading information, in any of various embodiments for various scenarios) for luminance mapping for creating a pleasing image for a 100 nit display.

We see in this example a typical one of possible strategies, in which the darker luminances are boosted (relatively, on a normalized scale!), so that there will be sufficient visibility of those regions on the dark 100 nit display, because these regions were graded ultra-dark in the HDR principle grading, because it was graded for bright e.g. 1600 nit displays. The remaining bright luminances are then distributed over the upper range which is still available (in this example above 50% of the rendered output peak brightness, which one may note that because of the non-linear nature of human vision is not all that much, but this is merely an elucidation), in this example in a linear manner, but of course the grader could use e.g. an S-curved or soft clipping curve for the higher input luminances, to create e.g. more contrast in some regions of the images, etc. The HDR image when converted to itself (which one need not actually do, but is a theoretical end point of all the actual color transformations to images not having a PB_H peak brightness) is equivalent to an identity transform of slope 45 degrees, so we have drawn that in the map to be able to show gradings which stay close to the HDR look. The common multiplicative factors for each input luminance Y_HDR can be read from the curves, e.g. a boost b(0.2) maps as the g multiplier the value Y_HDR=0.2 to the desired Y_LDR=0.6, which corresponds to a common multiplicative factor g of 3 for this input luminance. Now if one wants to obtain the optimal grading for a 800 nit peak brightness monitor (curve 402), because this is relatively close in psychovisual properties to a 1600 nit monitor (for which the received HDR grading in this example would look optimal), and can still show relatively high dynamic range content, one will calculate an 800 nit re-grading (MDR_800) which is relatively close to the identity transform, i.e. the resultant common multiplicative factor gt being here, b800(0.2), should be close to 1, and similarly for all other input luminances. The optimal re-gradings for 400 nit (curve 403) and 200 nit (curve 404) intended or connected display peak brightness PB_D should have curves and common multiplicative factors which progressively come closer to the LDR mapping (curve 405).

The equations our embodiment uses to derive any intermediate grading is:

$$gp = \mathrm{LOG}(PB\_H/PB\_D; 2.71)/\mathrm{LOG}(PB\_H/PB\_L; 2.71)$$

$$gt = \mathrm{POWER}(g, gp) \quad\quad\quad [\text{Eqs. 1}]$$

It is useful to change e.g. multiplicative display tuning strategies like this, as this can model better visual desires. As the skilled reader can verify, this allows to calculate the required output Y_L for any input Y_HDR, because the resultant common multiplicative factor can be determined on the one hand based on the at the receiving side or image using side fixed ratio gp (being dependent on the display we need to render on, which we assume at the moment will typically be a single one at the consumer's premises), and on the other hand on the basis of the initial g, which is calculatable from the input Y_HDR, and the metadata for the color transformation functions, i.e. on the LDR vs. the HDR look, as they were received. As can be verified by filling in the values, gp varies between log(1)=0 if PB_D=PB_H, and 1 if PB_D=PB_L, i.e. this will use the full g value if PB_D=PB_L, and perform an identity transform by multiplying the RGB values with 1 if PB_D=PB_H.

We want to stop here for an instance so that the reader already contemplates and understands from this first simple embodiment what is going on typically, and will not confuse with things that are definitely not the same. We have on the one hand a behavior which (multiplicatively) maps input luminances of pixels to output luminances. And this behavior has been received from the content creator, in particular his color grader, since typically any receiver will receive all the required information for determining two graded images (typically a HDR and a LDR look on the same HDR scene). And hence the receiver can know the transformations between these images, in whichever form, but in particular in a form of a multiplication of the input luminance while keeping the color's chromaticity constant (actually, he typically already gets these functions, so using them in any receiver for any further application will be easy). On the other hand, since the gradings may not be at least fully optimal for rendering on displays which don't have the same peak brightness as the PBs associated with the two gradings, the receiver may in addition need to calculate a new optimal MDR intermediate re-grading from all that information. This may also involve metrics, on which multiplicative factors can be determined, and luminance transformation functions which may similarly be transformed to multiplicative gt values etc., but those two factors of original grading encoding versus calculating a display tuned MDR image are, although typically related, be it sometimes to a lesser extent, definitely not the same, hence very different technical design philosophies may lead to very different solutions (even if some components have the same name like e.g. a gamma value in some embodiments). One could see the display tuning as some fine-tuning on the graded pair, although how fine and easy the re-grading would need to be depends on the situation, but one of the design views behind it is that one should not bother the grader with actually creating an infinite amount of original gradings for the same HDR scene (i.e. one would like the content creator to be present in each and every different TV of a consumer for on the fly creating the most artistically beautiful tailored images, but in an as much as possible automated matter with as little as possible additional work as needed for the grader, again depending on the scenario and his desires, i.e. however, with the various embodiments at least offering some of the needed control to come to the correct look, in what is the very complex field of image processing, and the highly non-linear vision system of the consumers of those images).

In practice of course these gp and gt values need not be calculated all the time, but typically as the gradings may change e.g. per shot of N images, LUTs may be constructed just before they are needed for re-grading the incoming images, which apply the required mapping function as in FIG. 4, e.g. for a connected 400 nit display (and the metadata is received at least just in time, e.g. 5 images in advance).

In that case unit 200 will look up the required resultant common multiplicative factor gt i.e. e.g. b800(0.75).

In case the principal image is an LDR image, which needs to be upgraded to e.g. 6000 nit HDR, or any re-graded image for an in-between peak brightness, slightly different similar equations are used in the embodiment:

$$gp=\text{LOG}(PB\_D/PB\_L;2.71)/\text{LOG}(PB\_H/PB\_L;2.71)$$

$$gt=\text{POWER}(g,gp) \qquad [\text{Eqs. 2}]$$

The scaling multiplier 114 now performs similarly as in FIG. 1, but multiplies the three RGB color components with gt instead of g, yielding the desired color look.

However, it can be that the grader wants for a complicated scene or shot of video images a different re-grading strategy, e.g. one which stays longer (i.e. for more display peak brightnesses above the LDR 100 nit) close to the LDR functional shape. He needs to specify this in a very simple manner, so to use not too much expensive grading time ideally he determines e.g. only 1 single parameter, namely tuning parameter gpm.

Therefore a more advanced embodiment of our scaling factor determination unit 200 applies the following equations:

$$gpp=\text{POWER}(gp,gpm)$$

$$gtu=\text{POWER}(g,gpp) \qquad [\text{Eqs. 3}]$$

If gpm is below 1 then the lower peak brightness re-gradings behave more LDR-like in their look (and mapping curve), and vice versa they behave more HDR like for gpm above 1, the more so the higher gpm is chosen by the content creator or grader.

Figure 5:
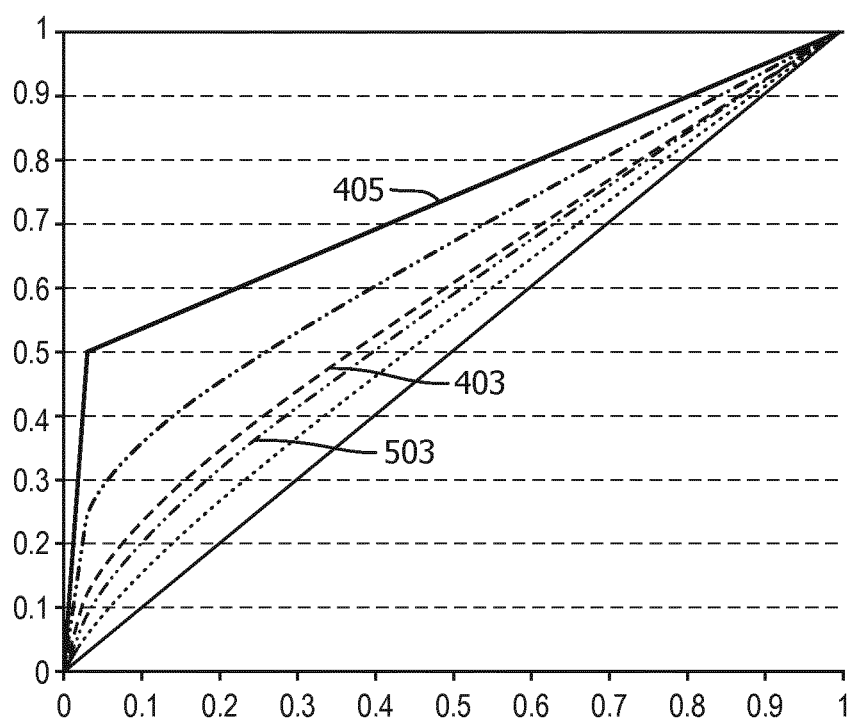
FIG. 5 schematically illustrates a more advanced embodiment, allowing further tuning of the shapes of the intermediate grading curves, in particular whether they correspond in luminance distribution characteristic along the axis of possible to render luminances more like the HDR grading, or more like the LDR grading.

This behavior is illustrated in FIG. 5. It should be pointed out again that the gpm doesn't work in a (classical) power sense direction along the x-axis (as the shape of the curves, which represent the grading i.e. the relationship between all object luminances for a scene, should not significantly change, with however small changes like a slight increasing of some part being psychovisually allowed, as these correspond to major desired luminance/contrast look modifications with the rest of the small transformations being accepted by adaptation of the visual interpretation in the brain), but works per Y_HDR value, so in the direction of the Y_L axis so to speak. In fact what gpm does, is stretch or compress the family of curves towards the LDR grading function, or vice versa the HDR unity mapping function, i.e. determines the "aggressiveness of needed re-grading look changes".

In FIG. 5, we have chosen a value of gpm equal to 1.3, and see that the resulting curve (503) of luminance mapping or common multiplicative factors (now called tuned common multiplicative factors gtu) has become more similar to the HDR identity transform curve. Similarly with a factor of e.g. 0.8 the resulting curve will lie above curve 403, i.e. closer to the LDR look curve 405. That may be useful e.g. if there are important dark objects in this scene, e.g. faces, for which it is prudent to keep them sufficiently bright for a long time, i.e. up to when it is indicated that the rendering display is sufficiently bright, e.g. above 800 nit.

This is still a global tuning however (in the sense that all luminances Y_HDR are handled in a simply related manner, only determined by the shape of the HDR-to-LDR luminance conversion function and the gpm parameter). A bigger impact of our strategies may come from embodiments which allow different tuning for different sub-regions of the input luminance (and consequently by the mapping also the output luminances). E.g., if we tune the curve 403 so that it becomes brighter (more LDR-like) for the darker luminances, it by necessity also becomes brighter for the brighter luminances (because to keep the look, these should for any re-grading have output luminances above those of the dark regions of the images), and this may be inappropriately bright. E.g. the bright outside regions may lose too much contrast, and the grader may perceive them as annoyingly washed-out for some critical scenes. I.e., he would like to make the darker parts of the scene more bright and consequently contrasty and visible, whilst however keeping the upper regions e.g. close to the HDR look.

Figure 7:
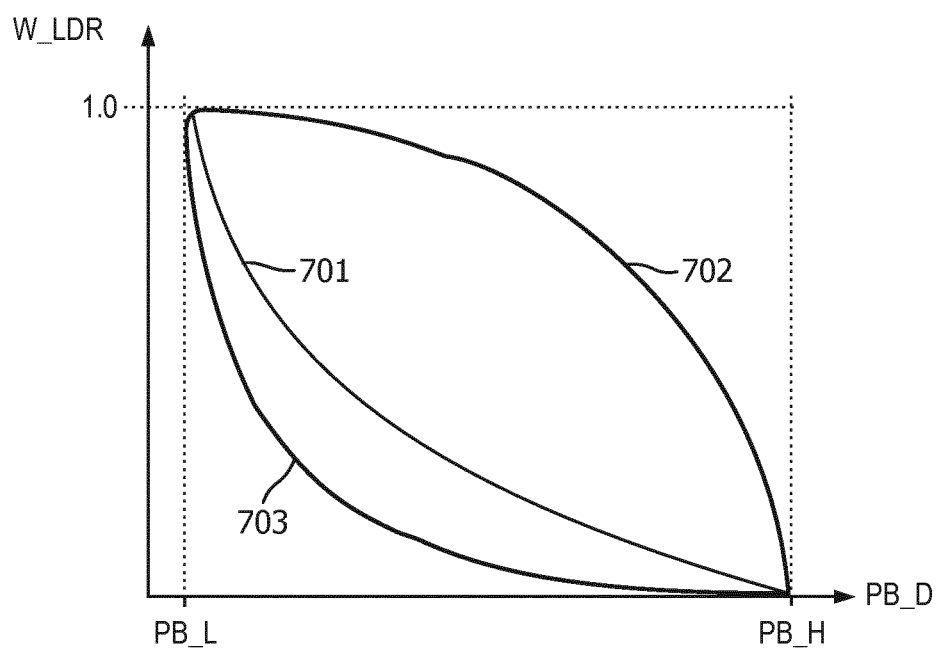
FIG. 7 schematically illustrates how our embodiments can make the third grading for any intended e.g. connectable display with particular peak brightness look more like the HDR, or more like the LDR grading, at least in some sub-range of the luminances.

The desired behavior is shown in another manner with FIG. 7. Here we show how much of the LDR graded image contributes to the look of any intermediate MDR grading corresponding to any intended display peak brightness between PB_L and PB_H. The default behavior of equations 1 is graph 701. One sees that we can give more weight to either grading along the path of change for various intermediate peak brightnesses in the MDR grading. E.g., curve 702 shows a situation where the MDR grading stays close to the LDR grading up to relative bright intermediate peak brightnesses PB_D, and only for the brightest displays starts showing the HDR look (in the below explanation based on the used metric, this will correspond to where the tag marks fall for various PB_D values, i.e. whether e.g. those up to (PB_H+PB_L)/2 will all fall close together, i.e. close to the LDR grading position PB_L). Whether and to what extent such a curve is chosen will depend on the relationship between the HDR and LDR gradings, i.e. the functions to color transform between the two. The grader may have done various things, such as e.g. brighten the darker parts in the LDR grading, soft-clip the brighter parts, increase the contrast of some intermediate part, do some specific saturation processing on a colorful stained glass window etc., but e.g. if there are e.g. critical dark regions, a curve like 702 may be chosen by the grader, and its gpm value transmitted to the various receivers, in or associatable with S_im. Curve 703 on the other hand is one which quickly introduces a large proportion of the HDR look, even for relative dark connected displays.

Figure 6:
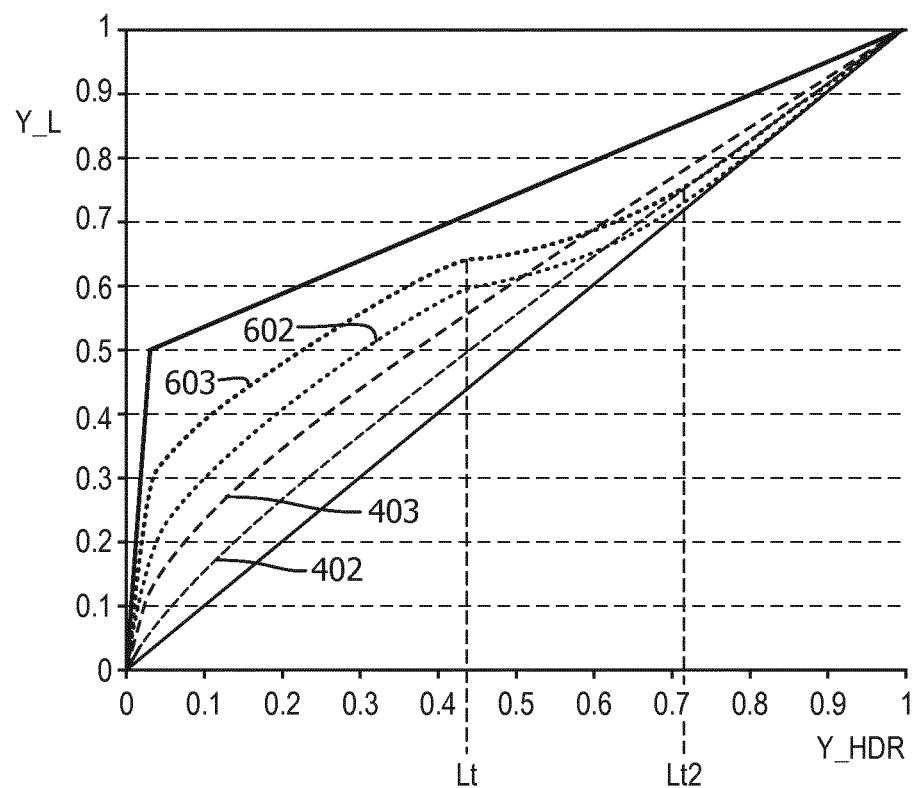
FIG. 6 schematically illustrates an even more complex embodiment, allowing more precise specification of the curves in at least two luminance sub-regions, i.e. allowing to specify the re-grading behavior differently depending on the luminance of objects for which an optimal MDR look image should be calculated.

In the example of FIG. 6, the grader indicates an optimization regime demarcating (luma or) luminance value (Lt), in the example equal to 0.43. Below this value Lt, he has specified a first gpm value, e.g. gpm_1=0.3, i.e. for all input colors with a luminance Y_HDR<=Lt, the resulting curve is calculated as explained with FIG. 5, with this gpm_1 value. Above Lt, the grader wants to go to a new re-grading regime, and in this example for the brighter colors he wants to have the HDR look. He determines a larger than 1 value, in the example gpm_2=2.0, making the brighter pixels get a rather strong HDR-ish look, more strongly than usually necessary, but for this example. In the example, instead of immediately using gpm_2=2.0 for Y_HDR values above Lt, he specifies an interpolation to create a smooth transient region. This can be specified in various manners, in the elucidating example in a simple manner by specifying an upper luminance of the transient regime, Lt2=0.72. Above 0.72 the tuned common multiplicative factor gtu to be used for e.g. creating the LUT of the curve will be determined by using gpm2=2.0 or gpp_R=0.25 in this example. In the transient region an interpolation strategy will be used, embodied e.g. by first calculating the power values on either side of the transition which will later serve for determining the common multiplicative factor gtu for dark respectively bright input luminances, and then interpolating those in the transient regions by calculating e.g.:

$$gpp\_L=POWER(gp,gpm\_1)$$

$$gpp\_R=POWER(gp,gpm\_2)$$

$$gpp\_i=gpp\_L+(Y\_HDR-Lt)*(gpp\_R-gpp\_L)/(Lt2-Lt) \quad [\text{Eqs. 4}]$$

Of course other interpolation strategies could be used if the grader desires so.

Figure 3:
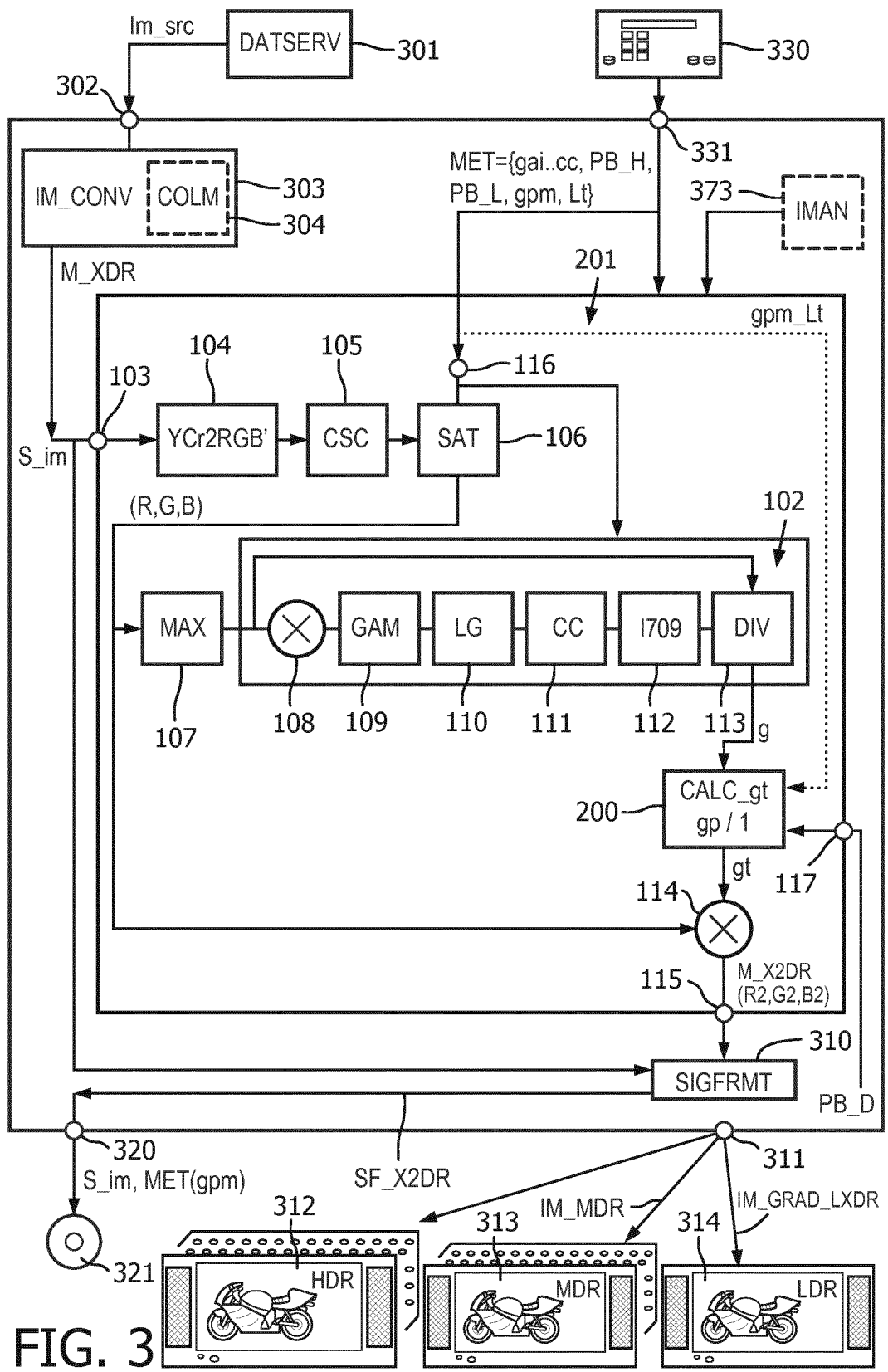
FIG. 3 schematically illustrates such a calculation system for calculating a further grading, when embodied in an exemplary system for elucidating some aspects of our invention, which system allows a grader to specify such at least three gradings, and to encode the information for them, enabling the reconstruction of the three gradings at a receiving side, e.g. by a consumer television or computer system.

This gpp_i value will then be used for determining similar to as explained with FIG. 3 the gtu value for each input luminance in the transient range (i.e. gtu=POWER(g, gpp_i)), whilst on either side of the transient the respective gpp_L or gpp_R value is used in the power function on g, and with this formulation a resultant curve like e.g. 603 can be calculated from a curve 403 which would result from the method explained with FIG. 4, or in practice resultant curve will be calculated directly. Corresponding to the 800 nit display, the equivalent of a more simple curve 402 would now be the curve 602, which is indeed seen to behave much more like LDR for the darker pixels, yet strongly like HDR for the brighter pixels. It should be clear that for such an embodiment unit 200 will yield the gtu equivalent for gt, and otherwise everything may be similar for the various embodiment possibilities. In this example we have interpolated the gtu values to be used for the common multiplication by in fact interpolating the gpp values defining it, but alternative embodiments could also interpolate the gtu values resulting at either side of the transient themselves. Typically the encoder will specify which method is used. E.g. he may indicate that the decoder should calculate the gtu values on either side of the [Lt1,Lt2] interval, then linearly interpolate that curve at the missing points in the interval, and store this as a final LUT for luminance processing of the current shot of images.

With these embodiments, the grader can hence simply define a quite advanced look re-grading strategy for the various possible displays in the field for any even complex HDR scene encoding. In simple cases he need only encode one gpm value, since e.g. by default the upper value gpm_2 may be understood by any receiver for such a scenario to be fixed 1.0. Or, without bothering the grader, but to be certain that no less-compliant receiver misunderstands the grader's intention, in case the grader only e.g. sets the lower gpm_1 value and a threshold Lt, then the encoder by default fills in gpm_2=1.0. In case the grader specifies only a gpm_2 power value for the luminances above Lt, the encoder fills in 1.0 by default for gpm_1. Typically the encoder may also automatically determine an interpolation strategy, which it thinks should look good (yield at least monotonically increasing MDR grade curves), and the grader may accept the encoding of that strategy in the metadata (e.g. as an Lt2 value) by doing nothing, or re-specify a more beautifully looking interpolation strategy instead (if needed the grader may also fine-tune the gpm values on either side of Lt). In general according to our novel principles, each common multiplicative factor g codifying the grading difference between the HDR and LDR grade may be used for determining an optimized re-grading, by defining a suitable power value GP for each input Y_HDR, which power value GP can be specified by any curve codified as metadata in any manner, e.g. a curve with three Lt points for interesting brightness regimes in the current shot of images, and instead of e.g. fixed gpm or gpp values on either side e.g. a linear or parabolic evolution over the sub-range of input luminances between Lt2 and Lt3, etc., and then the re-graded image is calculated by using gtu=POWER(g, GT) for any Y_HDR as input, and applying that gtu to any linear color encoding of the currently processed pixel color.

So, as explained with FIG. 2, any receiver getting the various metadata, can implement the desired embodiment of display tuned optimization as specified by the content creation side. To summarize, at least one graded image with pixel colors is needed as an actually encoded and transmitted image and as a starting point, e.g. a 2000 nit grading (which actually transmitted and received, e.g. typically MPEG compressed, we will call the principal image). Then there will be a definition of functions to determine at least one further grading (e.g. LDR if the principle image was e.g. HDR 2000 or 5000 nit), as accurate as the grader has defined it by using various possible global or local functions (we have explained mostly the luminance processing aspect which is the major aspect of luminance dynamic range re-grading—i.e. the determination of another look on a scene for a display with different dynamic range capabilities which comprise at least peak brightness—but typically also color transformations may be involved, like saturation processing of at least some image objects, and potentially even hue changes). This transformation may be communicated e.g. via at least an arbitrary Y_HDR to Y_L mapping, defined as a custom curve cc, e.g. defining how to transform the 2000 nit grading into a grading which is theoretically optimal for a 500 or 10000 nit peak brightness (reference or targeted) display or values around that. Then if transformation on the received HDR image is required, e.g. because a somewhat different peak brightness display is present at the receiving side, or e.g. because a user uses his remote control to control the maximum brightness below the theoretical maximum of 10000 nit (similar to creating a kind of new display), there may be several embodiments of sophistication on how to create a new re-grading, e.g. for 8000 nit. The simpler versions may be largely automatic, and to a certain degree ignore the colorimetric and semantic particulars of a shot of images of a HDR scene, and more precisely what the grader has or would have to say about it, i.e. how he would like to see changes to e.g. lower brightness happen on the distribution of relative brightnesses of various objects along the luminance axis up to the available peak brightness. This distribution of the various image object brightnesses will determine the so-called look of the scene (e.g. whether it is a moody, mostly dark night scene, yet still conveying a sufficient glimpse of the shapes of the houses), inter alia due to the effect of inter-object contrasts (e.g. a stained glass window being colorful, but still sufficiently brighter than the church interior), and typically some required optimizations will be involved, because even if there is sufficient dynamic range on the display for rendering a particular imaged scene, one is typically dealing with an artistic determination of a family of looks, rather than the exact distribution of object luminances along the luminance axis as in the original captured scene per se (i.e. e.g. the grader may choose to make the sunny outside only a couple of stops brighter than the inside to have sufficient simulation of the outdoors effect, rather than e.g. 5 stops). Note also that the art is creating the appropriate appearances, and human vision is highly complex, so one desires to have a technology which at the same time is reasonably simple (otherwise it will not get adopted) yet sufficiently powerful to handle at least most scenarios in a sufficient manner (otherwise the content creators cannot satisfactorily use it), and this is what inventors should be occupied with. As was taught above, the grader can use different parameters to teach how re-gradings should depend on the grading on at least one side of an interval in which the peak brightness of the intended display lies, i.e. how grading curves transform into each other. With one or several parameters, the grader has a quick but powerful control on how the receivers will calculate the various potentially needed re-gradings. The receivers will just apply the mathematics on the input colors of the principal image. Although we taught a pragmatically simple embodiment working on linear RGB pixel colors, the skilled person understands that our principles can also equivalently be applied on e.g. Yu'v' color representations, in which e.g. the uv components are kept constant, and Y is transformed as required, or by using Y-correlates like Value V=max(R,G,B), which both are linear combinations of the linear color coefficients which can be similarly multiplicatively scaled, etc. As long as one can apply the scaling principles, so one needs some component which is indicative of the color's brightness, and one can then scale (multiply) the linear or non-linear color components (since the same scale factor can be set outside the power law, e.g. power(g*L; N)=power(g;N)*power(L; N), so if one knows how e.g. a luminance scales one also knows how a luma scales and vice versa; and the same can be if desired formulated with other brightness correlates, and/or color spaces. Note also that we elucidated the basics of our embodiments based on the PB_D of the intended display, in case a e.g. TV vendor has a view on more complex processing for HDR effect spectaculamess improvement, like e.g. local contrast boosts etc., he can coordinate this processing in the resultant display tuning mutatis mutandis with the information from the content creator, e.g. local gradients of the luminance mapping functions, object segment information, etc.

FIG. 3 shows an example of our technology applied at a image or video creation and encoding side, e.g. in a post production house of a movie studio, or a production house for a broadcaster, or even in its simplest form in a life television production truck, etc. A data server 301 has storage for supplying a starting image Im_src (which is a HDR image typically, i.e. with at least objects of high brightness, e.g. above 1000 nit to be rendered luminance, and often also dark objects, although in some embodiments the original could be an image of some lower dynamic range in which the grader still needs to create HDR effects, by calculating e.g. a fireball with computer graphics mathematics, which fireball may be represented as one or more small images) or video sequence via an input 302. Without limitation one may assume this is e.g. raw camera footage. An image convertor 303 is arranged to convert this raw data into e.g. a 5000 nit HDR principal image, of which the relation between renderable luminances and color codes (comprising lumas, and two other components codifying the chromatic aspects of the color) is determined by a preselected, typically fixed but potentially variable electro-optical transfer function (EOTF). Typically the content creator may define an image in a display-referred manner, i.e. defining how it should be displayed on a 5000 nit reference display, and the conversion from scene luminances from the camera, or equivalent color coordinates, will typically involve an artistic grading, which we call the master grading M_XDR (e.g., lamps of 20000 nit may be encoded as codes for rendering 5000 nit after applying the EOTF, and such factors as the relative exposure settings of the camera are then also no longer necessarily important). Thereto, the image convertor 303 comprises a color transformation unit 304, arranged to perform whatever set of color transformations is desired to make a nice master grading. The parameters for these transformations need not be stored, as the system from there onwards, i.e. also the decoding at a receiving side, can start purely from this master grading (which will typically be stored in image signal S_im, which may be formatted according to e.g. conventional video coding technologies like MPEG_HEVC, i.e. with the master grading being the principal image being stored as a DCT transformed YCbCr component image set, and the metadata e.g. as SEI messages), but some embodiments could also store some metadata from this master grading. Secondly, according to our invention the grader will also grade a second dynamic range look IM_GRAD_LDR, e.g. LDR for 100 nit displays, as this information is needed for the later actual display optimizations. The functions for this mapping do need to be stored, i.e. color transformation unit 304 will write the corresponding parameters (e.g. gai, cc) in the metadata of S_im. The required input from the grader can be inputted via a data input 331 connected to color specification user interface means 330, like e.g. a keyboard, which may be a dedicated console for color grading, etc. In the exemplary embodiment we assume that the HDR master grading M_XDR is stored or transmitted as principal image together with downgrading functions allowing at a receiving side to calculate the LDR grading, but alternatively one could also store/transmit the secondary graded LDR grading as principal image, together with upgrading functions for reconstructing at least a close enough approximation of the HDR master grading at a receiving side, or an intermediate grading could be used as principal image, with functions to obtain the LDR and HDR gradings created at the encoding side, etc.

The processing of the principal image in units 104, 105, 106, 102, etc., is again similar to what was explained with FIG. 2, because the encoder needs to simulate for the grader what will actually happen at the decoding side. However, now typically the values of the parameters (gai, cc, etc.) of various color processing units are input by appropriate tuning by the human grader, although other embodiments could also read them from metadata similar to how it happens in FIG. 1, e.g. if some grader has performed the downgrading with another color transformation unit, possibly at another time. E.g. he may have used a color conversion program with other mathematical transformations defining the second grading, and an intermediate conversion unit may convert those color processings to approximately equal look result processings with any of the combined color processing sub-units of any of our embodiments to do HDR to LDR conversion, or other dynamic range conversion. The scaling factor determination unit 200 may typically initially be preloaded with a single gpm equal to 1. In that case the simulation applies Eqs. 1 or 2 to create the MDR grading. The grader may e.g. look in parallel (or sequentially to adapt his vision differently etc.) to three displays by outputting the related images over a display output 311, namely a HDR display 312 showing the HDR grading which in this case was the principal image also called master grading, an LDR display 314 showing the 100 nit LDR grading and typically being a 100 nit reference monitor, and a suitably chosen MDR display 313 for showing the re-graded optimal intermediate grading according to any selected one of our embodiments. This MDR display 313 may e.g. be chosen logarithmically near the middle of the typical available two gradings LDR and HDR. If the grader e.g. works in a format which typically standardly uses 2000 nit peak brightness for the HDR grading, he may choose an MDR display which has peak brightness of 400 nit (4×100, and approximately 2000/4). Since the optimization is approximate as a second order look adjustment, it is not critical whether the check is done on e.g. a 500 or 600 nit MDR display. Also, the grader may choose to use e.g. a popular display at the time of content creation. If the majority of the displays in the field has a peak brightness of around 800 nit, the grader may choose such an 800 nit MDR display (even though he may be grading 5000 nit masters for a future in which there will be better displays, but of course he would like his movies to look nice on the current 800 nit displays for the time being too). Usually it is advantageous to be somewhere near the midpoint for the MDR display, since that is where the greatest amount of re-grading is expected to be needed. But the grader may e.g. also choose a second LDR display for checking criticality of any LDR-ish look, also on displays which can afford somewhat more contrasty looks, so in that case the MDR display may e.g. be only one or 1.5 stops above 100 nit. In case the grader is pleased with the look, he may push a "finalize" button. In the example this may e.g. store the signal S_im (i.e. the principal image and the metadata for downgrading), and in the previous example a gpm value of 1.0, but in more advanced embodiments more advanced MDR grading optimization data on a memory product 321, like e.g. a blu-ray disk (BD), via an image output 320. The skilled person should understand that similarly the data may e.g. be stored on a server for later supply over e.g. the internet, or be real-time broadcasted, etc. In more advanced embodiments, the grader may use the calculation of the MDR grading, applying e.g. function 503 as a starting point. He may then further grade to obtain an accurate third look, improving on this simple re-grading principle (i.e. he will again use at least some tools of the original gradings encoding technology, but may start from a display tuned MDR re-grading instead of a master grading, to come to a third original grading, and a set of color transformation functions, to be communicated to some receiver). E.g. he may determine a region of the images of the shot, and apply a further custom curve to it, to specifically handle these sub-regions/objects. This can be used e.g. if a face in the dark is critical, the simple re-grading functions make it reasonable, so that everything like the eyes and the facial impression can be well perceived, but the now rather critical grader is not satisfied yet (in all fields of endeavor some people can be less critical, and others even highly critical). The chosen simple re-grading function may lead to a nice MDR grading for e.g. 500 nit as far as the surroundings are concerned—e.g. a dark street—because those are not watched all that critically, but the grader may want to make the face more healthy, and apply some further function. The metadata for that third (partial) grading can then also be stored as one or more functions on the blu-ray disk, or be transmitted as additional metadata etc. One or more signal formatting unit 310 may be involved to format all data in the required format. E.g., for driving a display another encoding may be used following the limited bandwidth of the display connection, than for storage on e.g. a BD, in which case a formatted high dynamic range image SF_X2DR may be encoded according to any HDR encoding scheme, but preferably a scheme in which a principal image is supplemented by metadata codifying color transformations for calculating a second dynamic range image from the principal image, with the two images being for displays with significantly different dynamic range, i.e. typically at least a factor 2. In the example we already assumed that the luminance processing pipeline (embodied as 102) contains a mapping to a typical LDR format (like inverse 709 performed by unit 112), but the MDR display may have another source format, etc., which the formatting unit 310 may take care of. This not being the dominant part of our novel teachings, should be clear to the skilled person, and will not be further elaborated.

Figure 8:
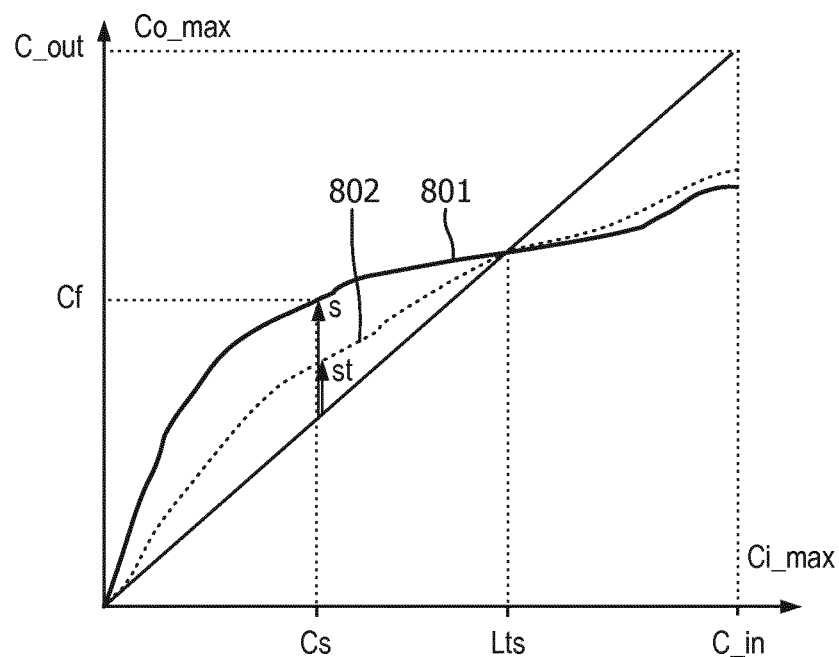
FIG. 8 schematically illustrates how embodiments can also find an appropriate intermediate color saturation of the pixel colors of an MDR grading for a display of intermediate peak brightness, starting from an input graded image (in addition to the luminance of pixel colors, one could keep the chromaticities exactly the same for all looks, but in some embodiments one would like to tune at least the color saturation also, typically leaving the hues unchanged)

FIG. 8 describes how the optimization principle can work to obtain the correct color saturation of pixel colors for driving MDR displays of intermediate peak brightness, similarly to the above-explained luminance processing. In some embodiments one may prefer to do both optimized luminance and saturation scaling, although other embodiments may only use luminance scaling. Input colors have an input saturation, or more precisely a chroma C_in, which is referred to a zero value being a white. There are several definitions of saturation, e.g. saturations normalized to [0,1] like in HVC, or other saturations like in CIE 1976 uv, but they all have the property that the saturation of a color is defined by a vector starting in a predetermined white like D65, and extending over a distance. Suppose that we have in a HDR input image a pixel which has a saturation Cs, and which will be increased to a value Cf. This can be defined by a multiplicative factor s, which is a factor similar to our above described initial common multiplicative factor g. If the LDR is more saturated than the HDR image (which e.g. may be because each decrease in luminance of the rendered image regions because of the lesser peak brightness capabilities of a display corresponds to a decrease in colorfulness which has to be counter-corrected by a grader-specified saturation processing), it is useful to increase the saturation of MDR gradings also, but to a lesser extent, namely with a factor st, which is an embodiment of gt. Apparatuses which have saturation processing capability, will typically have a color saturation processor 106 which is not a simple processor using a fixed saturation multiplier s, but rather is arranged to provide appropriately scaled saturation. The saturation processing may be fixed over all luminances, which may be done with a single multiplicative value s but still needs display optimization to an optimal value for each connected MDR display, but typically for dynamic range conversion one may want more sophisticated saturation processing. E.g., the saturation may vary depending on luminance, or Value minus luminance, and/or input saturation, etc. Important is that however the required saturation re-grading (i.e. between the HDR and LDR image) for each input pixel is specified by the grader and communicated in the metadata MET, it can be determined at the receiver, and then appropriately scaled. Typically color saturation processor 106 will have some lookup table mechanism to determine s. E.g., if input color (Ri,Gi,Bi)=(0.2,0.3,0.7) the LUT yields e.g. s=1.1, or in case of desaturation e.g. s=0.5, and for another input color there may be the same or a different value of s. Color saturation processor 106 then comprises a unit for calculating a resultant saturation multiplicative factor (st) being an embodiment of a resultant common multiplicative factor gt, which is similar to unit 200, and calculates: st=POWER(s, sp). Ratio sp may be for saturation somewhat different than for the luminance processing, but typically it will still depend on the relationship between PB_D, PB_H and PB_L, and often there is no need to make it different from how gp is calculated (but of course one could use different gpm values for the saturation and the luminance processing, making the luminances of the MDR look more like the LDR look e.g. yet making the saturations look more like the saturations of the HDR image, etc.). As seen in FIG. 8, it may also make sense to use different saturation regimes defined by e.g. saturation demarcators Lts (which may actually be any demarcation information allowing to classify the pixel colors in two or more different classes for different saturation processing), e.g. for specifying a region of desaturation for handling high brightnesses in re-gradings of low peak brightness, and a region for boosting the colorfulness of darker colors, etc.

Is is advantageous to typically perform the saturation processing as:

$$Ro=st*(Rin-Y)+Y$$

$$Go=st*(Gin-Y)+Y$$

$$Bo=st*(Bin-Y)+Y \quad [Eqs. 5]$$

in which Ri, Gi, Bi are the linear input color components, and Ro,Go,Bo the resultant output color components after saturation processing, and Y is linear luminance, i.e. a linear combination a*Ri+b*Gi+c*Bi, with predetermined constants a, b and c, although other equivalent processings may be used.

Figure 9:
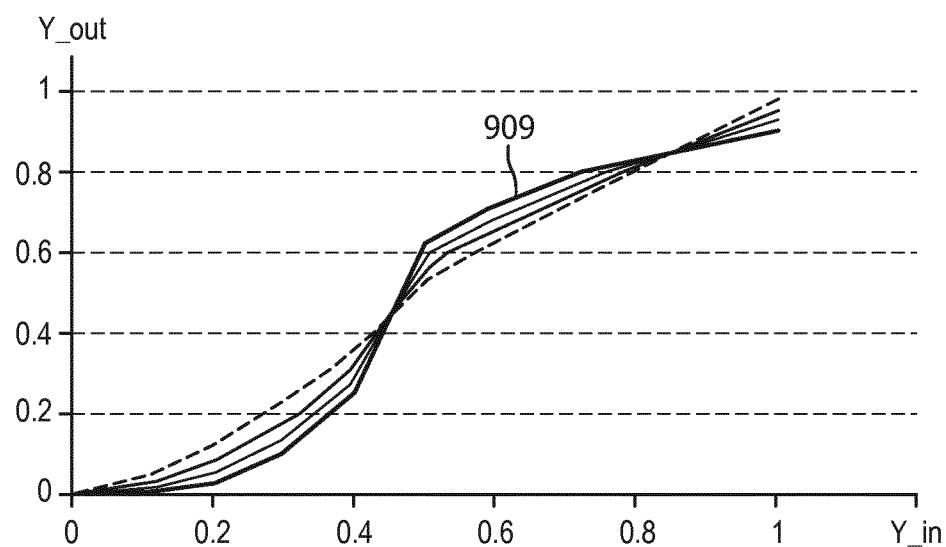
FIG. 9 schematically illustrates another example of applying of our embodiments to a particular look relationship as a tone mapping between HDR and LDR as specified by a grader.

FIG. 9 gives a further example, on how one can already follow the sometimes complex scene-dependently-optimized particularities of a grader's desire, even with the simplest of our embodiments, which solely reside in a simple re-grading calculation in a receiving apparatus, and about which the grader e.g. doesn't care to check any further. We use for this example the logarithmic intended rendering display peak brightness dependent scaling of Eqs. 1. We see that this method can already set very well the needed luminances and contrasts where they are needed in the scene. E.g., in this example the regions of somewhat above 60% (linear) of the maximum (i.e. white)—which we assume defined on the HDR image—may typically need some brightening in this rendering. On the other hand in this example there is also a critical image region around 50%, which may be e.g. an actor's face in a part of the scene which is lit relatively bright. On the other hand, in the darker regions of the image in this example there doesn't seem to be too many objects of high interest, because the LDR look can afford to strongly soft-clip those darker regions. This may be a scene where we have e.g. a lot happening outside in e.g. a sunlit landscape, and some inside which we can artistically decide to darken quite somewhat, say maybe a barn or inside of a temple which is seen through a small door, and hence it is not too relevant anyway what is in there (because of the small size of the region, even in the HDR rendering on a HDR display the visual system may quickly discard this as "uninteresting black", and hence with a same grading philosophy the grader may decide to make it also in LDR approximately what is seen as black (note that our methods should be able to work in more precise as well as less critical grading variants, and typically with more easy and more difficult HDR scenes, the former being e.g. two spatial regions of the image of which the exact average luminance is not all that important in any MDR rendering, and the latter having e.g. very precise rendering requirements, like e.g. a monster partially hidden in the mist). The important property is, that even with the simplest of our embodiments, we can nicely get approximately the good brightness appearances and all corresponding determinable contrasts (i.e. between the luminance of selected interesting pixel 1 and 2, or average luminance of interesting region 1 and 2, e.g. a dark corner and a part of the outside seen through a window of a room), for all intermediate dynamic ranges (MDR). In this FIG. 9 curve 909 is the luminance transformation to apply to transform the 5000 nit HDR look in a 100 nit LDR look, the HDR transformed to itself unchanged would of course correspond to the diagonal, and the other curves are the transformations required to re-grade to various MDR gradings, for displays of various peak brightnesses between 5000 and 100 nit to be supplied with optimized look images.

Figure 10:
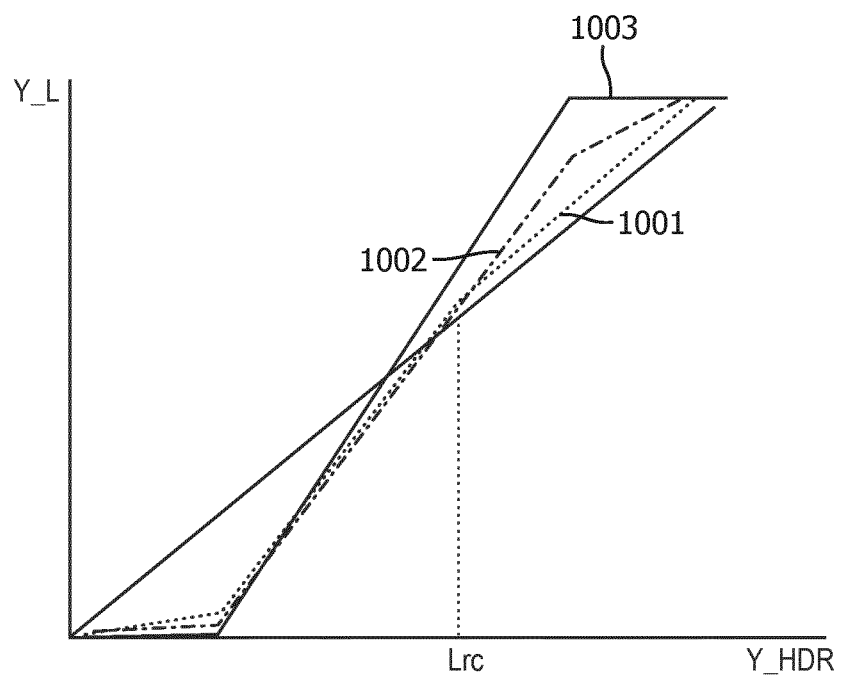
FIG. 10 schematically illustrates another example possible with our embodiments of particular re-grading for a number of displays with intermediate peak brightness, which combines a fast move towards the LDR look for a first region of pixels with luminances within a first luminance sub-range, and a more smooth change for a second region of pixels with luminances within a second luminance sub-range.
Figure 11:
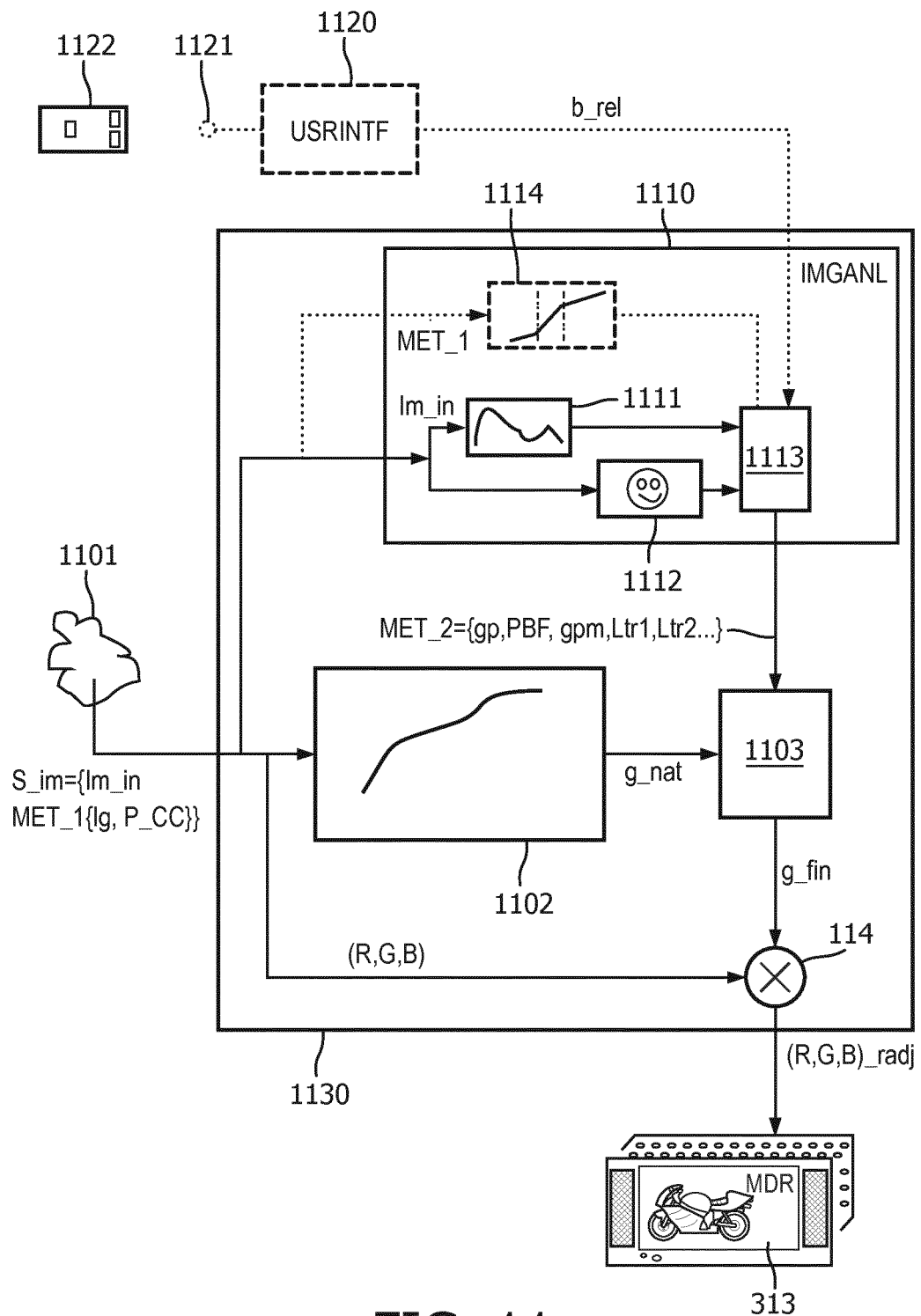
FIG. 11 schematically illustrates merely as an elucidating example of some of the possible applications of the present technologies, some possible embodiments of receivers which are able to determine their own desired re-grading specifications according to our principles (and in particular this Figure also exemplifies how in some of those apparatuses a receiving side user could influence the look of at least one MDR image for at least one envisaged rendering scenario)

FIG. 10 shows another more advanced example allowed by our embodiments (whether it is (partially) controlled by a human grader at the content creation side, or an automatic re-grading done by a particular receiver, e.g. a HDR television). This example shows how one can smartly re-grade if one has more semantic information about various image regions, determined in a simple manner (e.g. by the grader and communicated, or by an image analysis unit residing solely in a receiver) as a single luminance (or luma) demarcator Lrc. In this example, the brighter region may be very critical, and the darker region may be difficult to optimize at the same time (i.e. maintain e.g. sufficient contrast for the entire dark range of possible pixel luminances in a shot of images, whilst at the same time needing a sufficiently large part of the luminance range for the lower MDR images to render with sufficient visual quality the brighter image region), i.e. one may quickly decide to go for reducing its quality in a particular manner. Quickly means, that even for MDR peak brightnesses (PB) which are close to the HDR PB, e.g. if PB_H=2800 nit and PB_MDR is 2500 nit, the lower range is fully or mostly mapped according to a strategy with mimics the LDR 100 nit look. However, the brighter region can more gradually tune towards the LDR look, over the various MDR PBs between 2800 and 100 nit. This strategy may be both determined by the grader, at least partially, or as initial guiding strategy, but also determined (e.g. by overruling whatever the grader specified, e.g. he might have specified a smooth re-grading towards the LDR look for both the darker and brighter regions of the images of the shot) by the receiver itself.

Where we have elucidated the above examples with the embodiment scenario where a human grader was involved, i.e. was allowed a say in the final rendering of his images by those HDR image communication system embodiments, alternatively also a computer algorithm could be used as an automatic grader. This may happen at a creation side, where the algorithm can do very smart image analysis in non-real time, e.g. identifying regions, particular kinds of textures, or even identify classes of objects like humans, certain animals, cars in the sun with specular reflections on their metal, etc., and on the basis of statistical information on how a grader would typically desire to grade these kinds of scenes and their objects. However, an automatic grading unit could also reside in a receiver, and apply image enhancement processing codifying the image quality knowledge developed by say a television manufacturer over decades (and maybe constituting his signature look). The new solution is now to incorporate that in our present HDR re-grading technology. FIG. 11 elucidates this with an exemplary embodiment of a receiver's color transformation unit 1130, say e.g. incorporated in a television, or a settopbox, or a computer supplying a commercial display in a supermarket or outdoors event, etc.

The images of the video, and the metadata to do the native color re-grading (e.g. from 5000 nit HDR as input images Im_in, to 100 nit LDR, by means of the logarithmic scaling explained with FIG. 1, with a parameter lg chosen as being optimal for this scene by a creation side human grader, and also parameters P_CC defining a e.g. multi-linear shape of a custom tone mapping curve) are received via an image communication network 1101 in this example (say e.g. a video server connected via the internet, or a television service broadcasted or multicasted over a mobile phone network, etc.). A scaling factor determination unit 1102 then applies the tone mapping specification specified as optimal to map a look on one end of an intended range (although the same principles can in principle also be used to go somewhat outside the range boundaries), say HDR, to the other range end reference look, say 100 nit LDR, and determines an initial scaling factor g_nat therefore, to do linear (or potentially even non-linear) RGB scaling. A second scaling factor determination unit 1103 determines the final scaling factor g_fin to use in the present situation, but now in this embodiment, this factor may be determined by the receiving apparatus image enhancement knowledge. Thereto, an image analysis unit 1110 is comprised, which may comprise various image analysis units (which may typically be e.g. various image analysis software components, or hardware realizations thereof). In this simple elucidating example, we describe a histogram analysis unit 1112, and an object recognition unit 1112. The histogram analysis unit 1112 may be arranged to analyze the luminance distribution of the image(s), and determine that there is e.g. a lot of dark pixels, or maybe semantically important pixels are dark (because the units can work together). It may then determine e.g. a demarcator of the dark region, and an intended brightening strategy. The object recognition unit 1112 may comprise e.g. a face detector, which can detect faces having various brightness because the actors stand in various differently illuminated parts of the scene. From all this knowledge, a strategy parameter determination unit 1113 determines the corresponding parameters, according to which of the various embodiments we disclosed resides in the second scaling factor determination unit 1103 (note that some of that functionality could reside in other components in some apparatuses or systems, but we describe it functionally). E.g., a logical manner of the strategy parameter determination unit 1113 to communicate that it wants to e.g. brighten the scene and in particular the darker colors more than the grader's native method (which could be as simple as applying our equation one, without any specific re-grading information from the human grader, or a more advanced strategy, which may be partially followed, or largely overruled), can be done by specifying a new gpm value (of course some embodiments the apparatus could also define new values for the functions defining the mapping between the original HDR and LDR gradings, e.g. the bottom part slope, but some embodiments could consider that sacred information from the content provider, which also need not be modified, because their dedicated look can be achieved as a post processing; if any functional shape adaptation is needed, then at least this can be implemented only for the MDR calculation part, e.g. instead of the pure multiplicative scaling described in FIG. 19 the television could apply a bending to the resultant MDR luminance mapping function for the darkest values, or any alternative function redefinition, e.g. multiplying with the correction values of a specific fixed or image-dependent function determined by the TV). If the image analysis unit 1110 had determined—e.g. with its histogram analysis and identification of an actor in that darkest region—that according to the receiver manufacturer the darkest parts are natively too dark for rendering on e.g. the connected 1100 nit display, the gpm may be raised a little towards the LDR look (as moving toward LDR may typically have a behavior which roughly, and now scene-dependently, corresponds to brightening). A luminance demarcator Ltr1 may be communicated to do that strategy only to the darkest subrange of the HDR luminances. There are other manners in which the image analysis unit 1110 can communicate its desire of the needed re-grading, as second metadata MET_2. E.g. it could pretend the connected display is not 1100 nit, but rather communicate a PBF value of e.g. 1300, or 900, and have this used analogously to PB_D in the logarithmic ratio calculation. Or it could already communicate a logarithmic ratio, and let unit 1103 apply a gpm value to it, etc. Or it could adjust the PB_H and PB_L values. So any required combination of values for calculating the ultimate g_fin, with the correct values as determined by the image analysis unit 1110 can be communicated in MET_2 to unit 1103. In addition to analyzing purely the images Im_in, it may be very advantageous to look at what smartness the grader has put in the shape of the color transformation functions. Thereto a tone mapping analysis unit 1114 may be comprised in some embodiments, arranged to analyze the functional shape of the total tone mapping between the first and second reference looks, i.e. typically HDR and LDR. E.g. this unit may fit three regions, and check what (e.g. soft-clipping) processing is done to the brighter color, which processing is done to the midrange colors (e.g. a contrast boost), and which processing is done to the darks. If e.g. a fast bending is found in the tone mapping, like in the example of FIG. 9 the strongly sloping part around 50%, then the tone mapping analysis unit 1114 may determine a demarcation point Ltr1 there. This information can then be used by unit 1113 to determine a smart re-grading for those midtones optimizing the contrast according to the preferences of the receiver manufacturer, yet taking into account both the semantic knowledge about the scene present in the grading specification of the grader, and, keeping at least somewhat in line in various embodiments with this re-grading intention of the grader, because these embodiments apply the re-grading on the original re-grading intentions as codified in g_nat.

Note that in this simpler example we assumed there were no further metadata parameters indicating a specific desire of re-grading from the grader (e.g. a gpm value), however, if the grader specifies such metadata in the input signal S_im, it may also be communicated to unit 1110. This unit may then take good care of this desire, e.g. by changing the gpm value within small tolerance, e.g. within 5% or 10%, or only over a limited sub-range of the luminance range, e.g. only change the look of the 10% darkest colors, while retaining the original desires of the content creating grader for the brighter colors, or alternatively even totally ignore the gpm value of the grader, and determine its own gpm value for unit 1103.

Some more advanced embodiments may also allow a viewer to have a say on the final look. Typically via an input connection 1121 to a remote control 1122, and via a user interface 1120, he may give some simple re-grading commands. E.g. he may have a 5-point scale to brighten the image. This may be communicated as a signal brel={−2, −1, 0, 1, 2}, which can be converted by unit 1113 to e.g. a number of stops brightness increase on the 10% darkest colors, and ultimately one or more gpm values, and maybe one or more demarcators (Ltr1, Ltr2) to do the corresponding brightening which will create an appropriate look for the viewer. Any such link can be made by the various receiver embodiments, e.g. −1 may correspond to a 10% increase in PB_D, transmitted as PBF value, etc.

Figure 12:
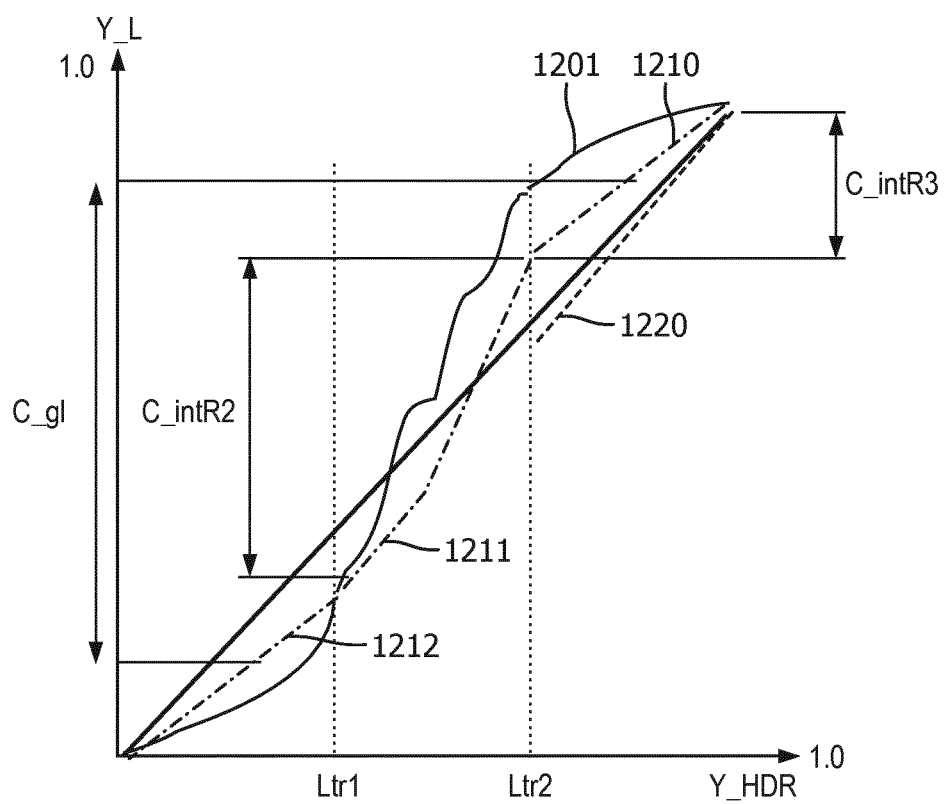
FIG. 12 schematically illustrates an exemplary processing to quickly tune rough contrasts of a re-graded look.

It was already elucidated above how with the present embodiments we can determine re-gradings which correlate with the important visual parameter of brightness, and with FIG. 12 we will simplifiedly elucidate an example of how one can image-semantically determine various contrast changes of the ultimate MDR rendering look with our various embodiments. Dynamic range or rather contrast ratio is a simple concept: the darkest color in the image versus the brightest. The psychovisually relevant contrast is a more complex parameter. Still, it can be determined relatively simply with our image-adaptive embodiments described above. Typically the ultimate contrast in a scene can be roughly estimated from two factors: the intra-object contrasts, which determine how well the textures of objects are visible (e.g. a facial expression, or the coarseness of that face, or the grains of a wood surface), and in particular when images of high contrast ratio are involved: the inter-object contrasts. In many HDR scenes, there may be only a few, oftentimes only 2, differently lit regions. E.g. the indoors average luminance, versus the outdoors. Or the average nightly street luminance, versus that of a couple of lamps. In HDR there may be various such average luminance sub-ranges, since the luminance range of e.g. a 5000 nit display is large enough. E.g., there may be a number of different whites, e.g. paper white indoors, white near a lamp, and the even brighter white of the lamp itself, and maybe an even brighter lamp. In LDR, not all these different brightness regions can be faithfully mapped. Actually, legacy LDR encodings are well-suited to encode all colors relative to white, or similarly the related 18% middle grey (and ending up however deep we can get in the noise and/or code quantization on the one hand, but also on the other hand, what the adapted visual system will see as blacks, e.g. below 5% linear of white), but not for such many differently illuminated regions. For some images the grader may for the LDR look have to chose to clip all different white regions to the same LDR white (R=G=B=255), instead of risking that some lamps will look grey. So e.g. the balance between the average brightness appearance for the indoors pixels on a 100 nit LDR monitor, and how much brighter the outdoors is perceived (where this outdoors may also need to be highly saturated instead of brighter but pastelized), i.e. the intra-object contrast for those two regions, may be a critical one depending on the processed image.

FIG. 12 explains how the receiver could balance the various contrasts in such regions, and hence the total contrast appearance of the rendered image. Curve 1201 specifies how the grader specified the tone mapping to obtain the 100 nit LDR image. We see a region which soft-clips for the brightest colors, a midrange region where a lot seems to be going on, i.e. there may be several critical objects there (say 3 actors differently lit), because there are a number of critical bending points in that part of the tone mapping curve, and a preferred mapping for the darker colors. If the image analysis unit 1110 determines two demarcators Ltr1 and Ltr2 for these important sub-regions, it can now propose various contrast balancing methods. E.g. it can determine that for the brighter colors, curve 1210 gives a more optimal contrast. That may change the look of that e.g. sunny outside region, because now the darkest pixels of this sub-region might be darker for say a 1200 nit MDR image than what the native re-grading to 1200 nit MDR would have proposed, but that may also be desirable for the receiver manufacturer. In this example the receiver has chosen to largely ignore the details of the grading for the midrange (which may or may not be wise for the quality of the finally rendered look, but depending on the application scenario may or may not be done), but still there is some adaptivity, because the slope of the tone mapping curve proposed by the receiver changes about halfway the midrange part 1211. In this example, the contrast ratio for the darkest pixels is the same for the receiver-proposed MDR look, as for the grader-proposed LDR look, however, the contrast is distributed differently, since the curve shape of the lower part 1212 is very different from the grader's intent (in this example, because ideally the receiver may want to follow at least largely the original shape). With these techniques the various inter-object and intra-object contrasts can be optimized, according to what the receiver desires after his analysis of the incoming images Im_in. E.g. the upper part of the curve 1210 (whether this is the result for 1200 nit MDR as proposed by the grader, or already from a first determination of unit 1110) may not be contrasty enough, i.e. the outside looks too bland. Then another bright part partial curve 1220 may be determined, with more contrast ratio and more contrast. This may mean that the middle part may need to be of lesser contrast, although of course also a strategy could be proposed which maps different Y_HDR values to the same Y_L values. In this way, both the second intra-object contrast C_intR2 and the third intra-object contrast C_intR3 can be optimized. But also this will determine the inter-object contrasts, like first inter-object contrast C_g1 (e.g. defined between the midpoint luminances of the brighter and darker sub-region, or weighed by pixel occurrences etc.), which conversely can also be optimized primarily by itself, potentially sacrificing some intra-object contrast, e.g. of C_intR3.

Figure 13:
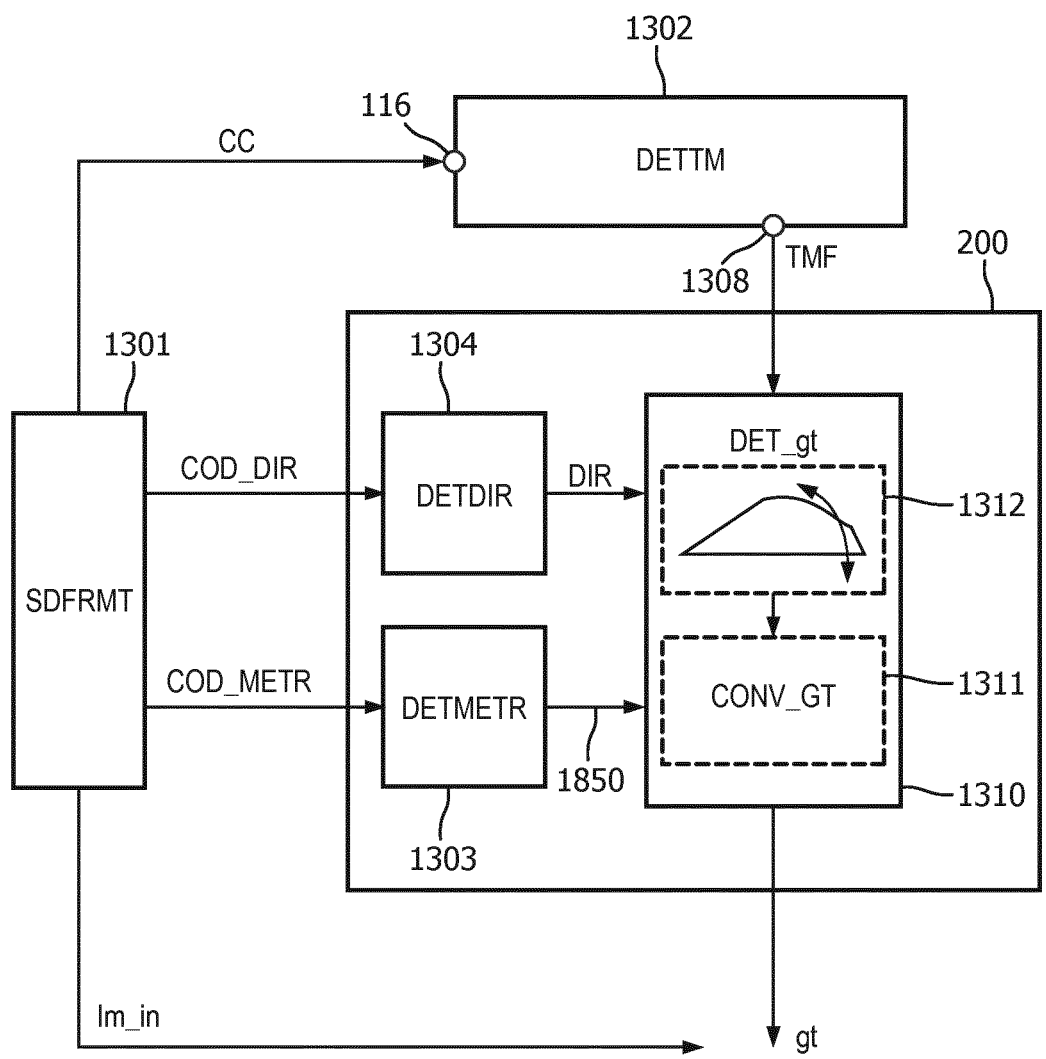
FIG. 13 schematically illustrates on high level component level what a typical display tuning apparatus to derive a MDR image will comprise.

FIG. 13 shows a generic embodiment for calculating the tone mapping. A signal deformatter 1301 obtains all necessary information. COD_DIR and COD_METR specify which interpolation direction (DIR) and metric to calculate positions of intermediate display peak brightnesses to use (e.g. as specified at the content creation side by a grader), and we will assume that those are 135 degrees, and the OETF-based metric which will be explained in further detail herebelow. In some embodiments which don't allow variation they may be preconstructed into the circuit layout e.g. in an apparatus embodiment which only performs vertical tuning. Tone mapping determining unit 1302 gets via metadata input 116 all information to construct a final tone mapping between the luminances of the input image (say a HDR image) and the corresponding second grading (LDR).

Because the second part of our method is that we need to establish color transformation functions between two typical looks on the HDR scene, typically a HDR and e.g. 100 nit LDR look. Via output 1308 it can supply this luminance mapping function in a suitable form (TMF), or in other embodiments a set of g multiplier, but we will assume here that the functional shape between input HDR and graded LDR output luminances is communicated, i.e. we will assume this to be just a function, which we will explain as a graphical map between the luminances, but can in technology be communicated e.g. as a LUT. This TMF will be input for the scaling factor determination unit (200), which will do the calculation of the transformation needed to obtain the MDR image, and present this for each pixel color to be processed as a suitable gt factor for multiplication (e.g. 1.53, or 0.872, etc.).

Before we can explain the detail, we will first give the reader some further understanding on what is happening.

Figure 17:
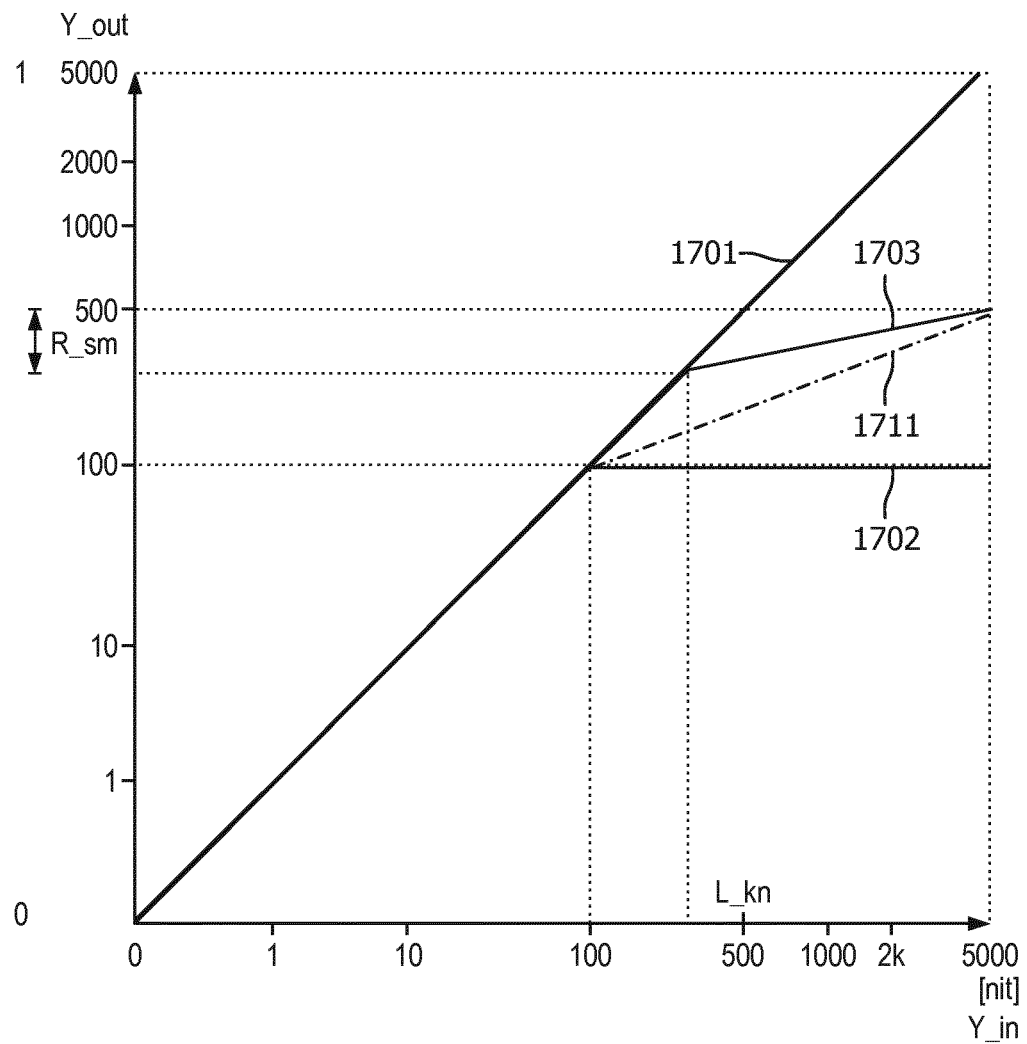
FIG. 17 shows an elucidation of the possibilities (e.g. desires of a color grader creation the artistically graded content for the HDR scene image(s)) one may have, to create re-graded or display tuned MDR images in various ways, e.g. according to the peculiarities of the HDR scene.

FIG. 17 shows with a rather simplistic grading example, what we want to achieve with the display tuning. We have shown the mathematics as an absolute view on absolute (reference 5000 nit) luminance axes, however, note that they have been perceptually uniformized according to our opto-electronic transfer function (P-OETF). So we are linear in code space in this representation, not in relative luminance space like in other graphs. The reader can approximately think as if the axes where logarithmic, but the exact mapping between relative [0.0, 1.0] luma coordinates of a reference display of in this example 5000 nit and the actual corresponding output are determined by (Philips EOTF):

$$Y = Lm * \text{power}((\text{rho}^v - 1)/(\text{rho} - 1); \text{gam}) \quad \text{[Eq. 6]}$$

In this equation, v is the relative luma (the reader may compare this to the lumas of an LDR signal, i.e. e.g. the [0, 255] image values divided by 255), which we assume to be a real-valued number, rho is a constant being e.g. 33, gam is a constant being 2.4, Lm is in this scenario the PB of the image encoding, namely 5000, and — and power indicate the power function. Note that in case we want to define an EOTF which ends at other e.g. higher PH_H values (or in this equation higher Lm, e.g. 10000), then we have to calculate another rho value by:

$$\text{rho}\_2 = (33-1) * (PB\_H/5000)^{(1/\text{gam})} + 1 \quad \text{[Eq. 7]}$$

So the equidistant values in [0.0, 1.0] on e.g. the x-axis of FIG. 17 get converted to actual luminances by calculation with the above equation. This function has as a property that the v values are more uniform for the non-linear human eye over a typical range of HDR display luminances, i.e. one may conceptually see this as a psychological lightness approximation.

Our Philips HDR OETF (P-OETF) is defined as the inverse of this function:

$$v = 1/\log(\text{rho}) * \log(1 + (\text{rho} - 1) * (Y/Lm)^{1/\text{gam}}) \quad \text{[Eq. 8]}$$

Now if we want to make a grading for say a 100 nit display, the reader may conceptually see this as if one displays on a 5000 nit display, but doesn't create any luminance above 100 nit (which is possible on a 5000 nit display, but not on a 100 nit display). A possible (rather bad quality, but good for explanation purposes) luminance transformation for achieving the LDR look (originally graded) image, is curve 1702. Basically we render with this curve all pixel luminances (of a received HDR image as Im_in) up to 100 nit exactly the same as we would render them if we were rendering the input image on its corresponding reference display, for which, and typically on which it was graded, i.e. a 5000 nit display. But all higher luminances we just clip to 100.

If we were to (theoretically) apply a luminance transformation to obtain a 5000 nit re-grading, from exactly the already 5000 nit Im_in we already have received from the color grader, then of course one would typically apply the identity transform 1701. Now what happens if we want to determine an intermediate re-grading for say a 500 nit MDR display?

Of course we could clip all luminances above 500, but that would probably not be the best re-grading we could make for that display, even if we had such a bad clipping HDR-to-LDR luminance transformation defined by the content creator. We have information of all the brightest object textures in the HDR Im_in, so for higher PB_D displays, i.e. if we have the capability, we would like to show some of that information, be it in a reduced quality version compared to the 5000 nit rendering (i.e. less brightness boost, less impressive contrasts, less sparkle and shininess depending on what the HDR scene and image is). One option would be to calculate curve 1711, if one considers that all objects up to 100 nit were rendered perfectly (and this "accidentally" was an interesting demarcation point, below which objects should be rendered with the same luminance on all actual displays). But we could also apply another strategy (which will correspond to calculating with another metric, and/or interpolation direction, and/or fine-tuning function for re-grading aggressiveness (gpm, gpr)), which shifts the point where one stops doing the equal luminance mapping, and starts squeezing in the brightest HDR objects to L_kn. This will yield a MDR luminance mapping curve 1703 for generating the MDR grading for a PB_D=500 nit actual display.

The reader will understand that which scenario we want to do, and how far we would like to shift L_kn above 100 nit, will depend on what is in the image(s). If there is not too much of interest outside, as often happens with broadcasts, for which what one sees through the window is typically already clipped or soft-clipped severely at present, one may live with a lesser amount of renderable luminances for those outdoors objects (range R_sm). This may be especially true if the indoors object luminances didn't exactly end at 100 nit (which they might of course depending on the careful grading the grader did) but e.g. he needed to (in this extreme example hard clip) clip some of the brighter parts of say some reflective objects on the table. As this may be the main part of the scene, to which the viewer is looking attentively, it may make sense indeed to also give those objects beautiful luminances and texture contrasts, by including them in the equi-luminance (diagonal) part, up to their maximum luminance, or at least closer to it, at the expense of the quality of the colors of the sunlit houses seen through the window in as seen in FIG. 14. This may be especially true also if one knows nothing extra about the image (of course if the grader specifies a COD_METR and COD_DIR to use, this already conveys somewhat which situation one has, but assume the grader only made a TMF, and the receiving apparatus has to autonomously determine everything else, in a simpler display tuning strategy, yet which should still give as reasonable visual quality for the MDR images as possible), since then one may assume that probably there will be a couple interesting luminances above the low quality 100 nit value, since this is a HDR scene, so one might as well divide the errors by putting the L_kn point a little higher than the haphazard 100 nit (the grader might have taken care of the indoors luminances already in his HDR master grading, i.e.

lighting them satisfactorily, and since that is not so easy to make them exactly fit the LDR/HDR framework, grading the indoors to appropriate luminances, but it is not always certain that he will have put the indoors objects exactly in the LDR sub-range already in the master HDR grading).

However, in an alternative scenario where the grader knows that all the darker pixel regions fall in the 100 nit part, and that there are important textures somewhere in the above 100 nit part, which need maximum contrast or a maximum amount of possible usable luma codes and luminances (for arbitrary luminance mapping functions), the grader may want to keep the L_kn point at 100 nit for all MDR re-gradings. So the reader understands that display tuning (also called tunability) can be made simple if one desires, but one may like some additional technical means for allowing for the complexity of HDR scenes and images also in the more difficult cases, yet still in an as simple as possible manner for the grader who may need to determine all factors and parameters.

Now if we want to see what happens in the reference frame of a particular display, let's say a PB_D=500 nit display, we can cut from the map in FIG. 17 only the part which runs up to Y_out=500 nit. The maximum of this representation, is than the maximum one can render on a 500 nit display, i.e. which one should do by presenting to it the maximum luma code v=1.0. So ignoring the nit labels we put in the map for clarity, one can see the FIG. 17 re-grading specification as a specification in luma code space (be it that although on the input axis one can nicely read equidistant luma codes, of course on the y-axis in this representation the v=1.0 will fall at different heights for different displays with different PB_D (the reader can assume for his understanding that these different displays are all emulated on a 5000 nit display, which hence must stop rendering at a certain luma vx depending on the PB_D capability of the emulated display).

Figure 18:
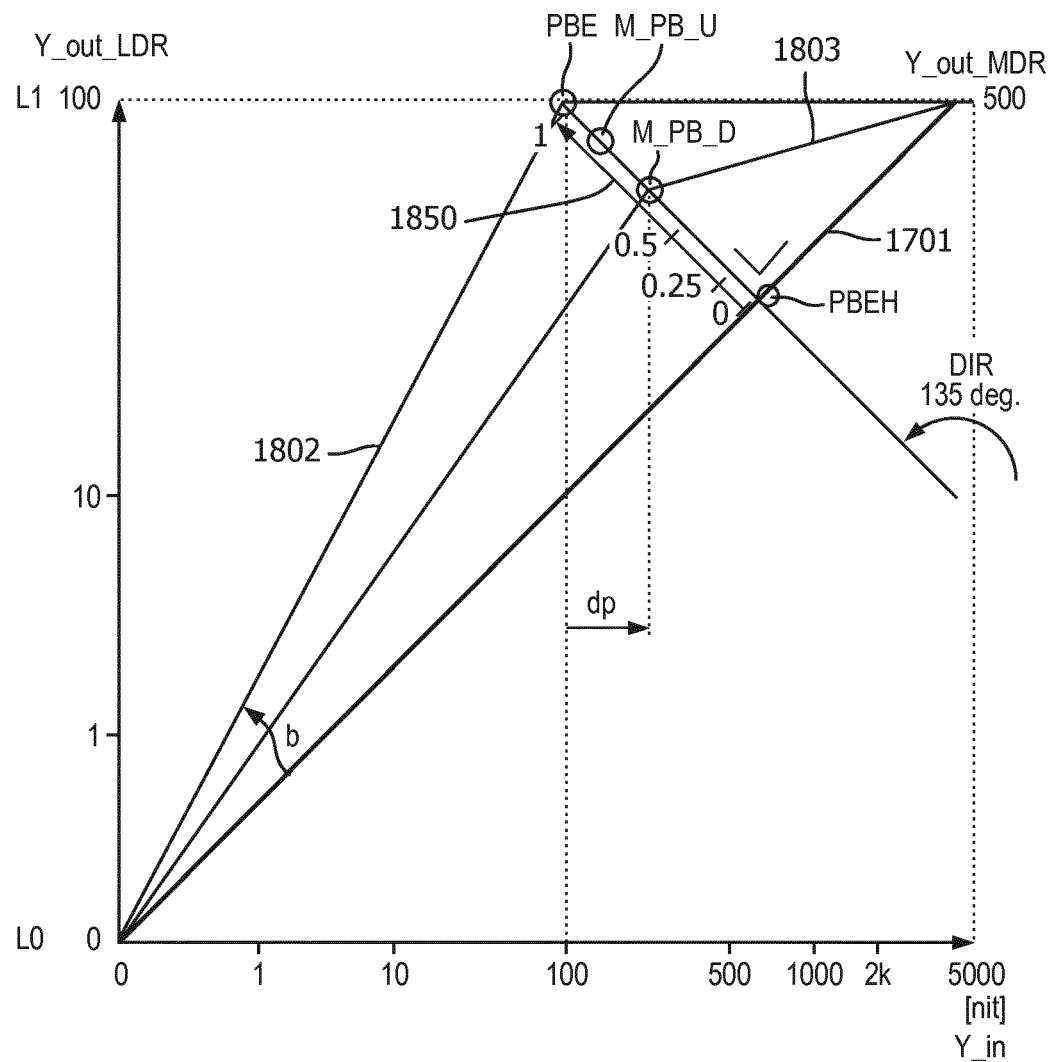
FIG. 18 shows the same example, but now viewed in a mathematical coordinate system corresponding to the LDR grading of the received HDR and LDR image looks on the HDR scene, and in this example showing a possible directional MDR luminance transformation function determination.

FIG. 18 shows the same exemplary transformations, but now on an axis system from which we can start for deriving the needed HDR-to-MDR luminance transformation function starting from the HDR-to-LDR color transformation specification received in metadata associated with the video signal S_im. The horizontal axis is the same, since these are the possible pixel luminances of our 5000 nit Im_in. The vertical axis should determine the relative luminance of a re-graded MDR pixel color, again on a perceptually uniformized scale with our P-OETF, i.e. between zero and a value L1 (or in other words its corresponding luma code). For the 100 nit grading, this L1 value, which corresponds to the maximum luma code, e.g. 1023 in 10 bit, or 4095 in 12 bit, this will be 100 nit. We see again that for HDR luminances up to 100 nit, according to the grader they should be rendered on 100 nit LDR displays with exactly the same luminance as the 5000 nit image prescribes, and above that the LDR grading clips everything to PB_L=100 nit.

We also see e.g. that in this representation, to get the same rendered luminances for the dark greys on the LDR display as on the HDR display, one will need to increase the lumas of the LDR picture (which can in this chart also be read, uniformly between L1 corresponding to v=1.0 and 0), i.e. we need to increase the dark slope or gain by an angle b, compared to the relative HDR values (here on the "wrong" 100 nit axis shown as the diagonal, because they would need an axis ending at 5000 nit to know what corresponds to maximum luma, of either the input image, or the theoretically calculated output image by doing an identity transform). How now do we derive the needed MDR mapping curve 1803 for relative driving between minimum and maximum (minimum and maximum luma now corresponding for this PB_D=500 nit display to 0 respectively 500 nit, which is shown as Y_out_MDR on the right of the graph), i.e. this Y-out_MDR for any Y_in of Im_in? We draw the line orthogonal to the diagonal (the HDR5000-to-HDR5000 mapping 1701), and put a metric (1850) on it. This metric will have values between no luminance change, or "0", and "full" change (or "1"), yielding the LDR grading. Now we can locate the position M_PB_D corresponding to any PB_D on this metric (see calculation examples below). In case we want the look to look (for this actual display with PB_D, but a particular critical scene, which needs to look more LDR-ish for a longer time when moving PB_D upwards from PB_L=100 nit) more LDR-like, we can determine another point M_PB_U, e.g. with embodiments as described below. One can see the "halfway" point as corresponding to a display which is as regards its PB_D (non-linearly) about halfway between a PB_H and PB_L reference display, as regards its look, i.e. its HDR capabilities. Now suppose that the bending point PBE is not actually like in this example simply where the clipping starts because of the limited PB_L 100 nit value, but a special critical point in the grading (which may have been communicated by at least one parameter (a parameter in the metadata which specifies the color transformation relationship of the LDR and HDR original grading from the grader), e.g. its relative location on the Y_in axis between 0.0 and 1.0, and its height on the Y_out_LDR axis). Now we see that in this rotated interpolation version, this semantically important point need not stay at the same Y_in position as with vertical interpolation embodiments, but can shift over an offset dp, which makes this particular manner of display tuning elegant for some scenarios (it may e.g. also be useful for HDR-to-LDR functions which clip the blacks below a HDR luminance L_Hb to 0 in the LDR grading).

Figure 19:
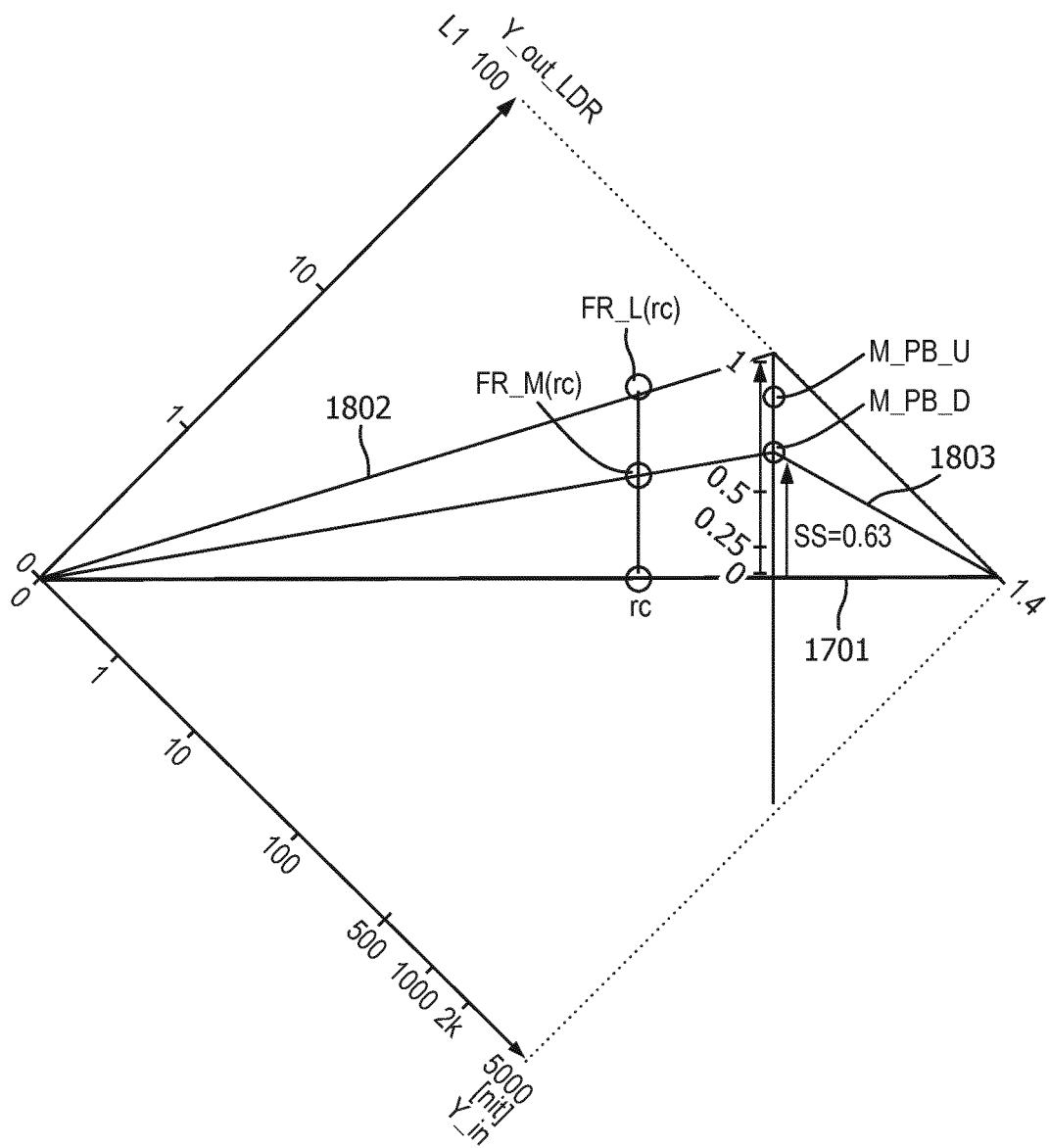
FIG. 19 shows correspondingly how such particular MDR derivation embodiments can be formulated on a rotated scale, and explains the ensuing technical consequences and solutions decided by the inventor.

In FIG. 19 we show how we can derive the full MDR luminance transformation function 1803 for obtaining the MDR image starting from the function defining the LDR grading (1802), in a rotated framework. It should be clear to the skilled person how the directional interpolation unit (1312) can calculate a new running x-coordinate rc corresponding to the Y-in coordinate, and how one can rotate a function. This function may be kept e.g. in a temporary memory. Now we need to determine a multiplicative scaling value S, e.g. 0.63 (the definition will follow below), and that will give the required points of the MDR curve. We have as an example shown how the bending point moves to the new location (M_PB_D if we put the metric there), but all other points, whatever the shape of the function, will change by the same multiplicative principle. So if one takes a running coordinate rc, and the corresponding LDR luminance mapping function is FR_L(rc), then the required value for the HDR-to-MDR color transformation function will be determined as FRM(rc)=S*FR_L(rc). Afterwards, the curve can be rotated again so that we get the values in the FIG. 18 framework, and these values can again be put in a memory. What will actually be needed for the per pixel processing are gain values, so embodiments of the scaling factor determination unit (200) will typically store a LUT of gt values for all possible Y_in values (or in fact, in our preferred embodiments we used RGBmax values, but they vary similarly between 0.0 and 1.0).

Figure 16:
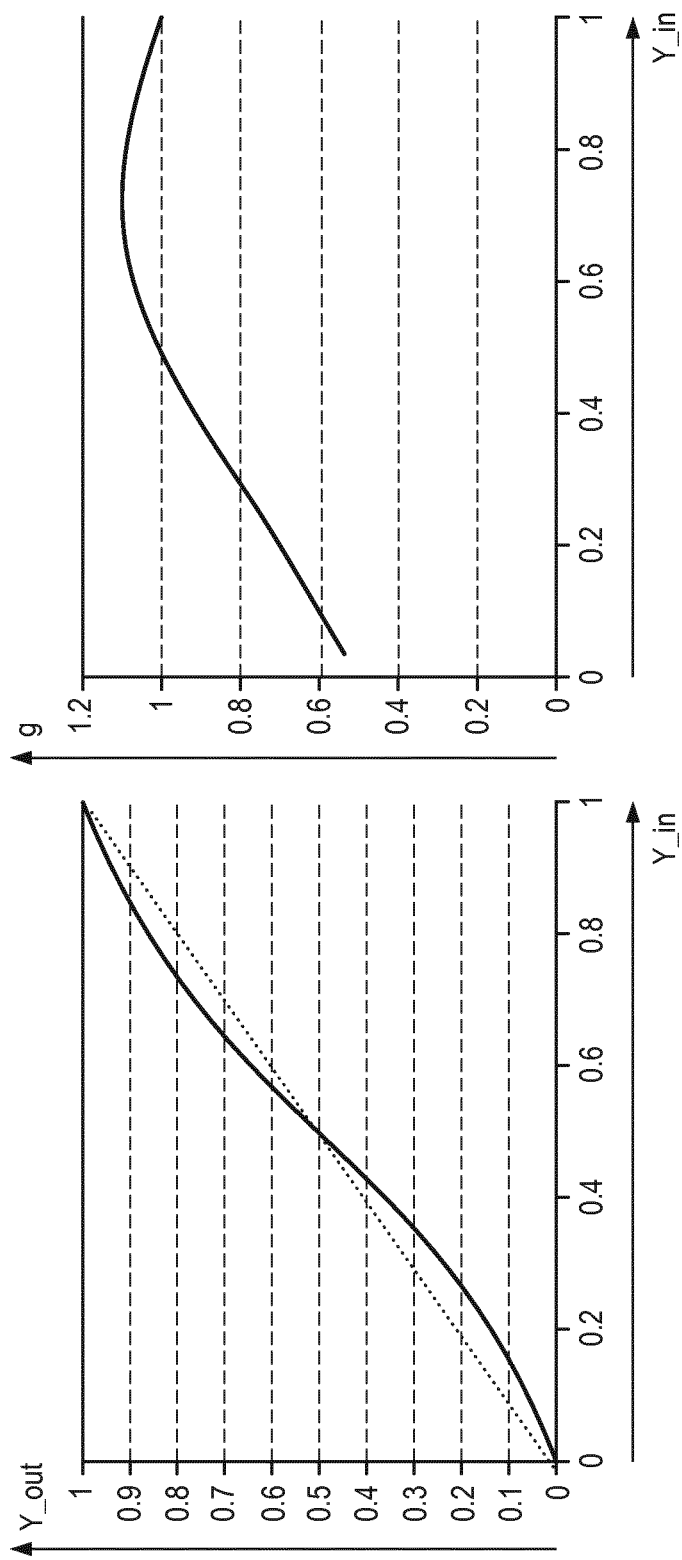
FIG. 16 explains by an example how we can in our framework see the required color processing as a multiplicative mathematical formulation.

The calculation of these gt values can be done by comparing the height of the calculated MDR luminance transform function for the to be service PB_D display with the height of the diagonal for all input values, and then obtain the multiplication value by the division of those two, as shown in FIG. 16.

Figure 20:
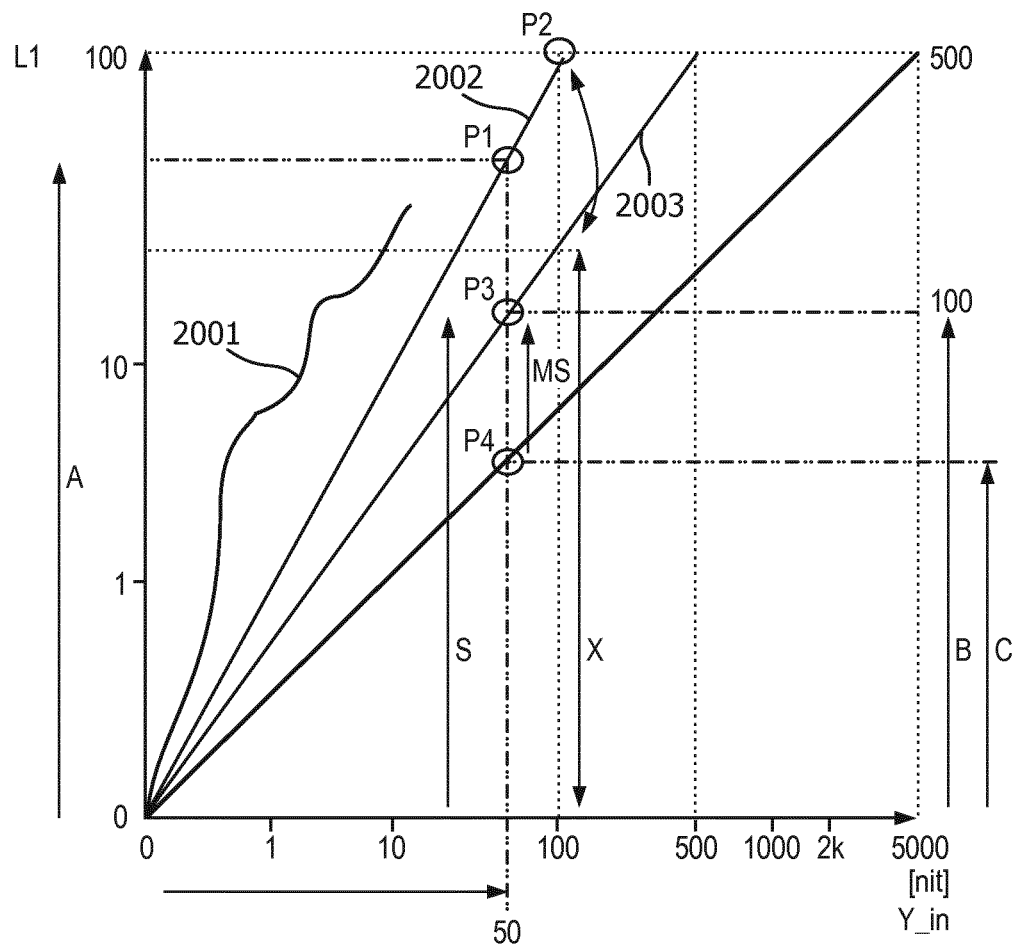
FIG. 20 explains how one can see the meaning of one possible metric one can use with the present invention.

Now FIG. 20 shows how to define a well-performing metric for obtaining the scaling factor S.

Suppose we want to derive an MDR image (and the function determining the luma values which are required when having an input image luminance or luma value) for a display of e.g. PB_D=500 nit. We need to scale the driving values, to get all object luminances correct in relation to the driving curve for LDR. So we reference everything in the typically always (because this is a legacy standardized value, but things could change in the future and our technical principles would stay the same) 100 nit framework of that SDR luminance mapping function 2002. Suppose now we want to e.g. keep the darker brightnesses looking the same for all three displays (HDR, LDR and MDR), how much do we have to move a point P1 or P2 downwards then, towards the diagonal corresponding to the HDR grading, or towards the horizontal input axis, to get the correct point P3 on the MDR curve.

Because one needs to read this MDR curve on the 500 axis on the right, we will introduce the following mathematical equations:

$$A = P\_OETF(Lm/PB\_L, PB\_L)$$

$$B = P\_OETF(Lm/PB\_D, PB\_D) \quad \text{[Eqs. 9]}$$

These are our above defined loggamma HDR OETF functions, but now not ending at 5000 nit, but at the second value after the comma, e.g. PB_L=100 nit (typically). I.e. this generates a perceptual axis with a running coordinate which stops at 1.0 for e.g. 100 nit, which is the y-axis of this map. Lm is in this scenario a 5000 nit value of Im_in, but could be different for other master HDR encodings.

Figure 23:
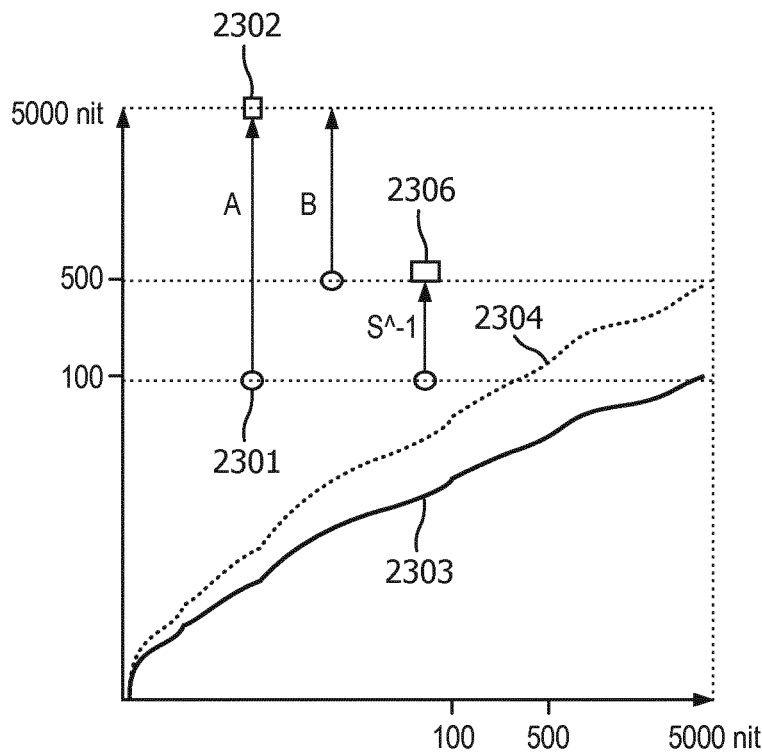
FIG. 23 is a graph showing how one can scale between normalized representations which reference 1.0 relative luminance to different values of absolute luminance (typically PB_D of the display for which to calculate a re-grading)

FIG. 23 shows the physical meaning of the elementary conversion scale factors (A,B) in another manner. We can also see the P_OETF as a re-normalized function which doesn't end at 1, but goes to e.g. 5.0 (and then later since this is just a multiplication of the maximum, if one needs ratios, one could achieve the same in a normalized to 1 version). So we need to transform the HDR-to-LDR grading luminance mapping curve 2303, to get the appropriate MDR curve. That should not be the curve 2304 because that is merely applying the LDR grading to a brighter PB_D display, which will give too bright a look. Scaling the darker luminances in an image for an equi-look (i.e. having the same rendered luminances for those e.g. 10% darkest colors on any MDR display and the HDR and LDR reference displays), will yield the same stretching factor for the perceptual axis to a new normalized version (i.e. 1.0 corresponding to e.g. 500 nit) as determining this value from the white (1.0). Here we now show the behavior of our color transformation not in a relative axis system normalized to 1.0, but an absolute one on a 5000 nit reference luminance axis. To natively (just apply the LDR curve not taking into account the higher PB_D) transform a 100 nit luminance (e.g. white)—purely as regards axis renormalization, so neither taking into account yet any specifics of the luminance transformation curve specified by the grader, or any control parameters regarding the interpolation of luminances like gpr—we have to boost a color 2301 to its 5000 nit equivalent (i.e. not taking into account yet the appropriate counter—action of the smart re-grading).

I.e., we have to determine on the P-OETF-perceptualized y-axis with which amount to stretch the vector. If the hundred nit corresponds to 1.0, then we find the value 2302 by multiplying by say 1.7. We can do the same if we were reading points on a 500-nit referred representation of the curves, i.e. one in which 500 nit corresponds to the maximum possible luma (1.0). If one transforms this luminance to a 5000 nit represented version, then one gets the B factor of say 1.3. Now what we are actually interested in is how to transform a color 2305 which was determined for the LDR grading, i.e. in the 100 nit system (e.g. an input HDR luminance of 500 nit should be LDR rendered as 30 nit) into the reference system of a 500 nit display. E.g., if we were not to change the values coming out of the transformation, what would those than mean in the new reference to 500 nit (which is the right side axis in FIG. 18, Y_out_MDR)?

We can see that multiplying y-value 2305 with S^−1 to obtain value 2306 corresponds to multiplying it with A/B. But this would not give an equi-look, because then everything just becomes 5× brighter on a linear scale, and X times on a perceptualized scale. So to keep the equi-look constraint, we should multiply the value 2305 with S=B/A (to have the correctly scaled MDR driving curve, when starting from the LDR one, but now referenced in the axis system where 500 nit is 1.0 maximum luma or relative luminance, which doesn't yield the dotted curve 2304, but the curve 2303 which will be the desired MDR grading curve, but now interpreted in the 500 axis, rather than its original 100 nit y-axis). Since all this are relative multiplicative operations, one can do them pretending all happens in an axis system where 1.0 corresponds to 100 nit, but if one needs an actual rendered luminance, one will read it on the Y_out_MDR_axis.

So when scaling vertically towards the x-axis, one would obtain a scale factor of S=B/A.

Important is that whatever the PB_D value, one can define the scale factor (one could even extrapolate if desired), and hence one can make a metric.

If our target display would be PB_D=PB_H=5000 (=Lm), we would need to arrive at the P4 point of the HDR grading (identity transform), i.e. when looking at it from a multiplicative point of view we would need to scale the LDR value for this input (HDR Im_in luminance 50 on the x-axis), for this grading also A=50 nit on the left LDR y-axis, by a scale S=C/A, in which C=P_OETF(Lm/PB_H, 5000). We can see that because this would yield the v value for an optical luminance input of (normalized) 1.0, and assuming that this diagonal HDR grading makes all luminances give equal luminances out (i.e. for luma 1.0 in getting 5000 nit in and out for the HDR grading, one would correspondingly get the correct value for all other points on the line, i.e. also for this e.g. 50 nit, which happens to be the vector size of the HDR_5000 nit scale [not shown] at the input point to be color transformed).

Now one can mathematically prove that if one wants to interpolate diagonally, more specifically at 135 degrees, the scaling function becomes SS=[(B−1)/(B+1)/(A−1)/(A+1)].

One can also associate with this a metric position on a line between the HDR luminance point P4, and the LDR luminance point P1, as we have done in FIG. 18. This would correspond to a metric offset, or in general running coordinate MS, which in the vertical embodiment can be stated as Y_MDR=Y_HDR+MS*(Y_LDR−Y_HDR). Also in the generic situation such a coordinate MS would run between MS=0 for PB_D=PB_H, i.e. when one needs a MDR grading which is identical to the HDR grading, and 1.0 when one needs the LDR grading.

Just as with this simple elucidation, the reader can understand that the same transformation scheme would apply if we had a general TMF function 2001 defining the LDR grading from the HDR grading as input.

So in our construction schematic of FIG. 13, directional interpolation unit (1312) will rotate (do corresponding math, e.g. obtaining a LUT of rotated values for the input axis of FIG. 19) the received function, determine the appropriate scaling factors SS, calculate the function corresponding to the MDR re-grading in the rotated framework as explained above, and re-rotate to the framework in which the Y_in axis is horizontal. So one then has, e.g. in a LUT, the function values Y_out_MDR for input values Y_in. Then common multiplier determination unit (1311) will convert that function to a correspond set of (LUT of) gt multipliers, since our typical color transformation framework will work with those as explained.

Up to now we have described embodiments which are agnostic to how the color transformation functions have been defined, and in particular have been parametrized. The above processing can work on any function values, and we explained them as if they were a pure LUT.

However, there may be interesting semantic information in the manner in which the grader defines the functions. E.g. he may define a multi-segment luminance processing function with a lower segment for processing the darker colors, e.g. indoors colors, and a second higher segment specifying what should be done to a brighter segment, e.g. outdoors colors. This luminance transformation behavior may be communicated to the receiver by e.g. a parameter Lt, which is then also a demarcator between the outside and inside luminances. Many alternative parameterization philosophies are possible. It may be needed to shift the luminance position of this threshold at least in some MDR gradings, at least for some types of HDR image (e.g. instead of wanting to keep the indoors colors looking the same on all displays, the grader may decide to use a little of the higher capabilities of HDR displays say above 1500 nit, to brighten those indoor colors somewhat also). Both shifts along the x-axis and along the y-axis may be advantageous. It all depends on which colors are present in the image, and which appearance contrasts the grader wants, etc.

We will give one interesting example for elucidating a possible parametric embodiment.

Figure 21:
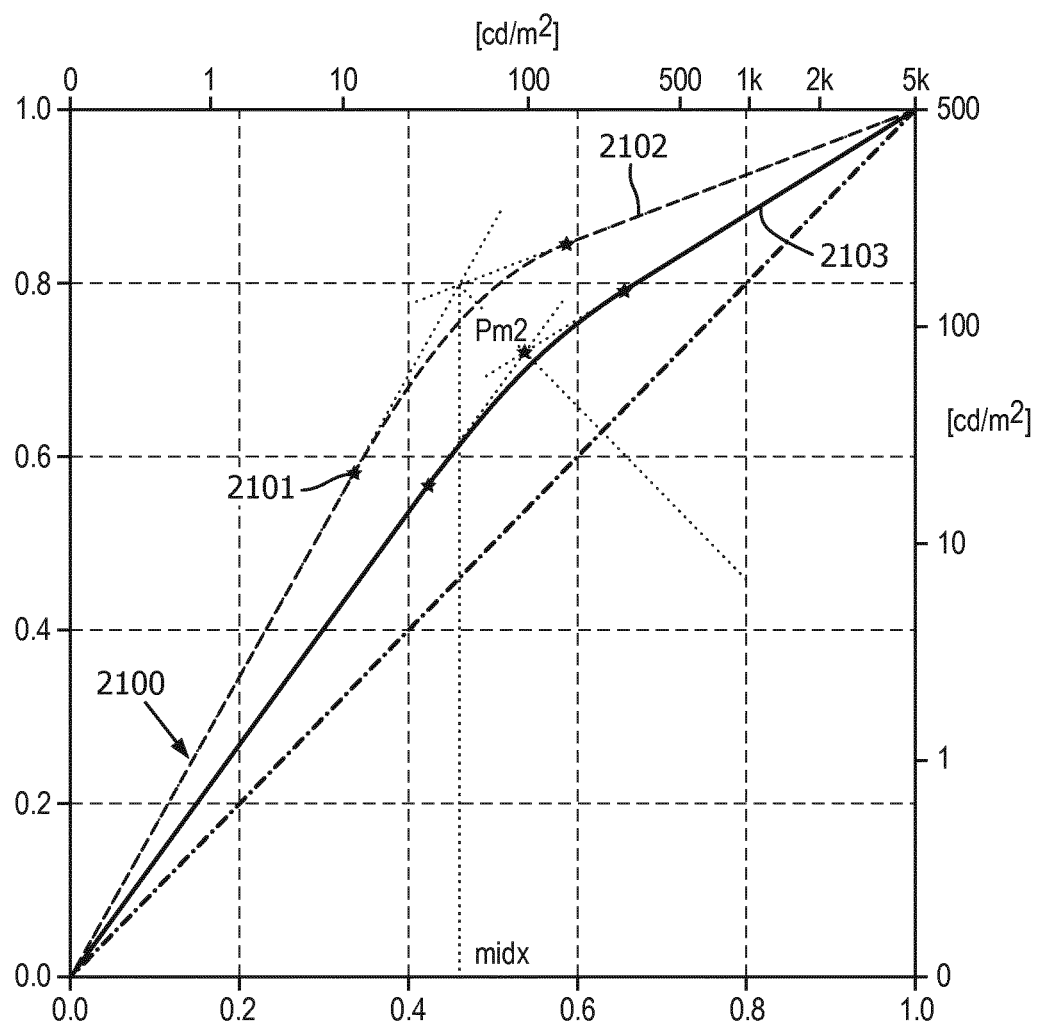
FIG. 21 elucidates how one can take in the MDR generation process account of parameters of HDR-to-LDR or LDR-to-HDR color processing functions which are defined parametrically, and how one can—blindly or guidedly—vary those parameters when needed, e.g. the positions of specific luminance demarcator points, and how the calculation of the MDR colors then follows in such a technical formulation.

FIG. 21 shows an example of an interesting HDR-to-LDR luminance transformation strategy which we have put in the basic toolkit which defines our HDR look bundle encoding technology (this would correspond to a particular embodiment of the custom curve of unit 111, but instead of being communicated as a LUT we would communicate this function as 5 parameters; of which the mapping curve of FIG. 21 can be described with 3: a slope of ascent speed for the darkest image colors starting from 0.0 [shadow gain control]; a slope of descent of the highlights i.e. the angle with which the upper linear part turns downwards, and a width, or half width of a parabolic section in between: a midpoint midx can be uniquely determined where the linear parts cross, and then the parabolic section can extend from midx-width/2 to midx+width/2). We have now shown on this graph the normalized (e.g. 10 bit) lumas, and opposite to it corresponding luminances, on top for the 5000 nit HDR input image, and on the right immediately the luminances of the MDR 500 nit output image which can be calculated from the HDR input image, removing now the 100 nit details (which were used above for easily explaining our concepts).

The grader again specifies an HDR-to-LDR (i.e. 100 nit) curve 2100, but now with this specific function formulation. It contains a dark gain (slope dg) which determines how bright the darkest colors would look on the LDR graded image. This is important, because if in the HDR scene there are very bright objects like lamps which are still faithfully captured in the HDR lumas, the shadowy regions of the same scene may fall very deep on the normalized axis, and may hence need to be considerably boosted in the LDR grading to still be able to see what is happening there. The dark regime ends at point 2101. For the brightest colors there is a similar linear segment with highlight gain hg. In between there is a parabolic segment of a width corresponding to the endpoints of the linear parts. This can control the contrast of in-between grey objects.

Now we see that the parametrically communicated special points have a changed location on the MDR luminance transformation curve 2103. One can calculate these changed locations using the direction DIR, and in particular the metric.

$$midx=(1-hg)/(dg-hg)$$

then one calculates a new midpoint Pm2 with coordinates newMidx and newMidY:

$$x0=midx; x1=dg*midx; y0=dg*midx; y1=midx$$

$$m=(y1-y0)/(x1-x0)$$

$$b=(x1*y0-x0*y1)/(x1-x0)$$

$$newMidx=((x1-x0)/2)*(1-SS)+x0$$

$$newMidy=m*newMidx+b$$

From this we can calculate the new width of the parabolic region, and hence the two termination points of the linear segments:

$$newWidth=(1-P\_OETF(SS,PB\_H))*old\_width$$

in which old_width is a parameter of this curve as determined by the grader, namely the width of the parabolic segment, namely a width from asymmetrically or symmetrically projected to both sides from where the continuations of the linear segments meet at the so-called midpoint. And then of course the new dark gain and highlight gain can also be recalculated:

$$newGg=newMidy/newMidx$$

$$nwHg=\max((newMidy-1)/(newMidx-1),0)$$

The reader can understand one can design recalculation strategies for interesting points, or other parameters of luminance transformation functions for other scenarios. The interesting takeaway from this example is that the receiving side apparatus can calculate new parameters for the ultimate curve to apply to obtain MDR from reconstructed HDR (or even from SDR directly), and that this depends on the established scale factor SS, which by itself depends not only on what PB_D value one has at the receiving side, ergo how much the optimal look image for it would correspond to the HDR respectively the SDR look, but also the angle selected for the curve determination (e.g. 45 degrees turning to the left starting from the vertical). So some of our embodiments work by re-calculating luminance mapping function defining parameters, and according to the oriented metric principles.

Knowing how to do the basic calculations (which simple embodiments can apply which are largely blind of the image specifics and the grader's desires, yet still need to produce reasonable MDR re-graded images for the available display(s)), we will now give a couple of more elucidating embodiments on how the grader can vary on this, by incorporating a few more technical control parameters adapted to the particularities of the current HDR scene.

Figure 22:
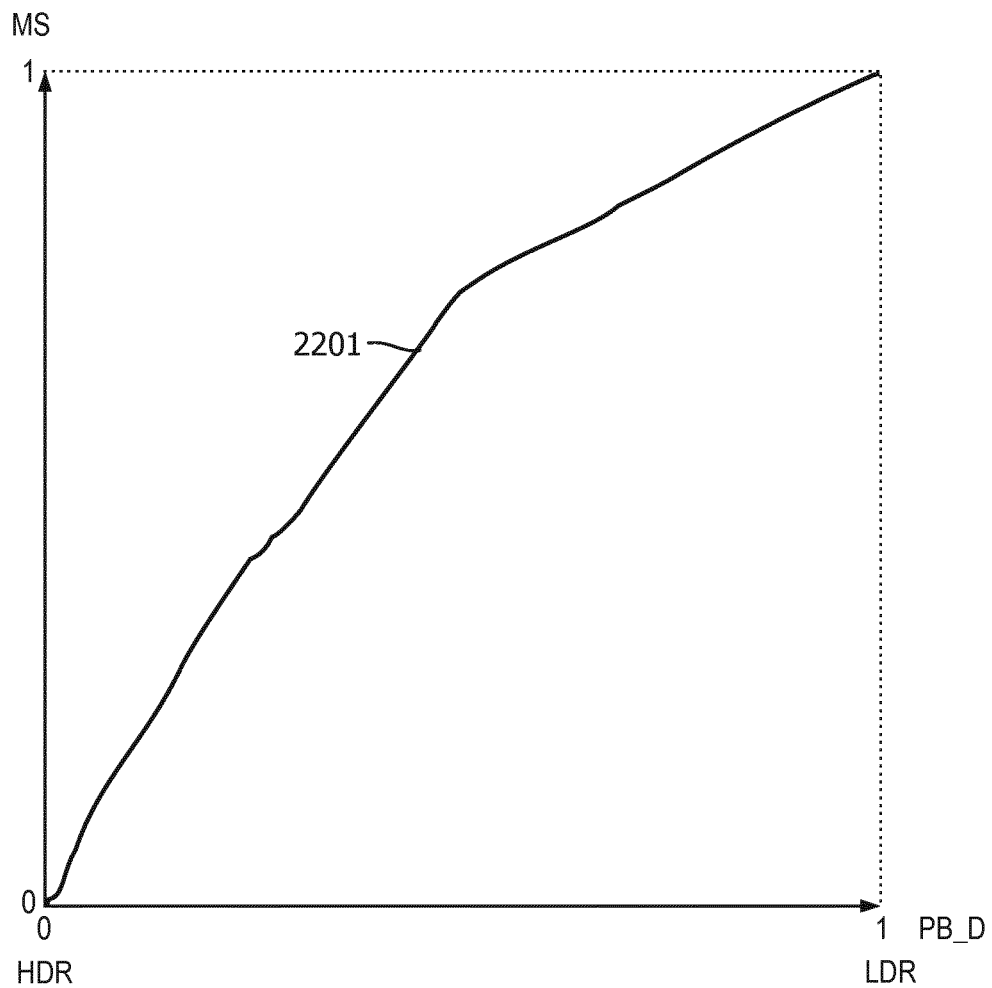
FIG. 22 shows another possibility to specify the MDR look generation colorimetric behavior, e.g. by a color grader who can communicate this information to any or several receiving sites.

FIG. 22 shows how one could for a specific HDR scene, or shot of images, immediately encode which MS value would correspond to which available PB_D. As should be understood from the above, for our MDR luminance mapping (or in general color transformations) derivation, one needs firstly a means to position on the metric (i.e. between 0.0 and 1.0 or even outside that range for extrapolation) the point M_PB_U, which can be done with the normalized coordinate MS. And then from this value one can convert that whatever shaped luminance mapping function for performing the HDR-to-LDR (or LDR-to-HDR in other scenarios like mode 2) color transformation to the function needed for calculating the MDR image. Now if one has an explicit metric position determining function (2201), e.g. communicated as a LUT, or a simple equation, one does in principle not even need the basic metric definition. It may be advantageous if the grader can determine such a function in an easy manner, e.g. one may use a power law for which the grader can change the power by e.g. turning a knob. He will then immediately see on his MDR display how the total look of the image changes, or, focus on a critical area, like e.g. on a monster in the dark which he likes to be visible to a reasonable degree, to ensure it will be similarly reasonably visible on all other actual displays at viewer's premises.

Figure 15:
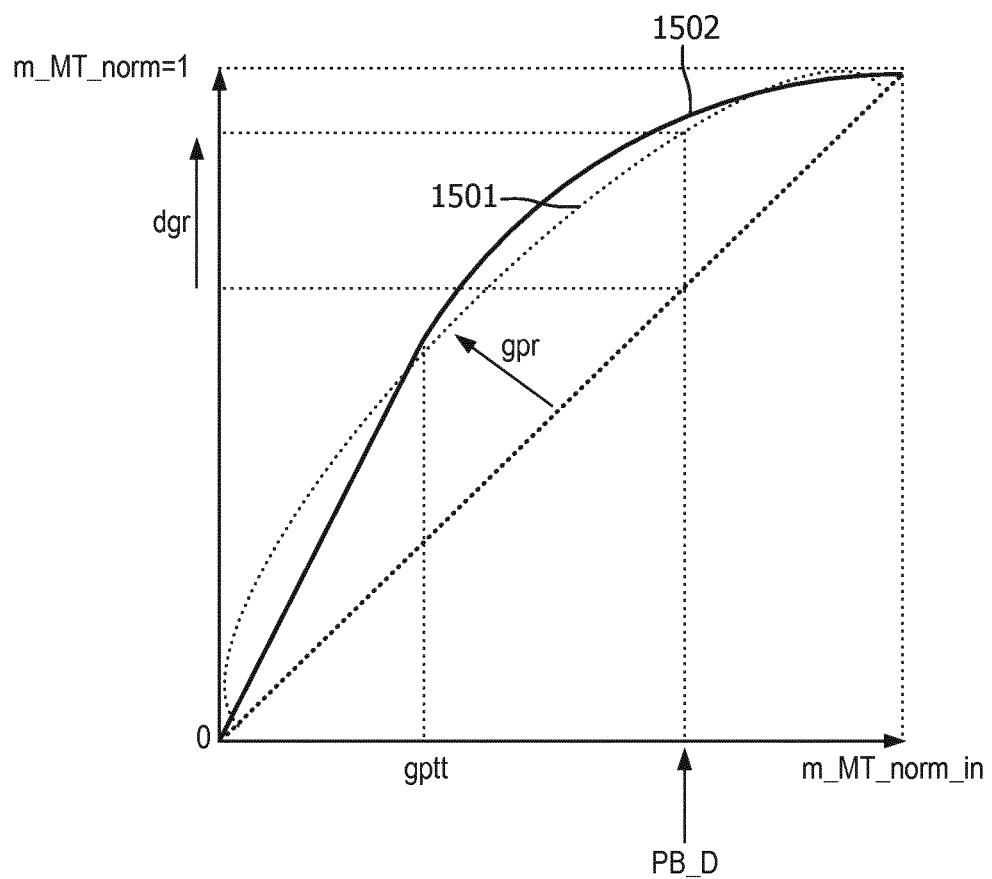
FIG. 15 shows one possible embodiment of how one can further influence the look of calculated MDR images, e.g. by a human color grader from the content creation side, i.e. typically some time before the image(s) is actually viewed.
Figure 15:
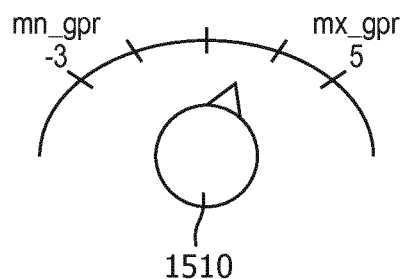

But, when having a good metric, one can also design fine-tuning variations as shown with FIG. 15. Here m_MT_norm in, is the MS value for our particular chosen metric, i.e., it will again run between 0.0 and 1.0. So we can calculate a value for a particular display of PB_D peak brightness. If the grader doesn't specify anything, the resultant m_MT_norm as output would be the same, and the standard automatic display tuning as in any of the above explained embodiments would apply. However, the grader can specify functions which deviate from this shape, preferably smoothly, and end at the 0.0 and 1.0 coordinates. E.g. he may design a power function, the power parameter gpr of which determines how strongly a MDR re-grading should look e.g. like a LDR grading as shown, even for very high PB_D displays (i.e. m_MT_norm in approaching 0), or the other way around (as seen by the position of the resultant M_PB_U point offsetted by dgr). He can even formulate for complex functions, which may have e.g. a different behavior for displays above a particular peak brightness, which behavior may be codified by a second parameter gptt, or even more parameters, e.g. defining a linear lower part of the curve, etc.

So the reader understands our technology can employ several metrics (e.g. several relatively similar OETF definitions, which roughly correspond to equal lightness steps, or other functions modeling such lightness behavior of the gradings), and also several interpolation directions, and several ways to determine them. E.g. in a simple apparatus it may be fixed in the hardware, and determined as such by performing the calculations on e.g. a processor, and more complex embodiments may e.g. switch between MDR calculation strategy, e.g. per shot of pictures in the movie (or even for parts of an image, e.g. the lower brightnesses may be interpolated with one metric, or even one direction, and the higher ones with another, and depending on the scene it may not be so critical where all interpolated colors project), e.g. under the communicated control principles from the human grader received from the content creation side, typically as one or a couple of easy parameters, which do have a primary major impact on the look of the MDR images though.

Figure 24:
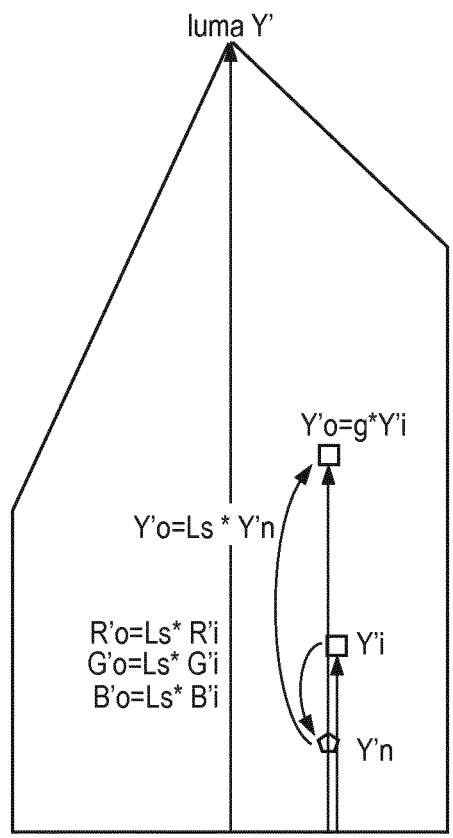
FIG. 24 shows an elucidation how one can convert some of our embodiments into equivalent other embodifications yielding the same output colors.

FIG. 24 shows how one can colorimetrically represent any mapping (within the same gamut, e.g. normalized to 1.0) from a first pixel luminance or in this example luma (defined by some linear equation from linear luminance, respectively from non-linear R'G'B' color components which are related to the linear additive red, green and blue color components via some non-linear opto-electrical transfer function OETF, i.e. R'=OETF(R), G'=OETF(G), B=OETF(B), with the OETF e.g. the SDR one as defined in Rec. 709), e.g. the HDR luma Y'i to a second luma, e.g. the luma Y'o of the corresponding LDR graded image, in two manners. Firstly as exemplified above, one can apply a multiplicative function with a color-dependent (in in case of local processing possibly even pixel-dependent) g scalar multiplier value. This may be achieved by equivalently multiplying the non-linear red, green and blue color components of the HDR color to obtain the LDR color (or vice versa because or methods can work in the other direction, e.g. deriving an HDR grading from an LDR grading, which is typical for mode-ii HDR encoding systems which encode HDR looks of a scene by communicating a set of legacy SDR 100 nit images). However, one could also start from any reference scaled luma (or luminance) value Y'n, referred to some level, and scaling that value (or equivalently its R'G'B' or RGB color components) by some scaling luminance value Ls. In case Y'n is the LDR luma Y'i itself, we have again the above multiplicative realization, as exemplified e.g. in FIG. 1 (and it doesn't then in principle matter how the g factor has been calculated, i.e. based on which chain of calculations for obtaining e.g. an f(Max)/Max value, or an F(Y')/Y' value, etc.).

As said, our display tuning principles are broadly applicable and can be embodied in various apparatus circuit forms, in particular in various color spaces. Below we give a couple of embodiments based on a non-linear luma of an SDR (i.e. 100 nit PB LDR) input image received by a HDR decoder.

Figure 25:
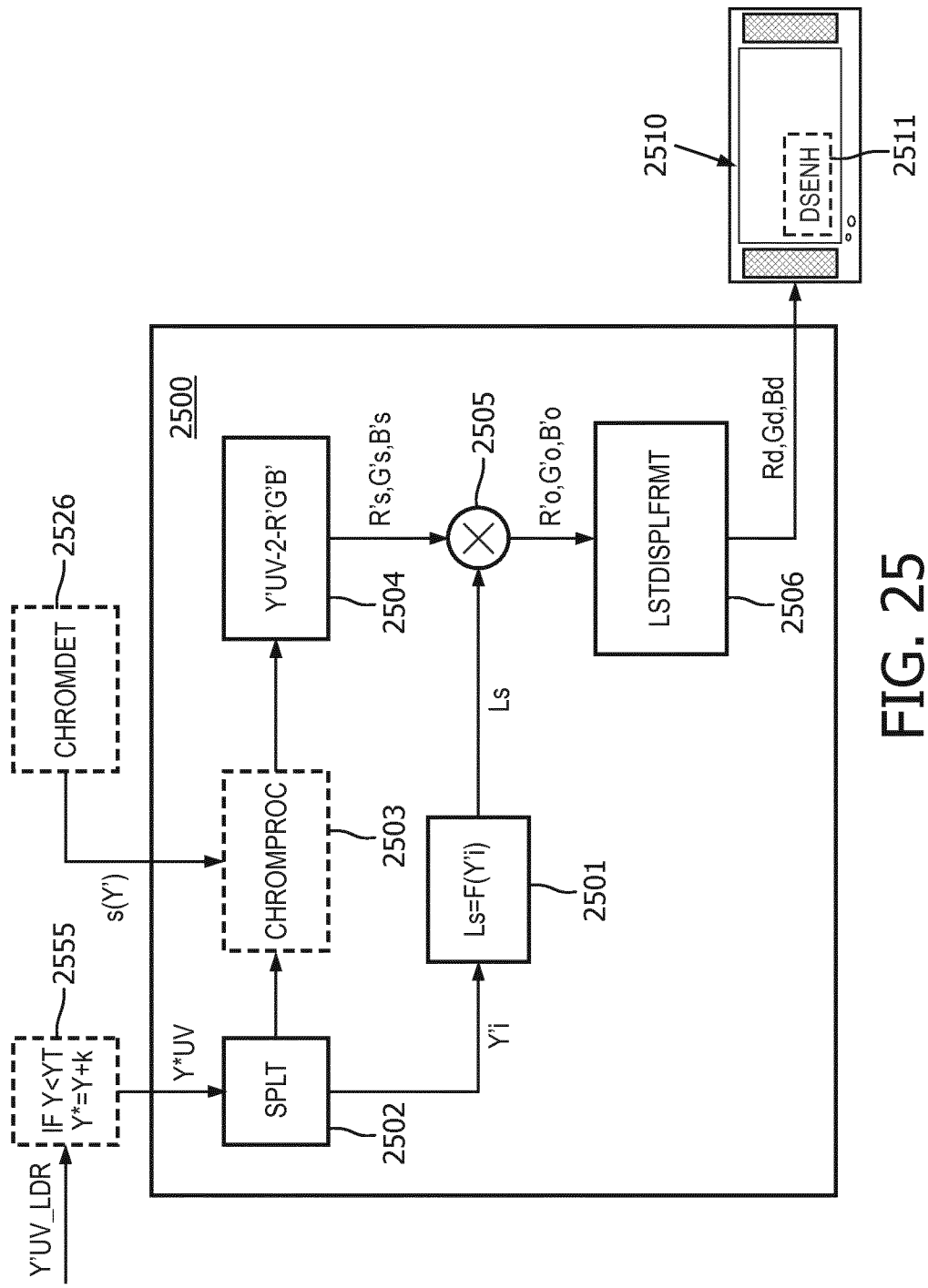
FIG. 25 schematically shows an exemplary embodiment which display adapts when getting an SDR image as input, based on the lumas Y'i of the pixel colors of that input image, with the calculations in non-linear color representation, where other embodiments show we can also embody the calculations in linear RGB color representations.

In FIG. 25, a splitter splits off the luma component from the pixel color (Y'UV, which is typically a YCbCr representation as used in MPEG-type codecs like e.g. HEVC). An upper processing track may do all kinds of color processing on the input color by optional color processor 2503, but it contains a color converter 2504 to convert the color to non-linear R'G'B' (i.e. a Rec. 709 OETF-defined color component trio, or a square root defined non-linear color component trio). We will assume for the elucidation of this invention, that the color processor only does a saturation modification of the running pixel colors to be processed based on the luminance of those pixel colors, as taught in WO2014/128586 FIG. 15A. There may be a function determination unit 2526 which uses an algorithm to determine a saturation function s(Y'), in which s is a luma-dependent multiplier for multiplying the chroma components Cb=B'−Y' and Cr=R'−Y' with (or using similarly an alternative saturation processing definition) so that not too many colors on the MDR range are color-clipped, but for this application we just assume there to be such a function s(Y'), which will then be used by color processor 2503 to saturate or desaturate the various colors in the starting image (i.e. in this exemplary embodiment the SDR image is being used as starting image, but mutatis mutandis an alternative embodiment could derive the MDR image by starting from a HDR image, e.g. Im_RHDR). Then in luma convertor 2501 a function is applied as it is defined by received function definition metadata, i.e. this part is similar to the above described embodiments, e.g. in FIG. 1 the processing path between the input (R,G,B) coming from the optional SAT unit 106, and the g-factor output to the multiplier. We multiply again with the appropriate g for this input color (or in the various embodiments called e.g. gt), but g is called Ls here. The scaled R's, G's, B's may just be the LDR image (i.e. the image of the graded LDR look of the HDR/LDR pair, which is what is received in this embodiment) non-linear color components (e.g. R's=sqrt(R_linear_LDR), in which R_linear_LDR is the red linear color component needed for mixing to produce the correctly rendered image on a 100 nit PB display). The R's etc. may typically be sqrt(R)/Sqrt(Y) components, with Y some characteristic luminance, or factor between a HDR and LDR luminance or luma value. The output non-linear color components R'o, G'o, B'o are the ones defining the HDR look image, e.g. typically as in this embodiment also defined with a Rec. 709, inverse BT1886, or square root definition of the used non-linearity for this color component definition. This means that Ls may then typically also be seen (i.e. is defined) in a square root non-linear fashion compared to luminance (which is universally defined and in linear photon count space). There may be a further color formatting transformation applied by color formatter 2506, yielding a color representation Rd,Gd, Bd suitable for communication to the display (e.g. over an HDMI connection). E.g. some displays may have a mode which accepts linear RGB, in which case color formatter 2506 will apply a square power operation on the three components R'o, G'o, B'o. But other displays may have other HDR image communication formats, e.g. to squeeze the information in the limits of what the connector allows, and then this final codification is applied by 2506. Inside the connected display 2510, further color optimization may be applied, by color enhancer 2511. This can have as a result that our display tuning embodiments in the image pre-conditioning (or especially if our unit is a direct part of a HDR image decoder, immediately decoding to some suitable intermediate medium dynamic range format, i.e. for a display peak brightness which is not equal to the PB of the HDR image of the co-encoded pair, nor the the LDR image PB) only apply the display tuning based on characteristics of the peak brightness of the rendering display, and/or only apply the display tuning to the brightest e.g. 95% of luminances, or e.g. 80% of lumas, and leave the measured and characterized rendering-environment optimization of the darkest colors to the dedicated algorithms of the tv manu-facturer. The tv can comprise e.g. a camera which looks at the neighborhood of the viewer, by applying face detection, and then characterizes which amount of light shines directly upon him (and potentially also under which angle, e.g. a few spots above the couch), and which is the generic surround illumination, i.e. the direct+indirect illumination of the walls, establishing a general darkness level for the viewing room, etc. These parameters can then where they need not necessarily be input in our pre-conditioning display tuning algorithms (though this information could be used for deciding the appropriate tuning of the darkest colors), be used inside the tv for optimizing the darkest colors, e.g. have them brightened somewhat by color enhancer 2511. Optionally some embodiments may have a conditional pre-adder (2555), which allows more versatile tuning for multiplicative color processing, especially when optimizing for brightly illuminated viewing environments for which brightened versions of the darkest image colors are needed. E.g. this pre-adder uses a fixed or pre-calculated YT threshold value, and adds a fixed or pre-calculated k value, and similar embodiments may do so on the three RGB components.

Various embodiments can be made according to this principle.

E.g., it may be useful to do a calculation of the optimized display-dependent look, and the therewith corresponding gt or Ls in a linearized color domain. E.g., in the embodiment of FIG. 26, the particular (e.g. defined by the color grader) luminance mapping functions upgrading from LDR to HDR (or LDR to MDR) were defined in a perceptually uniform representation of the brightnesses (which allows the grader a quicker more relevant control of the look and the brightnesses of all image objects). Therefore the block 2501 of FIG. 25 comprises in this embodiment in successive order: a square power unit 2601, or as an alternative a BT1886 standard display EOTF function application, then a function which converts the "brightness" values Li (which then will be luminances, at least to a very good approximation) resulting from applying the transformation to perceptually more uniform brightness values P, as performed by uniformization unit 2602 (which may apply e.g. an OETF as defined by Philips: Eq. 8). The luminance mapping unit 2801 applies any mapping as desired by the content creator, and reconstructable from its codification received in metadata. E.g., it may create this exemplary HDR look from the LDR look by boosting the luminances in a middle region, and leveling off some of the brightest luminances. It creates a HDR (or MDR) look luminance Pho, still in the perceptualized domain, which can be converted by linearizer 2604 to a linear light HDR luminance value of the currently processed pixel, LL. In this embodiment representation convertor 2605 converts it by applying a square root, yielding: Ls=sqrt(LL). The luminance mapping unit 2801 may be of the various forms described above, or other forms, i.e. it may take a MS value (whether determined e.g. by the STB based on established conditions at the time of rendering, or specified by the content creator, or any mixture of those two, i.e. MS=FUNCT(MS_1, MS_2) where MS_1 respectively MS_2 are a creator-specified and a receiver-specified value [or any other equivalent variant, e.g. MS=MS_1+Delta_MS, etc.]), and determine some suitable new luminance mapping function for mapping LDR to MDR with the display peak brightness instead of to the e.g. 5000 nit HDR (as shown in dashed respectively the solid curve inside 2603).

Figure 26:
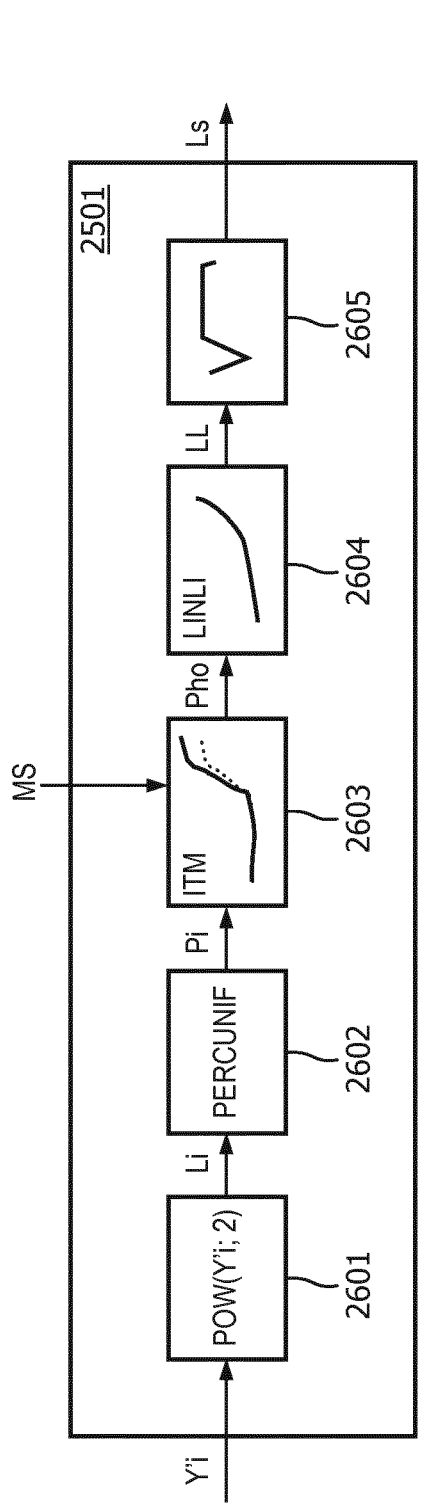
FIG. 26 schematically shows a further embodiment when incorporating our technology in such a designed system.
Figure 27:
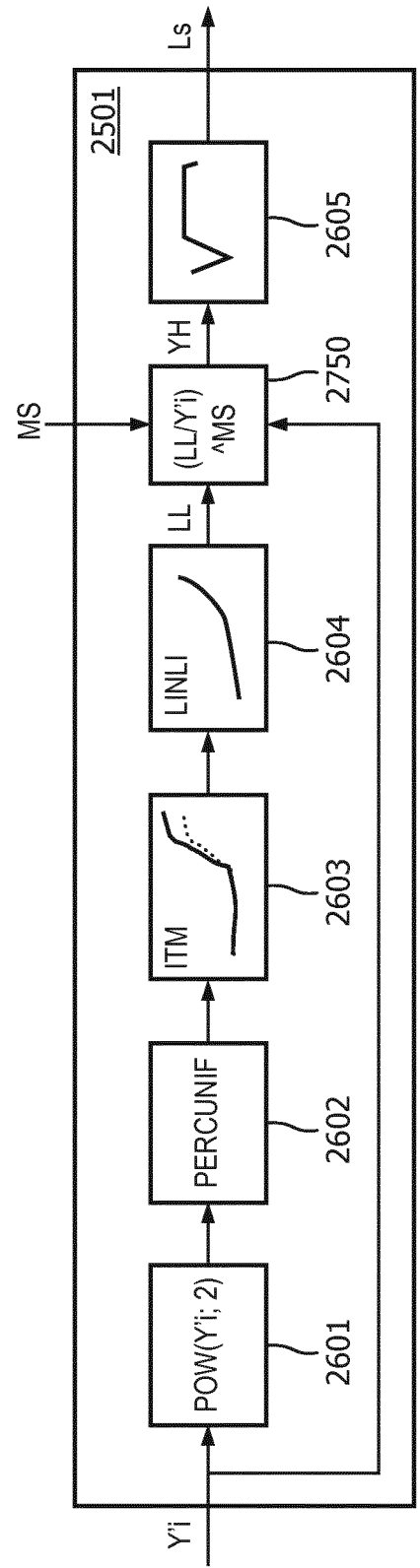
FIG. 27 schematically shows another further embodiment when incorporating our technology in such a designed system.

FIG. 27 describes another embodiment, in which most blocks are as in FIG. 26, but now an explicit division is calculated of the linear light HDR luminance and the SDR input luma Y'I, and for this particular embodiment this division is raised to the power MS, where 0<=MS<=1, and MS again being specified according to any automatic, human-defined or semi-automatic method.

Figure 28:
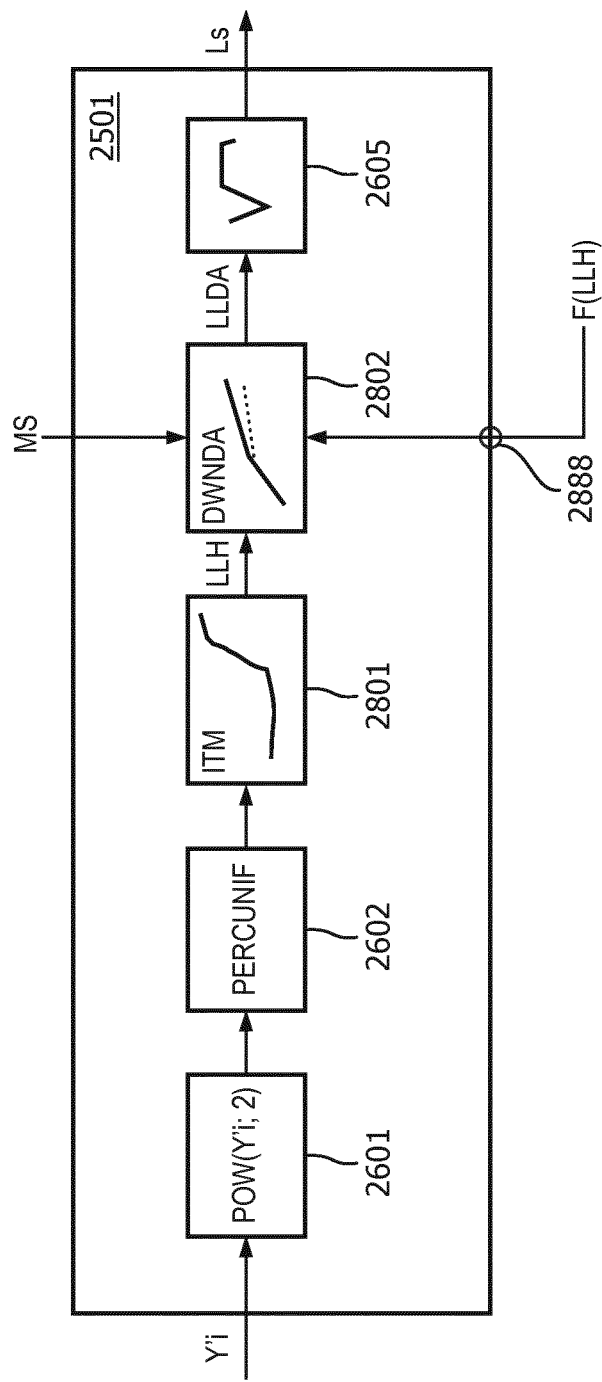
FIG. 28 schematically shows another further embodiment when incorporating our technology in such a designed system.
Figure 29:
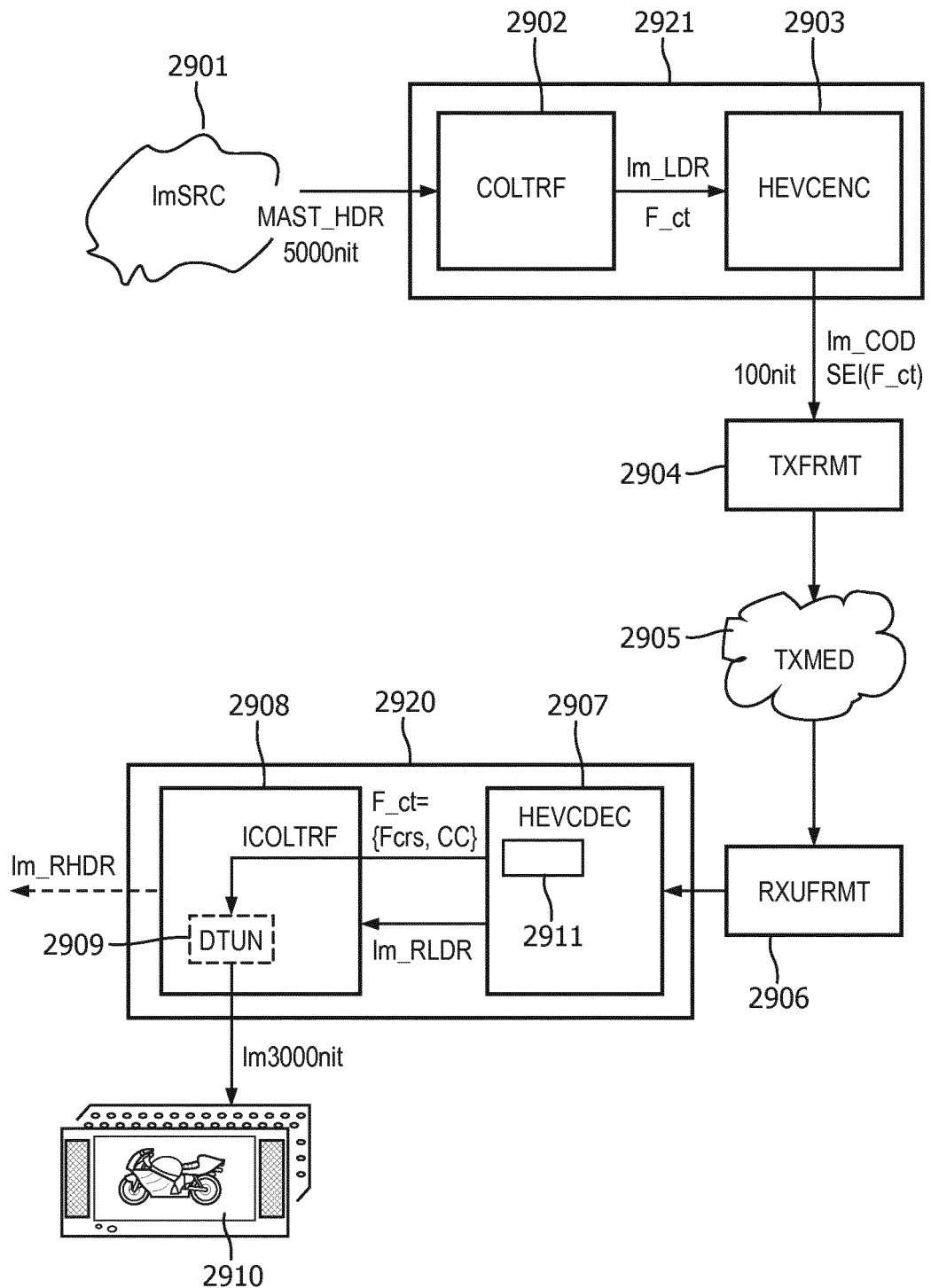
FIG. 29 schematically shows a typical chain of a HDR image or video communication system with an encoder, transmission medium such as e.g. cable tv or the internet, and a decoder, in which our embodiments can be used and integrated.

FIG. 28 is a useful embodiment for some other e.g. complex display tuning embodiments. Now the luminance transformation unit embodied as luma convertor 2501 is first using a luminance mapping unit 2801 to convert the LDR image luminances to the HDR image luminances LLH (in perceptual domain, but the same could be done in a linear, or sqrt domain), and then a (e.g. downgrading from PB_HDR=5000 nit to PB_D=2800 nit) display tuning luminance mapping is applied by display luminance remapper 2802, which yield the correct display-adjusted luminances LLDA. Such an embodiment allows e.g. a connected display to load a luminance mapping function F(LLH) it determined into 2802 via input 2888 (whether this unit 2802 is in a separate STB, or forming part of a HDR decoder in a tv), instead of just inputting an MS value an letting the display luminance remapper 2802 calculate a corresponding luminance mapping function. One can then also use mapping functions which are not tightly related to the shape of the re-grading function(s) converting between the received LDR image(s) and the master HDR image(s), etc.

Figure 30A:
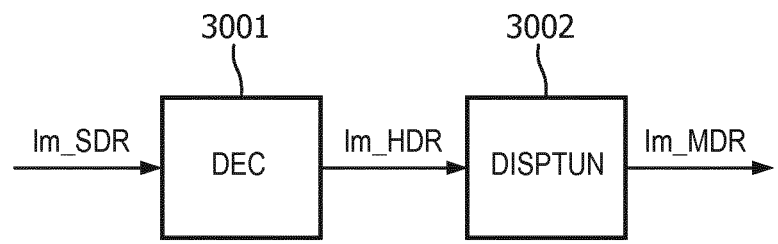
FIG. 30 schematically elcudidates that the display tuning can be integrated with the decoding in various manner, e.g. some being useful when a complicated re-grading strategy is calculated by another connected outside unit.
Figure 30B:
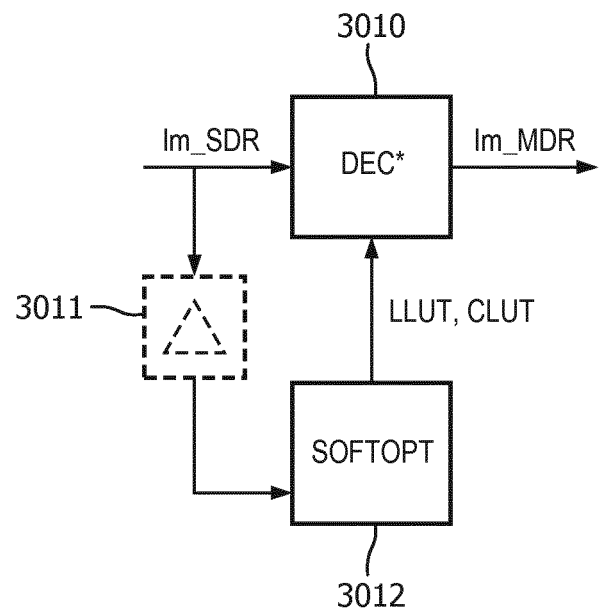

FIG. 30 elucidates that our display optimization by creating optimal MDR images can be performed in several manners. E.g. in FIG. 30A we show the possibility of using this as an a posteriori image processing, after the decoding of the (assume received as SDR) received images to a HDR version (assume for simplicity of understanding a reconstruction of the master HDR image, e.g. with PB_C=5000 nit), Im_HDR. From thereon, the display tuning downgrades to the needed Im_MDR, e.g. for the 700 nit or 1500 nit PB_D display. In such a topology the two units decoder 3001 and color tuner 3002 may actually be comprised in different apparatuses, e.g. the decoder may be comprised in a STB or computer, and the color tuner may reside in the TV (in which case although it gets the reconstructed HDR images, it still gets the functions F_ct), or they may be in the same apparatus, or even one or more of the units may reside e.g. on a networked computer, which e.g. serves the user with pre-optimized content.

However, another topology (shown in FIG. 30B) is where the mapping to MDR is immediately taken into account, i.e. when Im_SDR is input, there is no need for intermediately deriving a HDR image, but the e.g. 700 nit image may be immediately derived from the SDR image. The mapping is that of the combination of all mappings going first to e.g. 5000 nit, and then to 700 nit, and can be pre-calculated by a software optimization unit 3012. Especially if all mappings just have their multiplicative scaling, the combination of all those multipliers to arrive at the final multiplier to be used for each pixel luminance is relatively straightforwardly done. This required transformation can be pre-calculated after receiving the functions F_ct, and communicated and loaded in the decoder 3010 as a LUT (Y'_out=LUT(Y'_in)), to be used on the next few images of a shot, or in other words up to the moment new functions are received valid for the next few images (some embodiments may transmit a set of functions only for N images in a scene, but other embodiments may receive new functions for each successive image of the video). There may be a delay 3011 present of 1 or a couple of images, in case the software optimization unit 3012 needs to do more complicated processing (e.g. comprising image content analysis), because in general also a color LUT (CLUT) may be communicated for the processing by color processor 2503, but other embodiments may not have this delay. The advantage of such a topology is that one needs only 1 set of hardware, and the optimal display tuning is immediately taken care of in the (now changeable instead of fixed as the normal decoding paradigm would dictate) decoding step. So we will elucidate a little further assuming that this useful topology is used (the skilled reader understanding how the various taught components apply to all variants).

Figure 31:
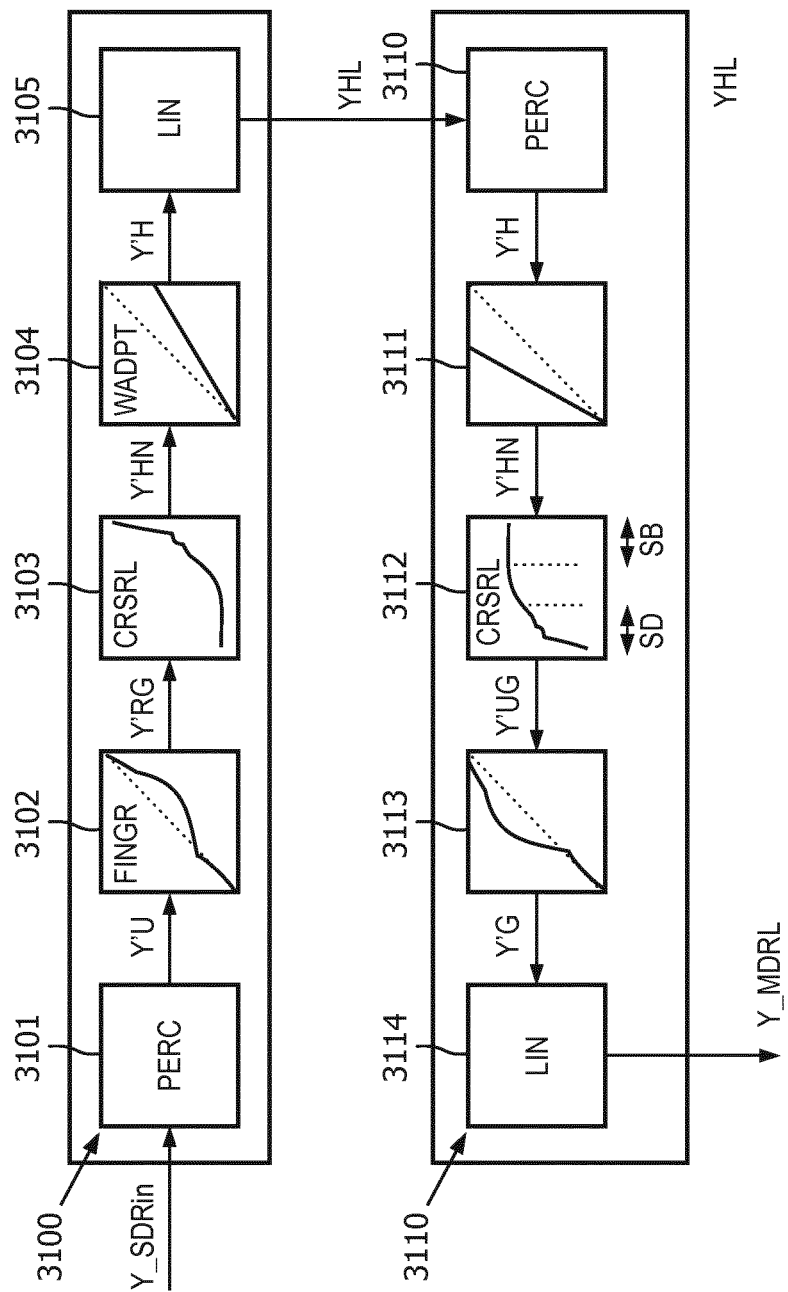
FIG. 31 shows a calculation model which e.g. a unit exterior to a core decoder could use for calculating functions to load in the core HDR decoder units.

FIG. 31 shows a pragmatically very useful manner of doing the tuning to obtain the MDR image and its luminances Y-MDRL (or equivalently lumas in similar embodiments).

The SDR luminances Y_SDRin are mapped by perceptualizer 3101 into a perceptually more uniform luma representation, e.g. by the following function:

$$Y'U = \log(1+[\rho(Y\_SDRin)-1]*\text{power}(Y\_SDRin;1/2.4))/\log(\rho(Y\_SDRin)) \quad [Eq. 10],$$

In which rho is a constant which depends on the peak brightness of the codec used for any image (in this case the PB_C=100 nit of SDR), which is determined for Y_SDRin and Y'U normalized to 1.0 according to:

$$\rho(PB\_C) = 1+(33-1)*\text{power}(PB\_C/10000;1/2.4).$$

As it is just a principle, other luma uniformizers can also be used, with the purpose that equal steps in that luma Y'U correspond more closely to visually equal brightness steps.

The rest in this algorithm will work in this domain, which is undone by linearizer 3105 which reconverts to the linear luminance representation of the pixel colors.

What is important in this embodiment, is the two-step approach of the tuning. We can best explain that with the downgrading subpart 3110, since this schematic corresponds to the exemplary transformations to first convert SDR to HDR (e.g. the YHL HDR luminances falling on a range up to PB_C=5000 or 1000 nit) by the upgrading subpart 3100, and then that HDR to the required MDR luminances (Y_MDRL) by downgrading. Again, all the operations will be performed in the perceptually uniformized luma domain (i.e. uniform relative HDR lumas Y'H will be transformed). There may be a first optional gain mapping 3111, which maps a certain maximum luminance actually in the image (e.g. although the PB_C may be 5000 nit, such a high luminances may be considered too bright for the present scene of images, hence the grader may have graded the content up to a limit of e.g. 2000 nit, however, given the significantly reduced dynamic range of SDR, it makes sense to map this to the maximum possible for 100 nit, i.e. the code 1023 corresponding to 100 nit PB_C, however, for systems which e.g. code one HDR as another HDR this gain mapping may not be present; similarly, some embodiments may do some black mapping, mapping some black of the HDR lumas Y'H to some black of the normalized HDR lumas Y'HN). But importantly, on these normalized HDR lumas Y'HN, which still have the brightness distribution look of a typical HDR image, a coarse luma mapping unit 3112 may apply a coarse mapping. This mapping coarsely manages the mapping of a couple of sub-ranges, on which to later map the actually desired optimal lumas of the various image objects. E.g. a practical variant we found well-working was a variant which allocated a sub-range for putting all dark lumas (SD), and a sub-range for the brightest lumas possible in the image (SB), between which one can then easily design a middle range, e.g. in one of our embodiments a parabolic connection segment (which is e.g. defined based on a midpoint, e.g. where a linear sloping segment for the darkest and brightest lumas meet, and some width).

Whatever independently a grader wants to do with the actual objects falling in this e.g. sub-range of the darks, e.g. brighten the very darkest object somewhat, the tuning algorithm can with the two step method explicitly control where the darkest colors should be, i.e. which sub-range they should span, in each viewing scenario (i.e. how bright the display is, its PB_D, will influence how dark these darks may be, and/or viewing environment brightness which also influences visibility of especially the dark regions of the image). The grader (or automatic grading algorithm at the creation side) can then on these tunable ranges, automatically correctly positioned (provided the tuning is handled as explained with FIG. 32), determine his fine gradings, e.g. whether a face should become a little brighter, or contrasty, or a white chair in the sunlit should shine a little more, etc. Fine-grading unit 3113 takes care of this ultimate tuning, of the coarse lumas Y'CG yielding fine-graded lumas Y'FG, after which linearizer 3114 converts to linear output luminances Y_MDRL, which are optimally re-graded. The skilled person should remember that these functions were initially created at the creation side for a situation of downgrading from the master HDR of e.g. 5000 nit to SDR (100 nit), not as at present to e.g. 3000 nit, or 700 nit, so they have to be correctly modified, which is what the optimal tuning algorithms do. All these units will be mirrored in the upper subpart, with the same functions, but of course differently tuned. I.e. now after going to the perceptual domain in reversed order, first fine-grading unit 3102 will transform the uniform lumas Y'U into re-graded lumas Y'RG (which are still in a SDR dynamic range look, but with some of the objects having different lumas), then a coarse grading unit 3103 will apply a coarse allocation function of at least three sub-ranges (which implements that now the object lumas have transformed from a SDR dynamic range look into a HDR look), and then optionally there may be some white scaling of scaler 3104 which maps the maximum of the normalized HDR lumas Y'HN (i.e. 1.0) to some lower position of the final HDR lumas Y'H, e.g. the luma which corresponds to 2000 nit on a 5000 nit PB_C representation (given whatever code allocation function is used, which we assume in this embodiment is our equation [10] above).

As said these units may not actually be present as such in a receiving apparatus, because they are the conceptual parts which software may use to determine a luminance LUT (LLUT) to pre-load in the actual sole luminance mapping unit, but it elucidates how the tuning can advantageously work.

Figure 32A:
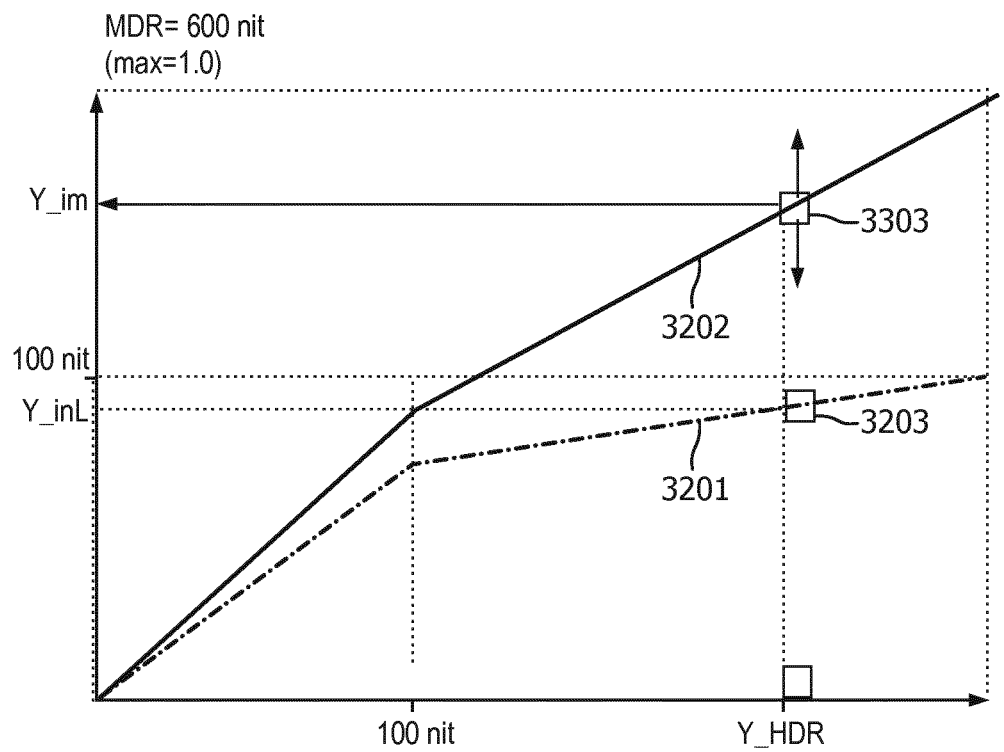
FIG. 32 schematically elucidates how one can tune when moving from a first luma representation to a second one, in a dual coarse-fine re-grading embodiment.
Figure 32B:
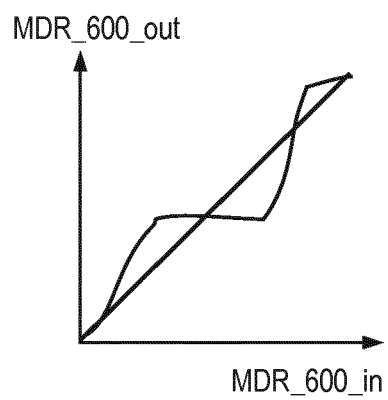
Figure 32C:
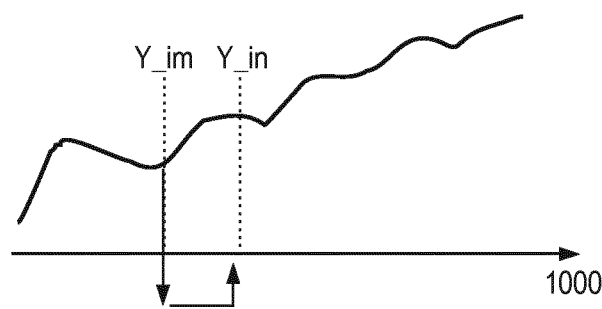

FIG. 32 describes this a little further. FIG. 32*a* shows what a grader would have wanted to happen, if he had had the e.g. 600 nit MDR situation available at the creation side. But since PB_D can be anything, he will never have that situation. Still, it makes sense as a working assumption that if he wanted to brighten the pixels of e.g. a seat in a car, he wanted to brighten those same pixels even if they were previously pre-brightened by a coarse mapping. So what the grader would like to do, is to fine-tune the luminances of objects which have their luminances defined on the MDR e.g. 600 nit axis, i.e. e.g. the pixel with intermediate luminance Y_im. However, the receiver gets neither the optimal HDR-to-MDR mapping curve 3203, nor the changed position of the pixel 3303. What it does have available initially is the HDR-to-SDR curve 3201, and, a specification of how the grader would like to fine-tune at the creation side pixel 3304, i.e. which is some SDR pixel (defined on the 0-100 nit part of the luminance range). But what actually should happen as second, fine-grading, is what is shown which the CC-curve of FIG. 32*b*. But as said, after the receiving side apparatus has defined an optimal coarse grading curve 3202, what is still only available is a fine-grading curve defined on a SDR and HDR axis system. But, we can ignore the perceptualization, and then the stable factor in all this, corresponding with both the initial SDR luma Y_inL (we assume again here in this elucidation the HDR is communicated and received as SDR images, which need to be re-graded to MDR) and the intermediate corresponding rough luminance on the 600 nit PB_D range, namely Y_im, is the HDR luminance Y_HDR. The relationship between the luminances Y_im and Y_in for any Y_HDR, is the coarse mapping. So as shown in FIG. 32 that corresponds to the software optimizer 3012 needing to interpolate the LUT, by using the coarse mapping to determine which entry in the SDR-referred LUT, namely Y_in, corresponds to the needed MDR-referred luminance Y_im. After doing that, this LUT can be used in the calculation of the final LLUT.

Figure 33:
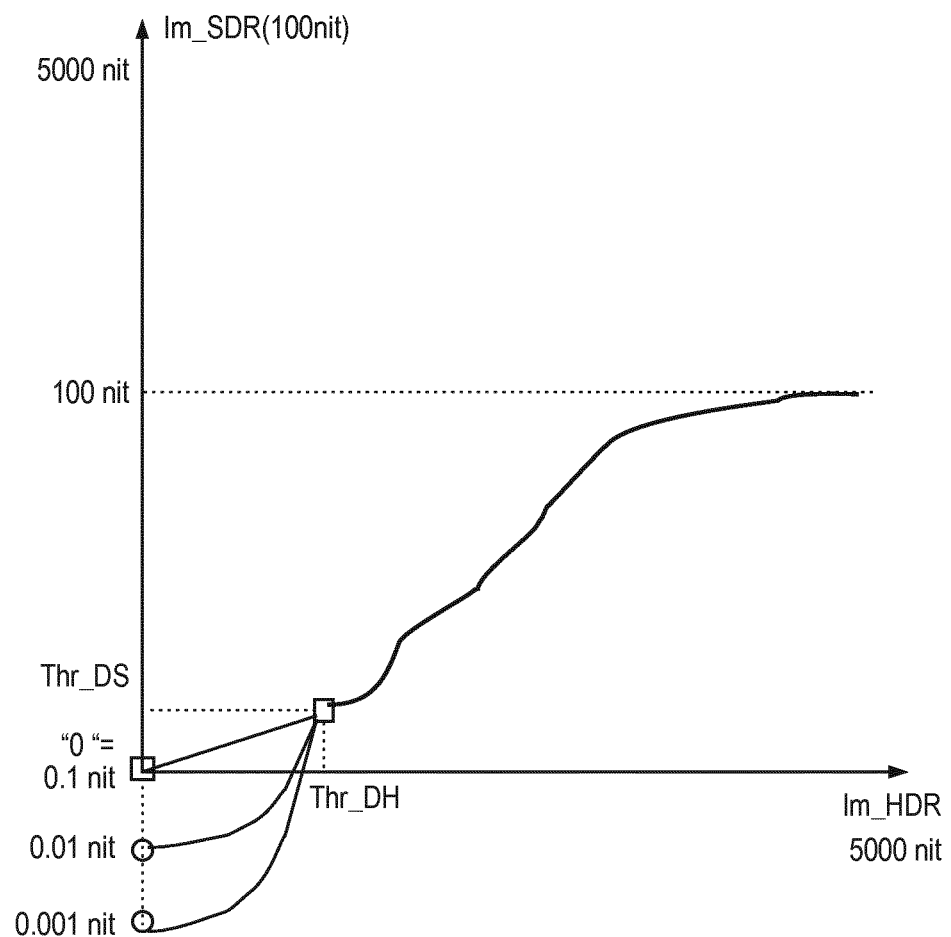
FIG. 33 schematically elucidates some basic principles of a possible tuning for systems which can render very deep blacks.

FIG. 33 shows an elucidating embodiment which can be used for optimizing the darkest parts of the MDR image, in particular if one has displays which can render very dark pixels, especially when viewed in a dark environment. We assume here that a 5000 nit PB_C HDR image, which contained image data up to very dark luminances (e.g. 0.001 nit or less), was communicated as a SDR image. There was a need to encode the lowest luminances in the SDR from a purely information-based point of view, i.e. one gives them a dark rendering, but with a linear mapping curve, which has a sufficiently large slope, because now essentially it serves foremost as a code allocation function for the darkest HDR luminances (rather than a specifically optimal LDR grading). One can assume this to translate reasonably to SDR legacy devices having a minimum darkest pixel rendering of e.g. 0.1 nit in a normal television viewing environment (e.g. evening with dimmed lights), i.e. this is what the code "0" will correspond to. But this linear grading will not be optimal for devices with better capabilities for rendering darks. So the tuning can apply another tuning function which gives a better look of the dark regions, up to the end of the darkest darks (which it knows in e.g. the HDR range as threshold Thr_DH, or the SDR range as Thr_DS). E.g. it can use functions which bring in some additional contrast depending on how dark the receiver knows the system can render (as a function of both the DB_D darkest black of the display when driven in absolute darkness, and the surround illumination influencing both display front plate reflection and viewer visual adaptation and need to see particular deep blacks). E.g. simple functions can be gamma-function stretches, but more advanced functions can be used, e.g. after determining which semantic sub-regions or objects there are in that darkest darks sub-range up to Thr_DH. In some embodiments there may be further information about the images or anything else regarding the creation of the images beyond the most simple variants. E.g. in case a darkest black level of the display on which the content was color graded by the human, indicating which luminances that display can still render sufficiently differently (taking into account its leak light or front plate reflections) or in general which darkest luminances will still be seen as different by the grader, this information is also useful for any receiving apparatus when deciding which display tuning, or in general rendering side color optimization will be used. E.g., if the viewer has an OLED in a dark viewing room, which is estimated to have better rendering capabilities for the darkest colors than the e.g. LCD reference display of the content creator (as indicated in the darkest black level value as communicated), then the receiving side tuning color processing apparatus embodiment can decide to apply the stretching functions only up to a certain degree, because one is creating pseudo dark luminances, which the creating artist didn't actually see himself (but up to a certain amount that can be done, e.g. when a rendering situation needs additional contrast for a better look). So in that embodiment the determination of the resultant common multiplication factor, and all the calculations of the optimal tuned function shape forming the basis of that in the various embodiments, will also depend on the value of the communicated darkest black level of the creation display.

Figure 34:
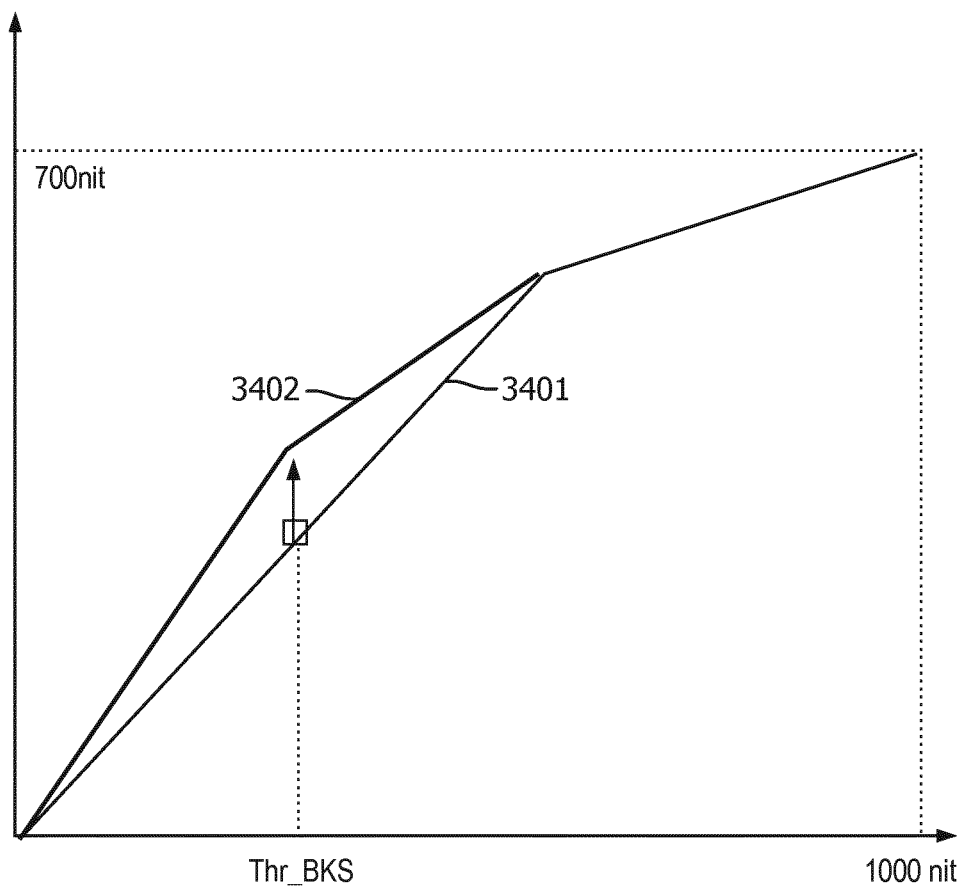
FIG. 34 schematically elucidates one typical example for brightening a look/grading, e.g. under the influence of user interface input means for a viewer to communicate his preferences regarding the brightness or clarity of the rendered image(s)

Still, even if one builds powerful automatic receiving side tuning systems, which do everything for a user, the viewer may still want some control over the system, to give his preferences. However, the viewer is no professional color grader, so, even if he has time and desire rather than wanting to watch the movie, we shouldn't bother him with all these complex colorimetric issues. This is where our system is very useful, because it already implements the creative artist's method in the display, and the viewer then simply needs to do a couple of quick (and sensible) fine-tunings according to his preferences. That is what is shown exemplary in FIG. 34, in case the user finds the HDR picture a little too dark for his liking (similarly some users find HDR too bright, and then a similar processing can be done, but that one will mostly work on the brightest pixels, or maybe the averagely bright ones rather than the dark ones). If the viewer considers the image of a particular scene or movie too dark, e.g. because he is watching in a rather bright environment, then likely this is because the darkest regions are too difficult to see. So rather than to do a global brightness increase, which will damage the HDR look again which is unwanted, we couple his new brightness button to the darkest range only. In the above three sub-region coarse grading, the lowest region of the darks was typically defined and communicated by an upper luminance threshold, for which we have shown here the HDR value Thr_BKS on this time a 1000 nit HDR range. If initial optimized mapping curve 3401 for a 700 nit MDR display is the one automatically determined based on only the grader's desires as communicated in the color transformation functions F_ct, and the viewing situation (at least PB_D), then the user can tune his own curve by being able in a few brightening steps to raise the curve sub-parts of the darks, and the midsection then also moves, to link with an unchanged slope for the brights.

Figure 35:
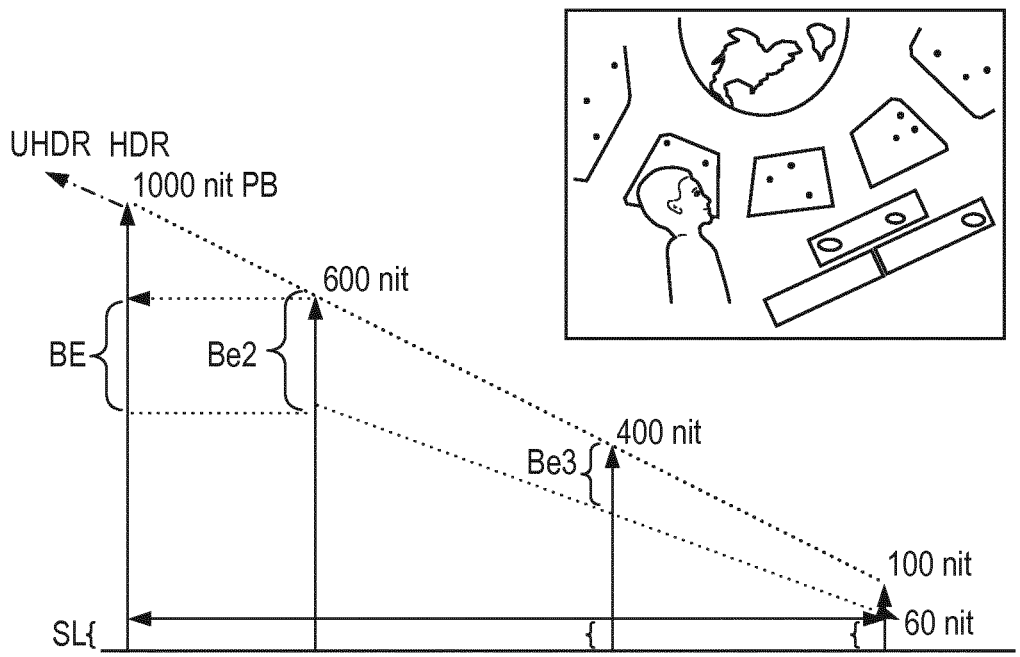
FIG. 35 schematically elucidates some desiderata of display tuning, i.e. the mapping of various object/region luminances of a scene to positions and ranges on the MDR luminance axis, if one had a continuum available of displays of all possible PB_D values.

FIG. 35 shows just one example of a tuning protocol, which is what the grader would like to see rendered on the spectrum of all displays with peak brightnesses between e.g. 5000 nit and 100 nit.

We see an example of a space station, with dark luminances inside (luminance sub-range SL), which are rendered the same on all displays, because the range SL up to 60 nit fits in the SDR range. The bright earth seen outside (sub-range BE), should have much brighter luminances, but there is not too much headroom available on SDR. Still one should not just infinitely stretch this 40 nit range towards ever brighter HDR displays, or on some displays this will be annoyingly bright. Therefore, there should be some bend in the mapping function for those brights from some MDRx display onwards (PB_Cx=600 nit). The receiving side can estimate that from looking at the reconstructed HDR image, and that apparently the creator didn't want those regions to go above 600 nit, despite the room up to 1000 nit available. The tuning can then optimize between requirements, e.g. temporal consistency and the need for later headroom for brighter scenes, but in the example it keeps the upper limit the same for all displays with PB_C above 600 nit, and decided to use all the available range of the 600 nit display, to render the outside planet luminances in sub-range Be2 as bright as possible, and compressing to e.g. Be3 for lower PB_Ds.

Figure 36:
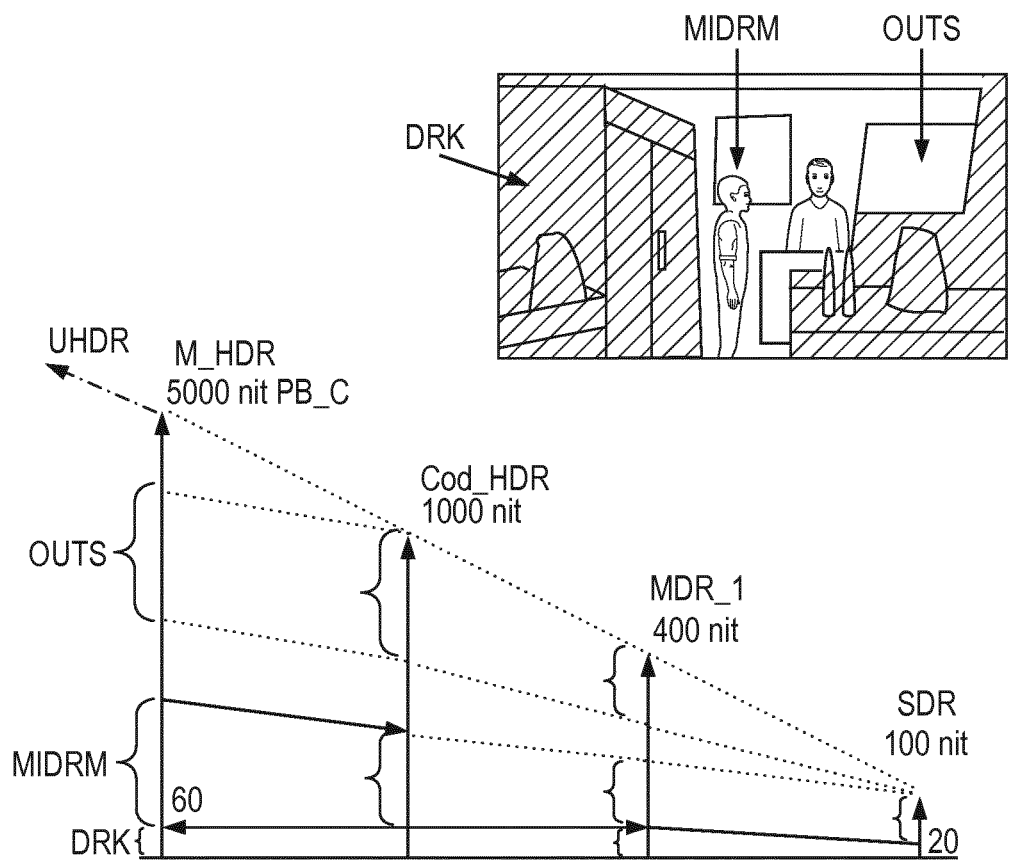
FIG. 36 schematically elucidates another example of another scene, with a topologically different desired behavior of how all the regions map for various PB_D-value sets of possible displays.

FIG. 36 illustrates another possible example of display tuning as desired, for a typical challenging HDR scene image. The viewer is seeing a normally lit room (with pixel luminances in the MIDRM sub-range), in the middle ground, from a foreground dark room (DRK), in which all lights are switched off. Outside through the windows, we see the bright, maybe sunlit outer world (sub-range OUTS). When doing physical luminance measurements, one may find that the "normal" luminances in the middle room are typically about $\frac{1}{100}^{th}$ of outside, because taking into account geometrical factors like window size, and closeness of buildings at the other side of the street etc., the local illumination may typically be $\frac{1}{100}^{th}$ of the outdoors illumination (depending of course on what that is, and whether the middle room is solely illuminated by exterior light). The dark shadowy part may e.g. be 10 times darker still. So there is already an illumination ratio of 1000:1, and assuming typical object reflectances between 90% and 1%, this means we can expect in the scene a luminance ratio of 100,000:1 (not yet considering specular reflections of the sun on metallic objects). Of course, in the master HDR grading we may not find the sunlit outdoors object encoded as e.g. 10,000 nit, since the image is typically to be seen in a dimmer environment, and straight on in a small display rectangle and not too flashy on the timeline of a movie (we can e.g. decide to look away from objects in a scene which are too bright, but are supposed to comfortably watch the movie, and mostly watch the actors, and not be discarded or irritated by a bright commercial TL-tube sign outside e.g.). So depending on the artist creating the master HDR image, the object pixels in the image may have somewhat different values for their luminances. We assumed in this example that a 1000 nit image is coded, and tuning is needed for lower PB_Ds, and also higher PB_D's (which typically may follow other principles artistically which need not be elucidated here, but technically one could use similar technical components to realize some upgrading display tuning). As you see from this tuning protocol and the various angles of the connecting lines connecting exemplary displays from the continuous possible PB_D display spectrum, this image may require a much more sophisticated display tuning. E.g. for such a high complexity HDR image, a much more critical choice than a mere non-linear compressive strategy may be needed to fit some reasonably looking image in the way too small SDR dynamic range. E.g., if the SDR image is not needed for calculating further images, one may decide to hard clip some of the luminance sub-regions (what we also call regimes) away, i.e. map all luminances of the 1000 nit received COD_HDR image to a single luminance value, or very few values. As mentioned above, in our various embodiments, various player can decide. E.g., the television can decide to do so in its pre-programmed smart heuristic algorithms doing the HDR-to-SDR calculation. Or the content grader may indicate he desires to keep the darker regions (because something of interest may be happening in the dark room a little later), but sacrifices the outside, by making the windows uniform white (which he will typically communicate by the shape of his HDR-to-LDR downgrading functions, but he may also communicate so with additional metadata, e.g. as elucidated with FIG. 6 by sending some parameters which prescribe or guide how various luminance sub-regions can or should be tuned). But it is important to understand that a tuning algorithm realizing such behavior cannot simply work by applying a simple luminance mapping function shape to the SDR pixel luminances, because then the single white luminance in the SDR image (the pixels of the outside seen through the windows) will not expand into a set of various luminances in the e.g. 400 nit MDR tuned image. Also, as one sees, the dark regions may be tuned according to an equi-luminance protocol for all displays between 400 nit, and 5000 nit (and potentially beyond), but for even smaller dynamic ranges than those having PB_D=400 nit, one needs to darken the pixels of the unlit room (DRK). Especially when being naturally lit, HDR images can be quite complex. Think e.g. of a police car chase through a dark nightly forest. The headlights of the car can illuminate the trees in complex patterns, and on top of that there will be the red and/or blue alarm lights of the police car. Especially further in the forest there can be very dark nooks, especially if it is not a full moon. Especially when adapting the colors/luminances of the image objects to get an image which looks more optimal (ideally similar to the master grading look on its reference display) on any particular display can then be far from trivial, needing a good set of technical solutions to handle it, especially handle it pragmatically. Doing nothing will typically result in some parts of the image looking annoyingly too dark, and/or other parts too bright, the latter e.g. when one uses counter-processing which is much too simplistic. On top of that, one would in principle like solutions which can cater for the many practical variants of image creation and use, e.g. a studio capturing which is well-designed colorimetrically, an in the field production by a small team, a large Hollywood movie to be distributed on BD, consumer content, etc.

Figure 37:
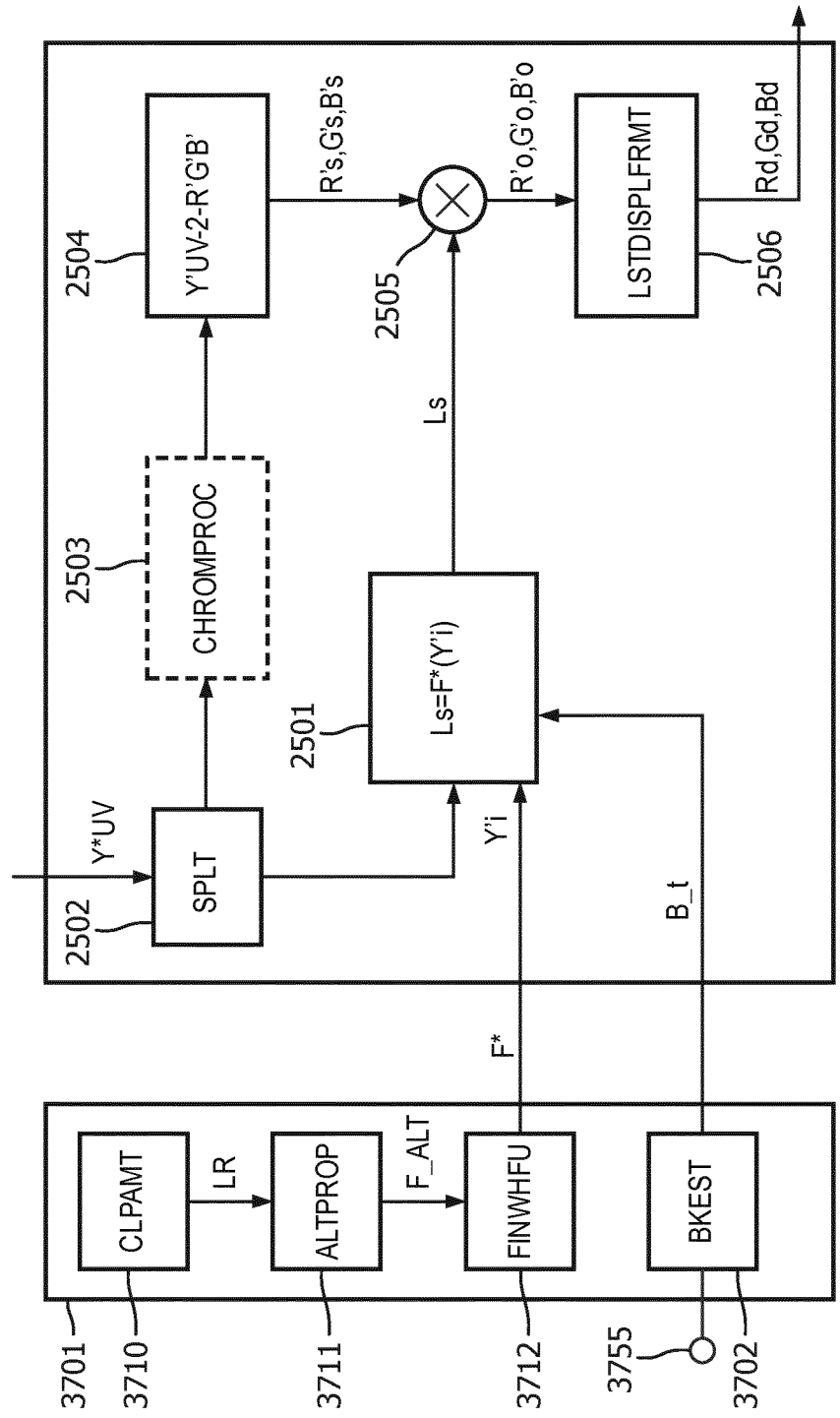
FIG. 37 schematically elucidates some possibilities of what an external unit can do to determine the shape of the desired luminance/color re-grading function, e.g. as regards the behavior of the darkest or brightest possible pixels in an image(s)

FIG. 37 shows how more complex display tuning variants can do more complex calculations, e.g. taking into account particular desiderate regarding the brightest pixels possible in the images, or conversely the darkest one, in particular in case those may become difficult to watch when watched in a brighter viewing environment (e.g. you are watching tv, but your spouse wants to read a book in the same room, i.e. has a certain amount of lamps on, and the tuning could cater for any on-configuration of a combination of the lamps present in the viewing room). It is feasible to construct more advanced tuning techniques, by determining appropriate functions offline, and loading the needed e.g. SDR-to-MDR_1650 nit luminance transformation function(s) in a core calculation unit, which then derives herefrom the multipliers gt. The optimal function determination unit 3701 doing all the various determinations may run as software, and analyze the received SDR-to-HDR functions, characteristics of the images (although that may not be needed if one optimally uses the information in the re-grading luminance mapping function shapes), particulars of the rendering environment, further desiderata of the content creator communicated in second metadata, or choices of the apparatus manufacturer, or desires of the viewer. All this can lead to different optimal functions F*, already transformed to the needed MDR output range, or formulated on the master HDR range and still to be tuned in the color processing core, exemplified by the units to the right of unit 3701.

Figure 38:
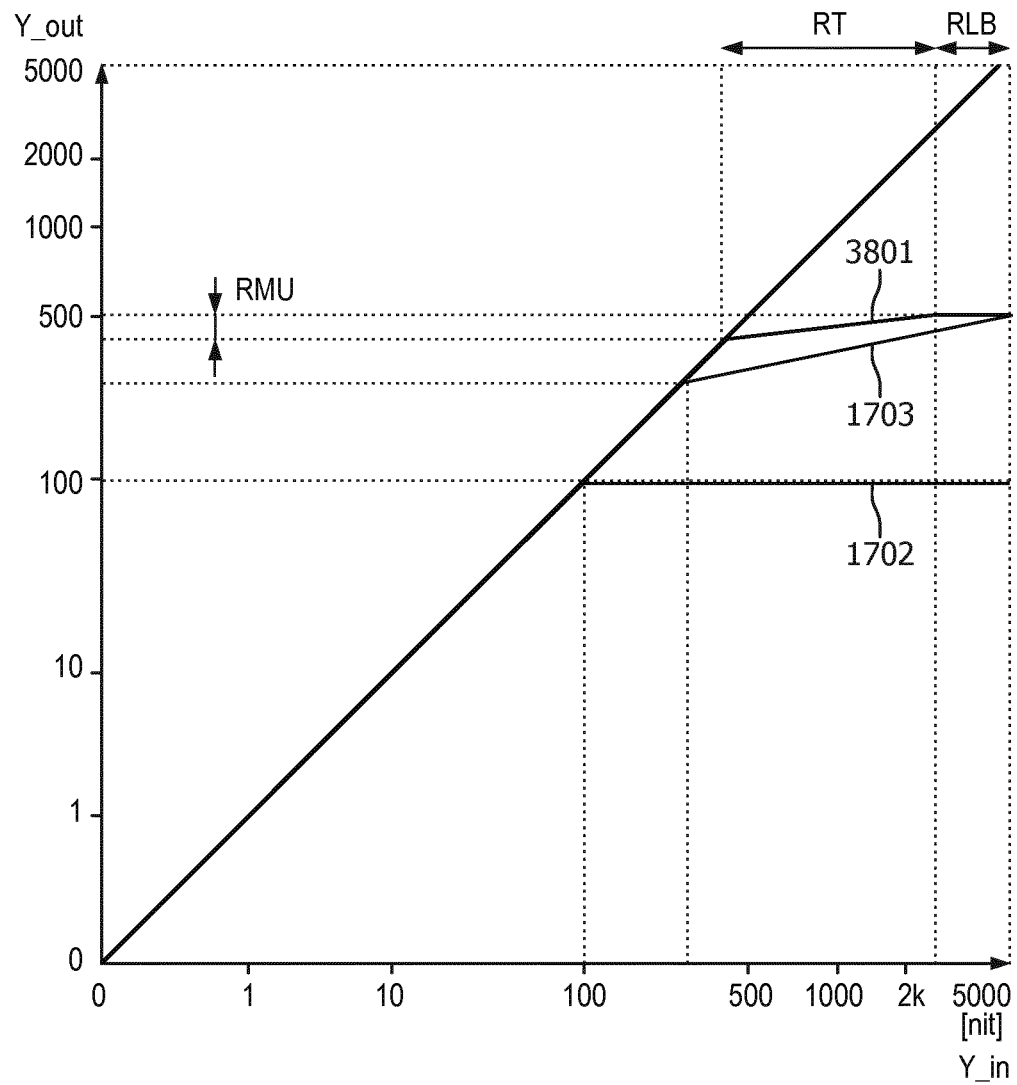
FIG. 38 schematically shows a tuning method which keeps the MDR look more close to the HDR graded look (i.e. for more luminances), at the expense of some minimal allowed amount of clipping as pre-configured in the apparatus, or calculated based on at least image properties.

In FIG. 38 we give an example of how auxiliary functions can be used to re-determine the tuning, e.g. by controlling the shape of only part, i.e. for a sub-range of the input lumas, of the ultimate SDR-to-MDR luminance mapping function. We show a different tuning than the one of FIG. 17, in which, although the HDR-to-SDR mapping in that example needs to do a considerable amount of clipping for that example, the MDR re-graded or tuned images nowhere exhibit hard clipping. However, such an exemplary curve to derive the MDR image from the HDR image (whether transmitted, or reconstructed as Im_RHDR) 1703 does show a long tail of soft-clipping, which corresponds to soon leaving the HDR curve, i.e. the diagonal. It may be a desideratum for some kinds of tuning, to stay for a long time on the diagonal, i.e. have luminances identical to those of the HDR image. For dark luminances, e.g. below 40 nit, one can understand that in some scenarios it may be useful to render those with identical output luminance on any PB_D display, i.e. on the SDR display, or any HDR display. It can at times be a desideratum to keep that requirement even up to very high HDR luminances, i.e. to derive a tuned curve 3801 (where in this example the HDR image forms the input image for the color transformation to obtain the appropriate PB_D-dependent MDR image as output image). Of course a 4700 nit image can never contain exactly all the same luminances as a 5000 nit PB_C image, so at some moment one has to leave the luminance-identity transformation curve (i.e. the diagonal), and start some soft or hard clipping. In this example, there is a range RLB which can be selected for hard clipping, and a transition range RT for soft clipping, which can be chosen small by the apparatus (either by its own internal calculation rules, or under the guidance of input of the content creator and/or viewer) so that the MDR grade looks as much as feasible to the HDR look image, i.e. as if one bought a 5000 nit display instead of a 4500 nit display. This may be appreciated by content creators, although perhaps less by apparatus manufacturers, and work quite well in case the highest luminances are e.g. metallic reflection highlights etc.

Figure 39:
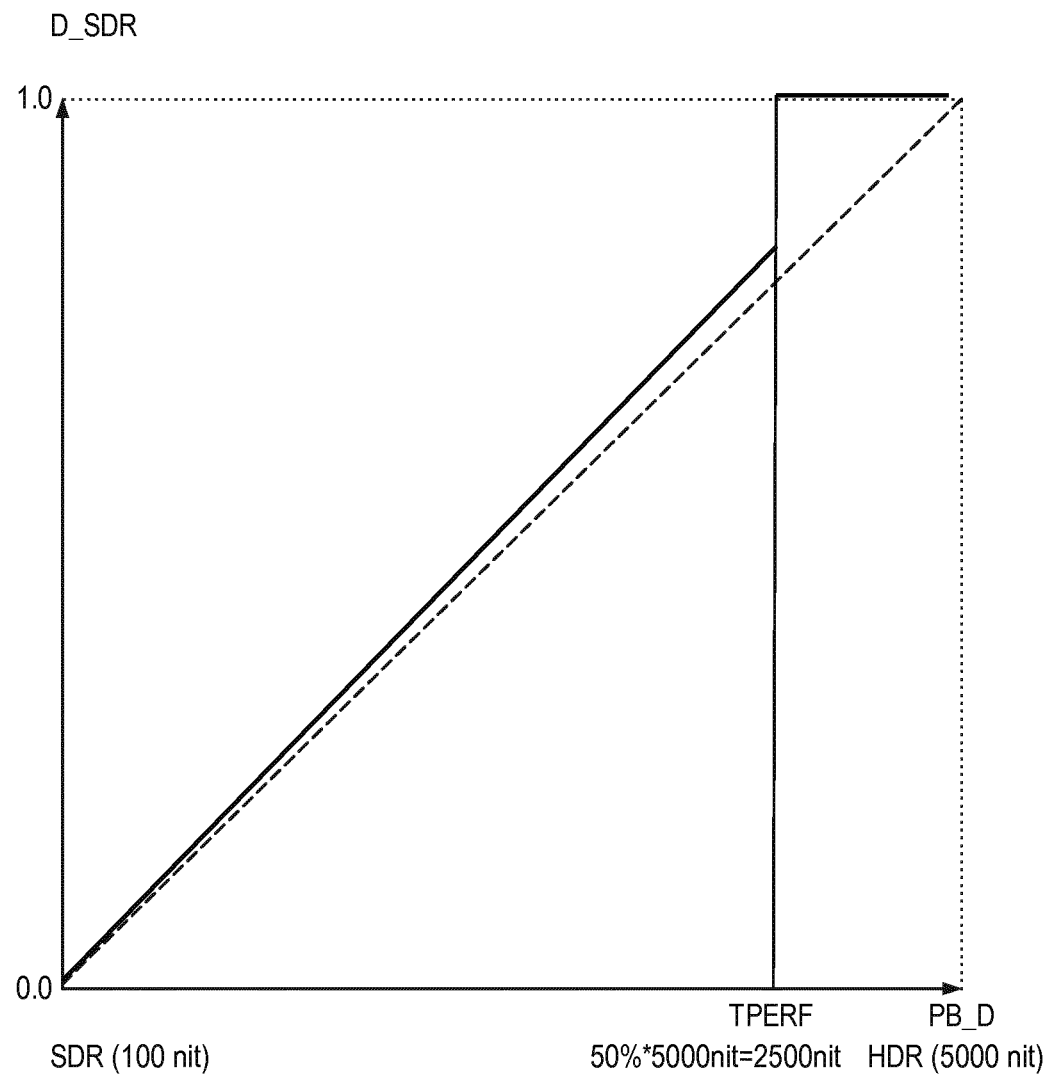
FIG. 39 schematically elucidates how an apparatus could use a metric formulation for that, which would allow i.a. content creators to communicate a desired tuning global behavior.

FIG. 39 illustrates how this can be indicated by a metric positioning function (e.g. by a content creator who desires to instruct the apparatus to tune according to such a behavior). On the horizontal axis the possible PB_D values are given, as well as a threshold TPERF above which displays should behave as reference displays according to the master HDR grading as created (i.e. as if PB_D=PB_C=e.g. 5000 nit). On the y-axis is a distance on the metric, which in this case is indicated as a difference from the SDR grading (or closeness to the HDR master grading). Of course for a SDR display, that distance should be 0, i.e. such a display should be served with an SDR image. When an apparatus sees it should behave as the HDR display above TPERF, it can decide on a strategy to keep as many as possible of the MDR luminances equal to HDR luminance (which would be obtained when doing the color processing on an SDR input luma), an then on some needed (soft)clipping strategy, e.g. as elucidated with FIG. 38. Or even some small compression of the luminances below TPERF could be done to make a little more room for the soft-clipping of the brightest pixels (e.g. the luminances 4700-5000 nit which cannot be rendered on a 4700 PB_D display), which is shown by the thicker curve deviating slightly from the diagonal.

Figure 40:
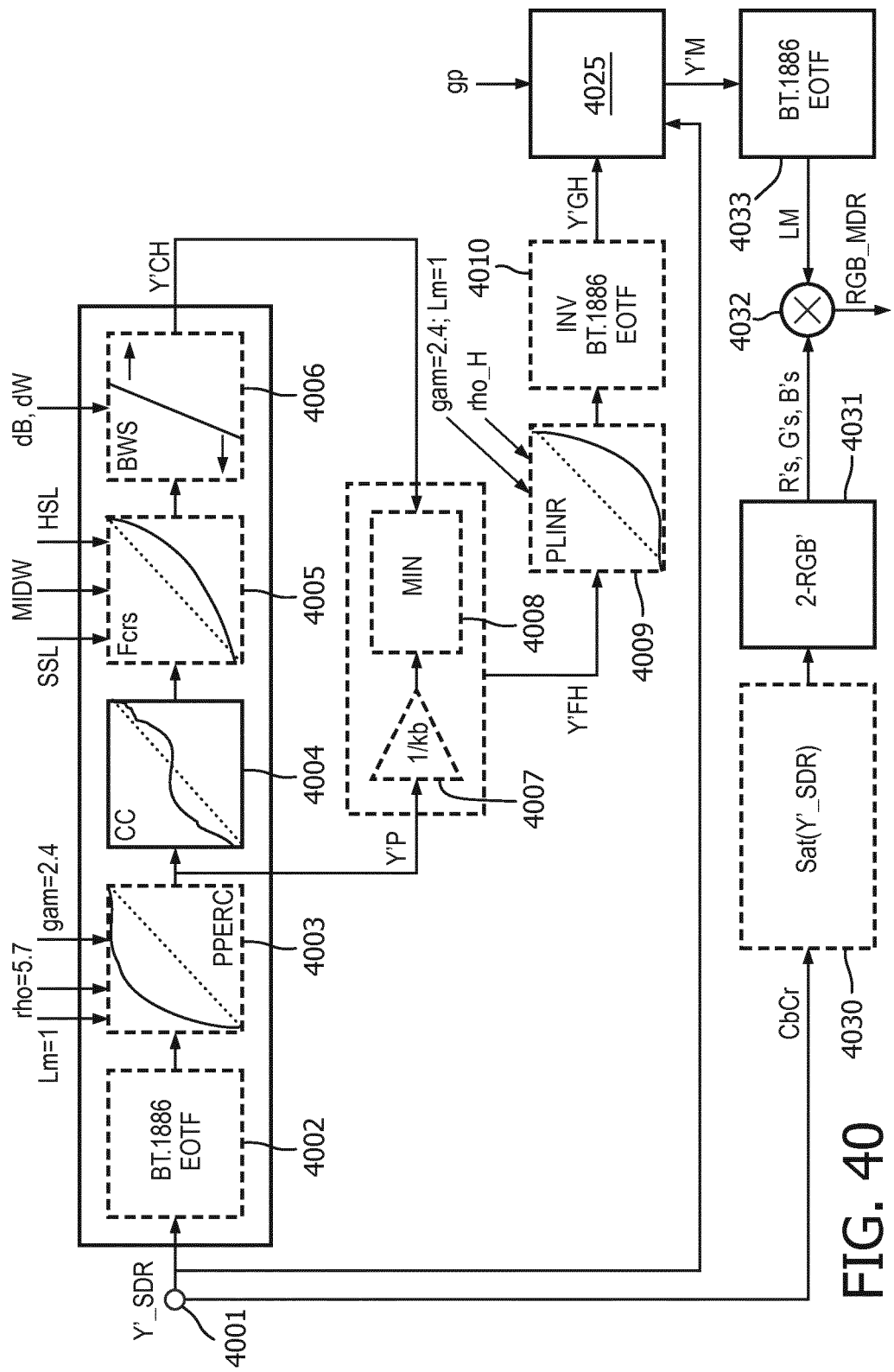
FIG. 40 schematically shows another practical tuning embodiment.

FIG. 40 illustrates another example which allows computationally simple display tuning, in the vertical direction. It shows at the same time some optional (dotted lines) blocks for a very useful detailed embodiment, as the general principle, with the adaptation unit 4025 being the most interesting one.

We assume (without limitation) that a Y'CbCr SDR image comes in via input 4001, The upper part is a luminance processing chain, according to a versatile practical method of applicant. First the SDR lumas Y'_SDR are linearized with the standardized BT.1886 EOTF (this is a definition of an archetypical SDR display, and we take a zero black offset, so this equation is approximately a square power). Then perceptualizer 4003 transforms the linear luminances which are output from the previous linearizer 4002 into visually more uniform lumas Y'P. Although other equations can be possible, we assume that we use our Philips HDR OETF (equation 8 above), with the parameters as indicated, e.g. rho equal to 5.7, which is the appropriate value for SDR displays, i.e. a normalized curve for a PB_C of 100 nit. It is very useful to do display tunings in such a color representation, albeit not necessary, and one could even drop the linearizer and do calculations directly on the (approximately square root) SDR lumas. Then a custom curve unit 4004 applies some re-grading curve. In the generic embodiment this will do all LDR-to-HDR grading needed, but in the specific embodiment with the dotted units all present, this unit can load a curve from metadata which does the fine grading (from a SDR normalized representation to an output which is still normalized SDR). Coarse re-grading unit 4005 applies a function Fcrs to move at least three sub-ranges of the lumas created by unit 4004 to appropriate HDR positions on what is now a HDR range (relative positions, i.e. compared to PB_C of e.g. 5000 nit, because the calculations still work on representations normalized to a maximum of 1.0). In the specific example, the shape of this function is determined by an SSL parameter, which determines the slope of a linear part of the function for the blacks, i.e. starting at 0, HSL similarly determines the steepness of the slope for the brightest lumas, and MIDW determines the width of a transition region between those two sub-ranges, e.g. of parabolic shape. Finally, in some situations there may be a range adaptation unit 4006 present, which may map the maximum 1.0 to some HDR relative value dW, e.g. 0.7, and similarly the 0 value may be mapped to dB, e.g. 0.0001. This finally yields HDR normalized lumas, Y'CH, which have a grading as appropriate (in a perceptual luma domain). The perceptual lumas Y'P are multiplied by a constant 1/kb, and the minimum of Y'P/kb and Y'CH is used as the final HDR luma Y'FH, with the correct brightness look.

Then these normalized lumas are linearized to normalized HDR luminances by linearizer 4009, which because we used the Philips OETF in unit 4003, will be a corresponding Philips OETF, as given by above Eq. 6. The rho_H parameter will now depend on which type of HDR image the system is supposed to reconstruct, and it will typically fall between 13.2 (for 1000 nit PB_C HDR) and 33 (for 5000 nit HDR), but could of course also have other values.

Finally, typically the linear HDR luminances are converted back to the square root format to be in conformance with the input format Y'_SDR, by luma calculating unit 4010 applying the inverse function of the BT.1886 EOTF (in principle this standard only prescribes a display and its reference EOTF, but the skilled reader can imagine how to determine the inverse function shape by mirroring across the diagonal).

Now the adaptation unit 4025 scales to the appropriate relative luminances by applying the following calculation.

First is calculates a gp value corresponding to the PB_D of the MDR display for which the image is to be re-graded from the HDR look as starting point, similar to what was described above. So typically another unit calculated gp=log(PB_D/100)/log(PB_C/100), where PB_C is the peak brightness of the reconstructed HDR images, which of course corresponded to the HDR codec type, i.e. what the creation side selected as a useful PB_C value for the HDR images of the HDR/SDR pair (which may be determined by agreements of a particular standard, e.g. blu-ray disks would desire to use 1000 nit PB_C, or the typical needs of an application, i.e. the kinds of images that would occur, e.g. for a news program which may have highlights but is usually relatively uniformly lit rather than exotically lit—i.e. there are no dark caves or laser swords—one might consider that 1000 nit should be sufficient, and anything above can be hard clipped to this white).

The adaptation unit 4025 will multiply the total luminance transformation function applied to the input SDR luma, i.e. F_tot(Y'_SDR) which is first raised to the power gp, by that luma raised to the power (1-gp).

Ergo, in other words it calculates an appropriately graded MDR luma Y'M=power(Y'GH;gp)*power(Y'_SDR; 1-gp). Similarly to what is described above, one could convert the various more advanced techniques and embodiments to a formulation of this kind, as well as convert this final multiplicative scaling to other luma domains.

Finally, optionally non-linear MDR lumas defined according to BT. 1886-shaped function may be converted to another luma format, e.g. exact square root versions of the luminances, by unit 4033, which is just on of the embodiment definitions applicant uses (ergo optionally).

The appropriately graded MDR lumas L'M, are used for multiplying (by multiplier 4032) with three normalized non-linear RGB values, R's etc. (output from color matrixer 4031), as was elucidated above with FIG. 25, yielding final correct MDR RGB values (RGB_MDR), which could be transmitted directly to a display of that corresponding PB_D.

This present way of display tuning is very useful if the corresponding chromatic processing is done by a saturation adjustment in saturation unit 4030, which may typically be performed by multiplying Cb and Cr with a factor Sat (Y'_SDR) which is dependent on the input lumas. A typical good choice for those functions may be a deviation from Sat(Y'_SDR)=k/Y'_SDR, where k is a constant, with for higher Y'_SDR values a smaller Sat value than this inverse linear function, to create a desaturation. This gives nicely re-graded MDR images according to all optimization aspects (because one can of course never render the master HDR image perfectly on any MDR display, especially if it has e.g. a PB_D=500 nit).

In FIG. 41 we elucidate an example of how the tuning would typically work if there is an above average surround illumination. If the surround light becomes sufficiently high, what would once—under normal television or computer viewing illumination—have looked as a light grey patch on the display, could look dark grey or even black compared to the bright objects surrounding the display.

Figure 41A:
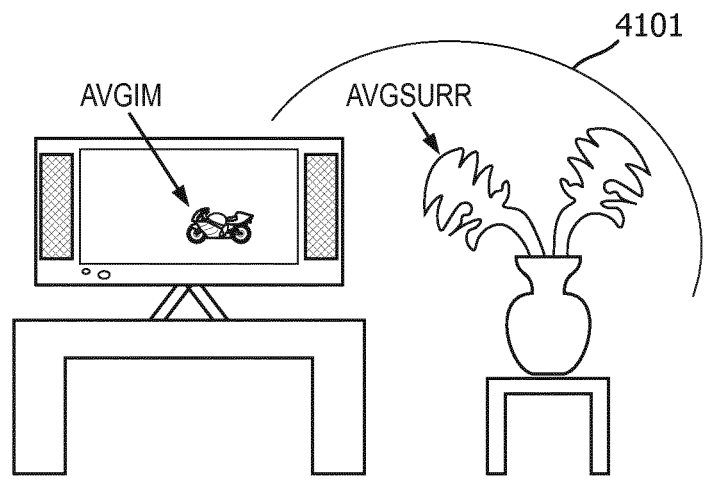
FIG. 41 schematically elucidates how typical tuning methods would function for handling non-reference surround illumination, i.e. considerably different from the expected illumination for which the encoded image(s) were graded.
Figure 41B:
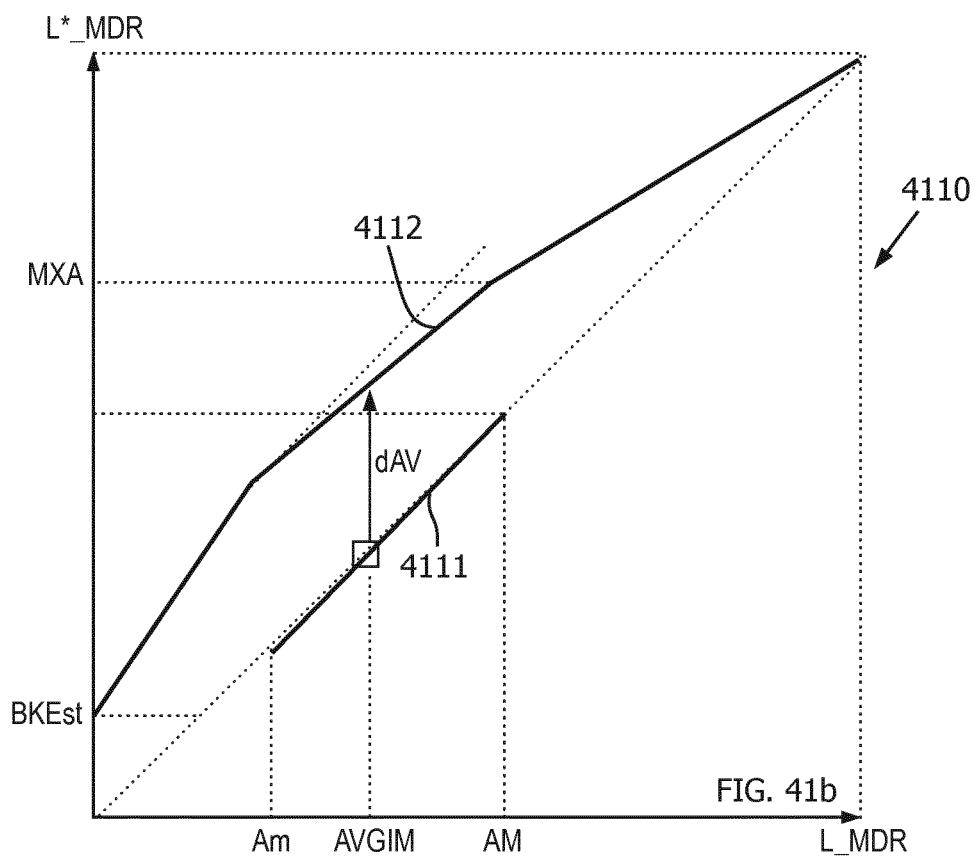

In FIG. 41*b* we now start with an image that has been optimally re-graded for an MDR display of say PB_D=1200 nit (the original master HDR image may have contained image content i.e. bright objects up to 5000 nit, but corresponding luminances for these objects have been calculated on the MDR luminance range already, with any of the above strategies). Now suppose the surround light level is increased, then it would make sense that the various object luminances (along the diagonal) would need to be brightened again. This would of course optimally be different depending on the actual image content. E.g., a typical, though certainly not exclusive or exhaustive kind of problem, is that the viewer has difficulty with perceiving what exactly resides in the darkest regions of the image. Now theoretically one might think that if the surround light boosts by a factor e.g. 2, then one would obtain an equal appearance situation if one linearly boosts all display-rendered luminances (so also the MDR driving image as input) by the same factor 2 (if that is already even possible, e.g. because of the limited backlight of an LCD display). That might be true if human vision was perfectly adapting, but in practice it is not necessarily the best approach for such surround-countering brightening to still assure the best appearing rendering for any image content/viewing limitations combination. FIG. 41*a* elucidates some of the principles. An image rendering would theoretically look optimal, if the representative average luminance of the image pixels (AVGIM) is identical to the representative average luminance of the surround objects (AVGSURR), which in its turn is via the object reflectivities dependent on the surround illumination level. E.g., when rendering a night scene, with darkish walls of houses, through which a police officer walks shining a flashlight towards the viewer, it would look spectacularly realistic if the scene continues with the surrounding regions and objects having approximately the same object luminances as in the image, as if they were a continuation of the houses. It should be emphasized that HDR has changed all the rules, and that the average luminance of the HDR image is by no means typically equal to 0.18*PB_C, as it was in the SDR video era. This is not just because PB_C can be anything, and brighter maxima for the possibilities of coding objects, will typically result in relatively lower averages, but also, because HDR scenes can contain just anything, but often have nice looks because they may have small highlights which are much brighter than the average (with any relationship to AVGIM, certainly not always 5× brighter). Of course the reader will understand that this model is not perfect, and can only exist if the surround illumination varies dynamically with the image content, which may not always be preferred. So typically the display rendering might be darker than the surround when rendering night scenes, and quite somewhat brighter when rendering daytime scenes (giving rise to the lightbox appearance of displays, but viewer focus mostly on the display, i.e. adapt to a larger degree based on the display colors than the surround colors). For HDR images, those difference could be quite somewhat more impressive, so it could be useful for an optimal experience that when e.g. a night scene is to be rendered that the surround lights are for some time at least dimmed to some degree with coordinated lamps, to make sure the dark regions of the image don't look too blackish, but in general it is not guaranteed that any rendering system will do so.

However, having display tuning methods which focus accurately on a main region of typically "average" luminances, and not just a global factor boosting the peak brightness and everything below co-linearly, is still a desired way to optimally handle the appearance adjustment for different surrounds.

FIG. 41b schematically illustrates such a luminance transformation in graph 4110, which hence can be characterized in the normalized MDR luminance L_MDR range (e.g. of PB_D=1200 nit), with the output luminances L*_MDR spanning the same range (which would correspond to what one can send as driving colors to the MDR display).

The representative image average AVGIM may again be obtained in various manners, and to various degrees of representative accuracy (e.g. it could be co-communicated in third metadata, or estimated by the receiving side apparatus from a sampled set of MDR image luminances, e.g. heuristically). In the illustrated method, this average is raised by an amount dAV. A first thing which should be noted that this needn't be 2× for a 2× increased illumination, on the contrary, it should take into account i.a. how much range is needed for the brighter objects (i.e. with luminances above the maximum AM of the region of average luminances 4111). Various practical visual effects arranged the choices. On the one hand, as already said, in practice a rendering on a display need not be exactly (equal) coordinated with the surrounding average luminance. Ergo, one would boost the average luminance AVGIM by shifting it over an established offset value dAV (which amounts to a simple controlling of the final luminance transformation curve 4112 based on a raising of that key position), in a manner which brightens it, but maybe less than for theoretically perfect multiplicative visual adaptation. E.g., if the display was already above-average bright compared to the surround, boosting this average by a dAV which corresponds to a L*_MDR value which is only 1.5×AVGIM, will make it still a somewhat bright and colorful rendering, be it a little less, but probably quite good for the circumstances (as for many images the brightening of the dark regions may be the critical issue as regards visibility, however, the brightening of the average colors gives the nice bright clear and colorful look of the rendering for any surround situation). Furthermore the algorithm may use heuristics regarding what one needs for the contrasts in this main region. Again, some specification metadata from the creation side could indicate what is desired, but heuristic automatic receiver-side algorithms could use—depending on available calculation capacity— some scene analysis for the shot of images, and determine the complexity of the regions based on such aspects as amount of histogram sub-modes in the average region 4111, local measures such as texture representative values, or even a quick segmentation and looking at the geometrical pattern of the objects, etc., or image quality measures such as banding estimates, or compression error estimates. The algorithms could use this to calculate where the minimum Am should map on the output luminance axis L*_MDR, or in this case the algorithm decided that some contrast reduction was allowable (to balance with the needs of the brightest image objects, above AM), by lowering F(AM) to output luminance MXA compared to a linear shift of all average region luminances. Also the bright pixels follow some important psychovisual lessons. One should be careful not to just shift, or bend with an arbitrary function like just some gamma function, because then one may seriously destroy the dynamic range look, which was previously by content creator and PB_D-dependent tuning so carefully created. One needs the brighter pixels, to create some sparkle. Of course again there may be some unavoidable dynamic range reduction, because there is just so much surround light, and the display, even though of higher PB_D than 100 nit, starts running into its maxima. However, this doesn't mean that one could not also do this optimalization as careful as possible, to retain as much as possible of the artists' originally intended look which he created in the master HDR grading, given now all rendering side limitations. And the optimum will again depend on the content. E.g. if on the entire range of brights above AM, there are for this image only a couple of small lamps seen as light bulbs, or some small regions of metallic reflection, it will be more possible to render those at a lower absolute ratio of the average of that local region divided by AVGIM, whilst still giving a psychological appearance of good sparkle. However, when we have for the brights a view through the window (in this case the indoors forming the region of average luminances) of sunlit buildings, more care is needed for the compression of that region above a balanced calculated MXA, so that this region doesn't lose too much contrast and colorfulness, especially if something important happens in the movie also outside. We have in this example raised the darkest pixels to a black level estimate BKEst. In general an algorithm will come to a balanced re-allocation of these at least three regions, and more advanced algorithms could even tune the shape of the function 4112 in at least one of these regions to become non-linear.

As taught, a very useful manner to do display tuning consists of a method or apparatus for calculating resultant colors of an MDR image for a display with peak brightness (PB_D) which doesn't equate to the peak brightness of an image received (PB_IM1) or an image calculable therefrom by applying to it co-received color mapping functions F_ct, comprising at least luminance mapping functions, which comprise a coarse luminance mapping function (Fcrs) and a fine luminance mapping function (CC), characterized in that first an optimized coarse mapping function (FCrs_opt) is determined based on at least PB_D for determining optimal subranges of the luminances given the actual display rendering situation, and this coarse mapping is applied to the input image yielding coarse lumas (Y'CG), and then a fine mapping function is optimized based on the fine luminance mapping function (CC) and at least PB_D, and this is applied to the coarse lumas. The coarse mapping allows to create nice versions of sub-ranges depending on the requirements of an image, which can then be used to fine-grade the objects within it. E.g. a scene of an overcast day home interior with a view outside may from first mathematical principles look similar to a night scene with a brightly lit shop window with objects inside, and a dark region of an adjacent hardly lit alley in which some bicycles are parked. Although the bicycles may be barely visible, and that may be the artistic intent, both images contain a brighter and a darker region. However the daylight lit interior ideally gets rendered with brighter luminances than any night scene. Also, since night scenes will typically not be seen as contrasty, the may not need a large sub-region of lumas, even if some action occurs there, whereas the home interior on the other hand may need a considerable sub-range of the available range of luminances for many MDR displays. The coarse luminance initial mapping mechanism not only roughly allows where to put the needed sub-ranges, i.e. with which starting or average MDR luminance, but also which extent i.e. amount of MDR luminances each sub-range will have. Both optimized mappings can be determined in various manners, e.g. the coarse mapping to create nicely lighted versions can be stretched in the diagonal direction with a optimally determined scale factor, and the fine mapping in the vertical direction. But other variants are possible, e.g. a change of the coarse stretching direction for the darkest part of the input luminances or lumas of the input image to be converted into an MDR image.

Figure 42:
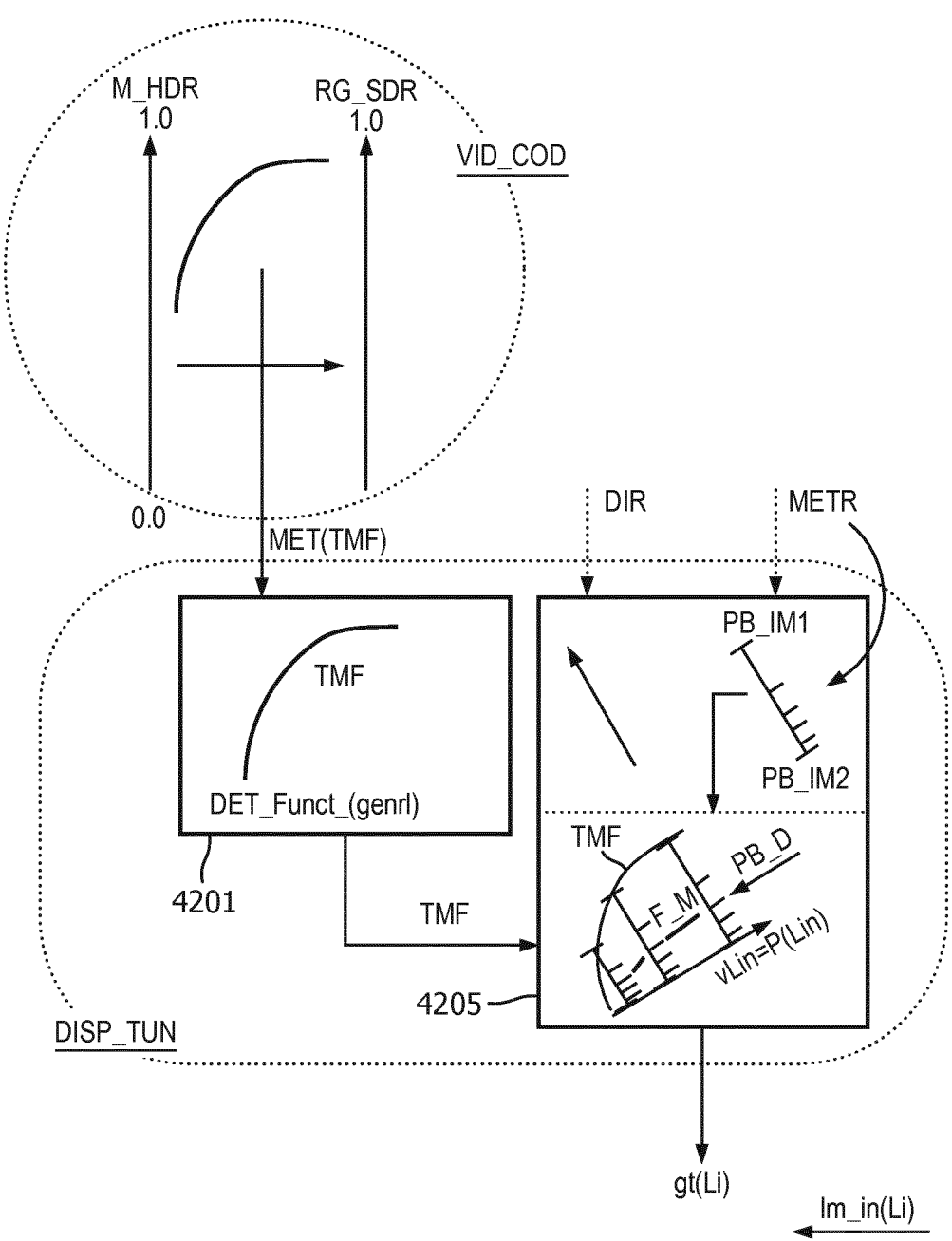
FIG. 42 schematically shows core aspects of the technical functioning of several (though not all) of the below taught embodiments.

Because our novel technical concepts can be embodied as various variants and in many forms (e.g. 1-step direct calculation in decoding vs. post-processing, different metrics, and adjustment along metrics, different color representations, etc.), we have added FIG. 42 to more simply elucidate (re-summarize) core concepts of some of our embodiments. The upper part regards pure video coding, and will be used only to introduce the possibility of the creation side to formulate the HDR scene image (and in particular the needs when re-grading to different luminances needs to be done, to get an image with optimal object brightnesses for a display with a given HDR capability, in particular its display peak brightness PB_D), e.g. by a human grader specifying a tone or luminance transformation function TMF, which maps the relative HDR luminances of a HDR master graded image (M_HDR) with the relative SDR luminances of a corresponding SDR image (RG_SDR). How this function was determined, what its shape was, or even how exactly it is represented in metadata (MET) communicated to a receiver, is not needed for elucidating the present teachings. The first thing which will typically done (in various ways in the various possible embodiment realizations), is that this function (which maps between the SDR and HDR e.g. coding PB_C=1000 nit representation) TMF is re-established at the receiving side. This is because its shape is highly important, as it determines (according to e.g. the human grader) how the image object luminances should be "reshuffled". It will hence be an important guiding factor for any algorithm determining a re-grading for a particular display. In many of our embodiments, we consider this e.g. HDR-to-SDR re-grading function as the extreme of the possible re-gradings in case a HDR image has been communicated (and vice versa for SDR-communicating embodiments). Then an interpolation direction is determined, in the relationship graph between the input image luminances (x-axis) and the output luminances (which could in principle be any representation, e.g. how input luminances are related to the luminances of the other source creation-side graded image, or the image needed for the particular display). Some embodiments can have an direction specified, i.e. input to the scaling factor determination unit (4205) e.g. by a data reading unit which reads it from metadata co-communicated with the image information (DCT coefficients etc.), or, in some embodiments it can be set on the apparatus, e.g. factory default 45 degrees, etc. The 45 degrees is especially interesting, as this method discounts for the minimal behavior of the diagonal, when any representation maps the max. luminance of the first image representation (say SDR in) to the second one (PB_C of e.g. the 500 nit display optimized image). Secondly, along this direction a metric can be positioned, typically with one of the endpoints lying on the diagonal of the graph (see e.g. FIG. 21), namely that image which is the communicated input image Im_in. The direction will determine the mathematics, of how intermediate versions of the required luminance mapping function from the input image to any display-optimized image will happen, and in particular via the metric. Having a metric allows to the extent needed or desired, to make precise determinations of the intermediate re-grading behavior, in contrast to e.g. more coarse or generic methods. As we show, there are various manners to obtain equivalent metrics, but of course the unit will have a preset or received metric which is sensible for the needed good or reasonable quality display optimization behavior. We have also shown that one could tune metrics, or positions on metrics. The only thing the reader needs to understand in this summarizing simplified discussion, is that some metric can be positioned, along the direction DIR, everywhere it is needed, e.g. starting on each point of the diagonal (which corresponds to a particular input luminance). Of course alternative embodiments may elect to determine only a number of points along the diagonal for determining a location of a corresponding point of the to be used re-grading function (F_M) for calculating the PB_D optimized output image, and then determine the other points e.g. by linear connection, etc. The principles of such different embodifications are the same. So as the lower schematic drawing shows, typically the other endpoint ends on the curve TMF as communicated in metadata (i.e. the function needed to e.g. calculate the SDR graded image from the received HDR input image, which corresponds to the diagonal representing the identity transform). So the reader can understand that if one can position a number of so scaled versions of the metric METR, which has positions corresponding to the various possible peak brightnesses at least between the HDR e.g. 1000 nit position on the diagonal and the 100 nit SDR position on TMF, i.e. which we have drawn with a line segment for e.g. the 200, 400, 600, 800 nit PB_D position, then in each location of the diagonal also a position (M_PB_D) on the metric can be determined which corresponds to the actual available display at the receiving side, and for which a suitable output image with good re-graded image object/pixel luminances has to be calculated. Conceptually the reader can understand the determination of the final needed function F_M, i.e. to calculate not the SDR grading from the received HDR image (as input image to this apparatus) but the MDR image for the PB_D display, can be obtained by connecting all the positions on the metrics. But of course in practice such behavior may be mathematized in the apparatus in various manners, e.g. as an equation directly calculating a new needed parameter or parameters of some specific function which the grader used to link the SDR and HDR gradings as video coded and communicated (e.g., for a function TMF which connects in perceptual uniform space two linear segments at the bright respectively dark ends of the luma range with a parabolic segment, for the F_M function the parameters determining the slopes of the linear parts as well as the location of the parabolic part may need to be recalculated, and such calculations may e.g. be embodied as software code running on a processor in the apparatus, say a STB or TV, as long as they realize the explained general behavior). Finally the function is preferably and advantageously transformed into a multiplier value, with a technique which is further explained with FIG. 16.

We have also drawn how a diagonal running coordinate vLin corresponds with the input luminances via a geometric projection P, and the same can be said about the rotated y-axis of the output luminances. So typically the tuning methodology would determine the function F_M by connecting points on the positioned metrics with correspond to M_PB_D, but there can be variants which deviate from that, but in general the positioning will depend on the identified M_PB_D position, and the shape of the TMF function. E.g. a typical simple but powerful embodiment scales the metrics, as established e.g. with a simple single pre-establishment of the "ticks" corresponding to equal steps in PB_D (e.g. each 100 nit step), so that the other PB_C of the two image gradings attaches to that TMF function representing that luminance transformation (i.e. e.g. the SDR curve for calculating the 100 nit metric endpoint SDR image luminances from the HDR images, and how this curve would lie beyond the diagonal, e.g. tower above it when the diagonal is rotated to a horizontal direction).

Figure 43:
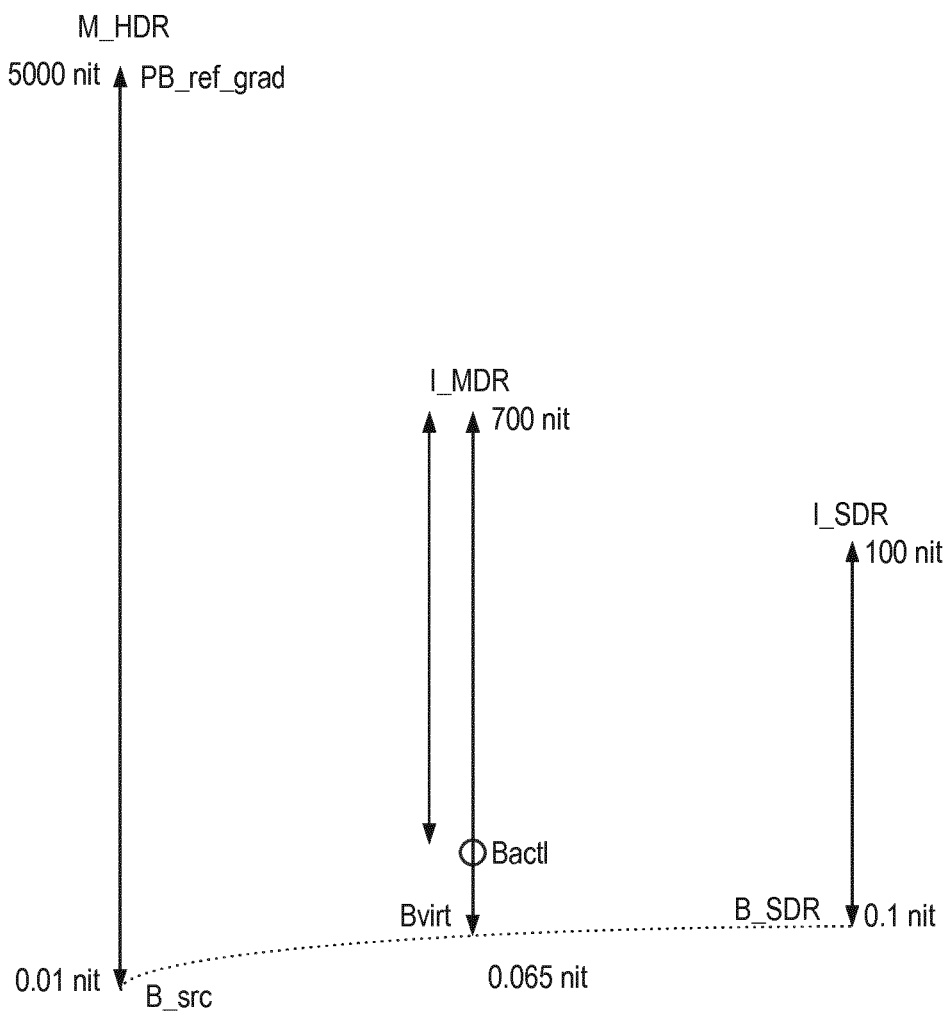
FIG. 43 schematically shows a technical vision of content-based MDR dynamic range versus an actual MDR display dynamic range, from which some of our technical embodiments will follow.

FIG. 43 elucidates another technical insight useful for adapting a re-graded image according to the needs of the black capabilities of a rendering system (i.e. a display in a viewing environment), and dependent on such factors (which e.g. a display manufacturer can use in internal processing inside a TV, or communicate the data to a pre-processing STB or computer, etc.), in particular such factors as the typical backlight leakage light when a LCD pixel is driven as fully closed, or a veiling on the display front plate corresponding to a particular amount of viewing room illuminance, etc. The reader should understand that with the grading, there exists what one could see as a theoretical situation. Assume that the master grading was made on a particular creation side HDR display (which will become the reference display for the communicated master HDR images). In particular, if the grading display cannot render a brighter luminance than its PB_ref_grad=5000 nit, then it would be expectable that, although a particular HDR image could contain pixels of lesser luminance, nothing in the image will be above 5000 nit. Similarly, if the creating grader cannot faithfully see any luminances below e.g. 0.01 nit, one can expect that nothing below 0.01 would exist in the coded image, or at least not with a precise meaning. Now some embodiments could derive secondary tuned gradings for displays with better black than the reference monitor of the artist creating the content, but here we will focus on the more typical scenario which is the other way around: the receiving side viewer has a display with worse black behavior. If the grader specifies with his functions how the brightest luminance will map between the master HDR image M_HDR and its SDR corresponding grading I_SDR, then he also specifies an ideal desired behavior for how that brightest pixel should look in the I_MDR image, e.g. map to its PB_C=700 nit. A similar tunable relationship will exists as explained above to all the grays below peak brightness, and here we can now focus on the blackest black. If the grader specifies how the blackest content black will map to SDR black (typically 0.1 nit), he also says something about how we would expect that black to stretch for MDR re-graded images. Namely, one can calculate a virtual (content) black Bvirt. This is what one would expect the MDR re-graded image to produce, if we had an ideal display, which can render incredibly dark blacks. However, as said due to various reasons, the display may only be able to render an actual black Bactl, and/or the viewer may be able to only discern sufficiently well image content up to such a black. This would desire a further display tuning of at least the darkest image colors towards and around that actual black.

One good method to do this is to spread the needed offset somewhat, according to the following method:

We will for elucidation purposes that the black level adaptation happens after a fine grading step (just exemplary, or after the application of a sole luminance mapping function in another embodiment), i.e. there is a BLA unit e.g. in FIG. 26 between units 2603 and the linearization unit 2604. First, the BLA unit determines the virtual black level Bvirt, e.g. with the following calculation:

$$Bvirt=B\_SDR+(B\_src-B\_SDR)*(PB\_DPB\_L)/(PB\_src-PB\_L)$$

In which in this example the PB_src is the peak brightness of the HDR source content, i.e. e.g. 1000 nit or 5000 nit, and the SDR peak brightness PB_L is normally 100 nit.

Then a delta is determined.

$$Delta=Bvirt-Bactl$$

(Bactl can be determined in various manners, e.g. the manufacturer can determine it in its factories and store it, or it can be determined in the viewing location prior to viewing the video content, etc.).

This is converted to a delta in uniformized luma space:

$$Del\_PU=-P\_OETF(abs(Delta)/PB\_D;PB\_D),$$

With P_OETF being the relative luminance to uniformized luma code allocation function as given above, in Eq. 8.

Then, the actual offset of the various possible input luminances, i.e. having undergone the previous processing and coming out of unit 2603, can be done e.g. according to:

$$LL=P\_EOTF(Pho*(1+Del\_PU)-Del\_PU;PB\_D), \qquad [Eq.11],$$

With the EOTF being the inverse function of the Philips OETF, as described above (Eq. 6).

Alternatively several other embodiments are possible, e.g. doing the BLA only in a region of the darkest colors, below a e.g. communicated or receiver-determined black range upper delimited BK_D_U:

$$LL=P\_EOTF[max(Pho*(1+\{Del\_PU/max(BK\_D\_U, abs(Del\_PU))\},Pho)-Del\_PU;PB\_D], \text{ etc.}$$

Figure 44:
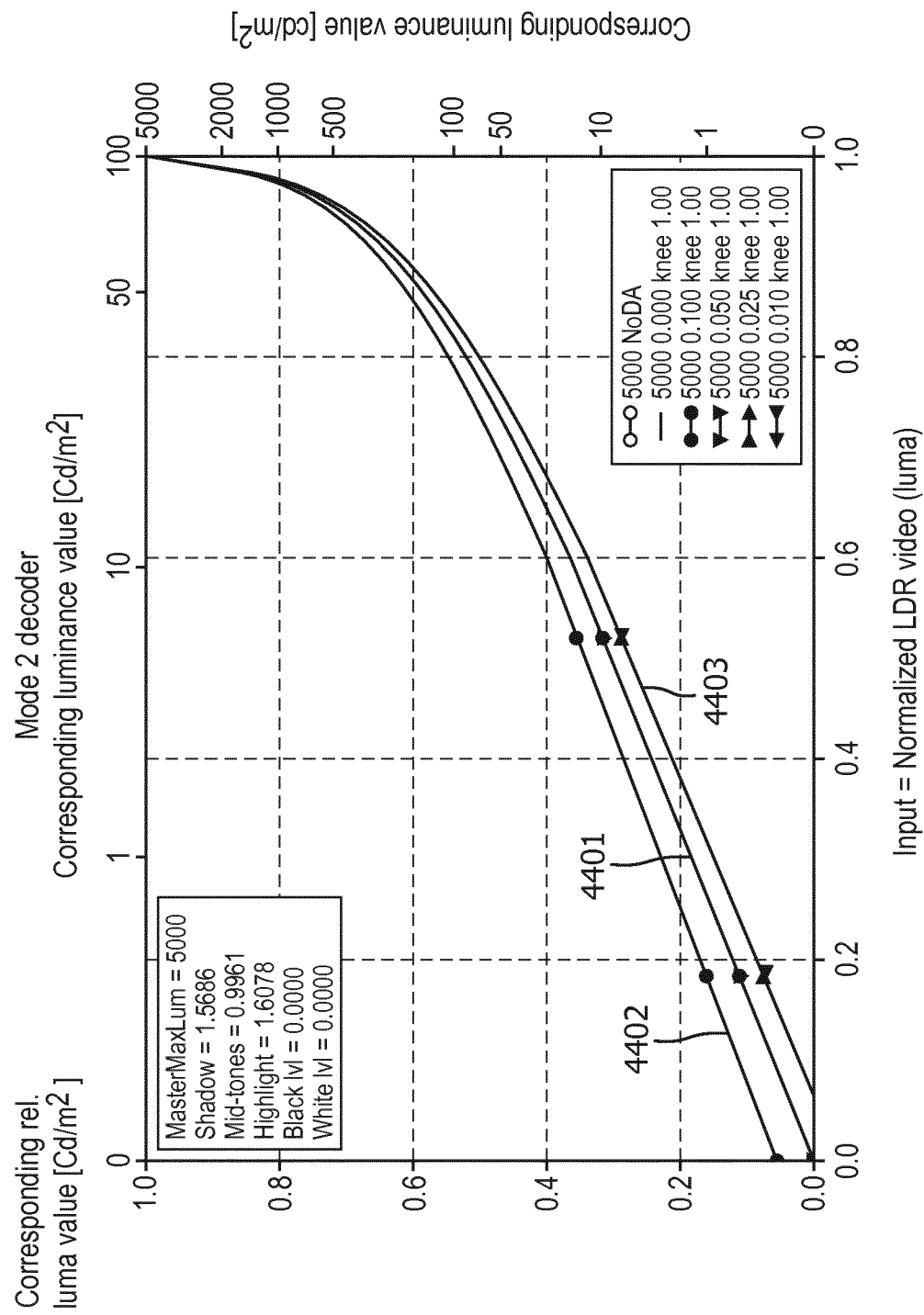
FIG. 44 schematically shows some numerical examples of a possible embodiment black level adjustment, in case the HDR image(s) are communicated as SDR image(s), and need to be extended to suitable MDR image(s) of higher dynamic range than the SDR image(s).

An example of how this tuning can behave is illustrated with FIG. 44. Here we give an example of how an SDR image can be converted into a HDR or at least higher DR (MDR) image by a function which dims the darker parts of the image compared to the brighter ones. The normal function to apply would be function 4401, which would go nicely through (0.0;0.0). With an equation like e.g. above Eq. 11 we can make a final curve which has an offset for the blackest input (i.e. in this embodiment, these would be SDR-coded luminances corresponding originally to master HDR luminances, and which need to be transformed into suitable (sufficiently visible) MDR luminances, for a display which has a relatively bad black rendering. This gives function 4402. It is also shown that the algorithm could work in the other direction (function 4403) by slightly redefining the functions, but also other methods can be applied in the current technical framework and philosophy to create ultra-good blacks.

The reader should understand that this black adjustment behavior can operate without too many details of the rest of the display tuning behavior, e.g. without the directionally oriented metric principle. What will in general be involved is some initial optimization of the MDR image in case black is not taken into account, i.e. e.g. with the coarse grading, mostly taking care of the brighter pixels limitations, and then doing a black optimization pass, in a black optimization unit.

The algorithmic components disclosed in this text may (entirely or in part) be realized in practice as hardware (e.g. parts of an application specific IC) or as software running on a special digital signal processor, or a generic processor, etc. A memory product may e.g. be a portable memory such as a blu-ray disk or a solid state memory stick, but also e.g. a memory in an offsite server from which video or image can be downloaded to a remote location of usage of the video or image.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection-wired or wireless-, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. A color transformation apparatus comprising:
   a color transformation determination circuit,
      wherein the color transformation determination circuit is arranged to determine a color transformation from color processing specification data,
      wherein the color processing specification data comprises at least one luminance mapping function,
      wherein the at least one luminance mapping function is obtained via a metadata input,
      wherein an input image has maximum first image luma code corresponding to a first image peak brightness,
      wherein the color processing specification data specifies how the luminances of pixels of the input image are to be converted into second image luminances of corresponding pixels of a second image,
      wherein the corresponding pixels of the second image have a maximum second image luma code,
      wherein the second image luminances have a second image peak brightness,
      wherein the second image peak brightness is different from a display peak brightness of a coupled display and the first image peak brightness,
      wherein the first image peak brightness is the peak brightness of the input image,
      wherein the division of the first image peak brightness by the second image peak brightness is either larger than 2 or smaller than ½;
   a scaling factor determination circuit,
      wherein the scaling factor determination circuit is arranged to determine a resultant common multiplicative factor,
      wherein the scaling factor determination circuit is arranged to determine this resultant common multiplicative factor by,
         establishing along a predetermined direction, a pre-established metric for locating display peak brightnesses and a position on that metric which corresponds with the value of the display peak brightness,
            wherein the predetermined direction has a non-zero counterclockwise angle from the vertical direction,
            wherein the vertical direction is orthogonal to a direction spanning the input image luminances,
            wherein the metric starts at the position of a diagonal representing an identity transform function, and
         establishing a second color transformation for determining at least luminances of resultant colors of pixels of an output image, wherein the second color transformation is based on the color transformation and the position,
         determining the resultant common multiplicative factor based on the second color transformation; and
   a scaling multiplier, wherein the scaling multiplier is arranged to multiply each of the three color components of a color representation of input colors of pixels of the input image by the resultant common multiplicative factor to obtain the resultant colors.

2. The color transformation apparatus as claimed in claim 1, wherein the direction is 45 degrees counterclockwise from the vertical direction.

3. The color transformation apparatus as claimed in claim 1,
   wherein two outer points of the metric correspond to a peak brightness of respectively the input image and the second image,
   wherein the apparatus calculates an output image for a display with a display peak brightness falling within a range of peak brightnesses spanned by the two outer points.

4. The color transformation apparatus as claimed in claim 1, wherein the metric is based on a logarithmic representation of the display peak brightnesses.

5. The color transformation apparatus as claimed in claim 1,
wherein the metric is defined in a perceptually uniformized color representation,
wherein the perceptually uniformized color representation is the luma representation,
wherein the luma representation is obtained by applying the function Y=log 10(1+(rho(PB)−1)*power(L;1/2.4))/log 10(rho(PB),
wherein Y is a perceptually uniformized luma value,
wherein L is a luminance,
wherein PB is a peak brightness constant,
wherein rho is a curve shaping parameter determined by the equation rho(PB)=1+32*power(PB/10000; 1/(2.4)).

6. The color transformation apparatus as claimed in claim 1,
wherein the scaling factor determination circuit is arranged to obtain a tuning parameter from second color processing specification data,
wherein the second color processing specification data was previously determined at a time of creating the input image,
wherein the second color processing specification data is arranged to calculate a resultant common multiplicative factor,
wherein the resultant common multiplicative factor corresponds to a different position on the metric than the position for the display peak brightness,
wherein the different position is based on the value of the tuning parameter.

7. The color transformation apparatus as claimed in claim 1,
wherein the scaling factor determination circuit is arranged to determine the different position by applying a monotonous function giving as an output a normalized position on the metric as a function of at least one input parameter,
wherein the monotonous function may be determined by the color transformation apparatus autonomously, or based on prescription metadata prescribing which function shape to use,
wherein the function shape was previously determined at a time of creating the input image.

8. The color transformation apparatus as claimed in claim 1,
wherein the scaling multiplier multiplies three non-linear color components,
wherein the three non-linear color components are defined as a power function of their respective linear color components.

9. The color transformation apparatus as claimed in claim 1, further comprising an image analysis circuit, wherein the image analysis circuit is arranged to analyze the colors of objects in the input image, and therefrom determine a value for at least one of the parameters controlling the calculation of the output image.

10. The color transformation apparatus as claimed in claim 1, further comprising a clipping amount determination circuit,
wherein the clipping amount determination circuit is arranged to determine a minimal amount of hard clipping to the display peak brightness for a sub-range of the brightest luminances of the input image,
wherein the calculation of the resultant common multiplicative factor is determined for luminances of the input image within the sub-range to map the input luminance to the display peak brightness.

11. The color transformation apparatus as claimed in claim 1,
wherein the calculating the resultant common multiplicative factor is based on a coarse luminance mapping function and a fine luminance mapping function,
wherein a display-optimal coarse mapping function is determined based on at least the display peak brightness for determining optimal sub-ranges of the luminances corresponding to the actual display rendering situation,
wherein the display-optimal coarse mapping is applied to the input image yielding coarse lumas, and than a display-optimal fine mapping function is optimized based on the fine luminance mapping function and at least the display peak brightness,
wherein the display-optimal fine mapping function is applied to the coarse lumas.

12. The color transformation apparatus as claimed in claim 11,
wherein the coarse luminance mapping and the fine luminance mapping corresponding to the display peak brightness are determined along a metric with a different direction,
wherein the coarse luminance mapping is performed diagonally,
wherein the fine luminance mapping vertically.

13. The color transformation apparatus as claimed in claim 1, further comprising a black level estimation circuit,
wherein the black level estimation circuit is arranged to establish an estimate of a black level of a display,
wherein the calculation of the resultant common multiplicative factor is dependent on the black level.

14. The color transformation apparatus as claimed 13,
wherein first a luminance mapping function is established according to a reference viewing situation with a fixed illumination level,
wherein the luminance mapping function is adjusted for the value of the black level,
wherein the adjusted luminance mapping function is used to calculate the resultant common multiplicative factor.

15. An HDR image decoder comprising a color transformation apparatus as claimed in claim 1.

16. A method of calculating resultant colors of pixels of an output image comprising:
determining a color transformation from color processing specification data,
wherein the color processing specification data comprises at least one luminance mapping function received via a metadata input,
wherein the color processing specification data specifies how the luminances of pixels of an input image are to be converted into second image luminances of corresponding pixels of a second image,
wherein the corresponding pixels of the second image have a maximum second image luma code,
wherein the second image luminances have a second image peak brightness,
wherein the second image peak brightness is different from a display peak brightness of a coupled display and a first image peak brightness,
wherein the first image peak brightness is the peak brightness of the input image, wherein the division of the first image peak brightness by the second image peak brightness is either larger than 2 or smaller than ½,
wherein the input image has input colors,
wherein the input image has a maximum input image luma code,
wherein the maximum input image luma code corresponds to the first image peak brightness,
wherein the display has the display peak brightness,
wherein the display peak brightness is different than the first peak brightness;
determining a resultant common multiplicative factor, wherein the determining comprises:
establishing along a predetermined direction, a pre-established metric, and a position on that metric which corresponds with the value of the display peak brightness,
wherein the predetermined direction has a non-zero counterclockwise angle from the vertical direction,
wherein the vertical direction is orthogonal to a direction spanning the input image luminances,
wherein the metric starts at the position of a diagonal between the input and output luminance axes;
establishing a second color transformation for determining at least luminances of the resultant colors of pixels of the output image,
wherein the output image is tuned for the coupled display
wherein the second color transformation is based on the color transformation and the position; and
calculating the resultant common multiplicative factor based on the second color transformation; and
multiplying each of the three color components of a color representation of the input colors by the resultant common multiplicative factor to obtain the resultant colors of the output image.

17. The method as claimed in claim 16, wherein the direction is 45 degrees counterclockwise from the vertical direction.

18. The method as claimed in claim 16, wherein the metric is based on a logarithmic representation of the display peak brightnesses.

19. The method as claimed in claim 16,
wherein the calculation of the position is dependent on calculating a scale factor,
wherein the scale factor equals $((B-1)/(B+1))/((A-1)/(A+1))$,
wherein A is an output value of a predetermined logarithmic function,
wherein a shape of the predetermined logarithmic function is determined by the peak brightness of the second image,
wherein a relative luminance is used,
wherein the relative luminance is equal to the value of the first image peak brightness divided by the second image peak brightness,
wherein B is an output value of the predetermined logarithmic function,
wherein the shape of the predetermined logarithmic function is determined by the peak brightness of the display,
wherein a relative luminance is used which is equal to the value of the first image peak brightness divided by the display peak brightness.

20. The method as claimed in claim 16,
wherein a second position is determined for at least some input luminances,
wherein the second position is not equal to the position.

21. A computer program stored on a non-transitory medium, wherein the computer program when executed on processor performs the method as claimed in claim 16.

* * * * *